US010336453B2

United States Patent
Chan et al.

(10) Patent No.: US 10,336,453 B2
(45) Date of Patent: Jul. 2, 2019

(54) SYSTEM AND METHOD FOR PAYLOAD MANAGEMENT FOR UNMANNED AIRCRAFT

(71) Applicant: Elwha LLC, Bellevue, WA (US)

(72) Inventors: Alistair K. Chan, Bainbridge Island, WA (US); Roderick A. Hyde, Redmond, WA (US); Muriel Y. Ishikawa, Livermore, CA (US); Jordin T. Kare, San Jose, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 329 days.

(21) Appl. No.: 14/995,332

(22) Filed: Jan. 14, 2016

(65) Prior Publication Data

US 2017/0203843 A1  Jul. 20, 2017

(51) Int. Cl.
  *B64D 1/08* (2006.01)
  *B64C 39/02* (2006.01)
  *B64D 9/00* (2006.01)

(52) U.S. Cl.
  CPC .............. *B64D 1/08* (2013.01); *B64C 39/024* (2013.01); *B64D 9/003* (2013.01); *B64C 2201/128* (2013.01)

(58) Field of Classification Search
  CPC ........ B64C 2201/128; B64C 2201/108; B64C 2201/105; B64C 2201/024; B64C 2201/82; B64C 2201/027; B64C 39/024; B64C 1/22; B64D 1/08; B64D 1/22; B64D 9/003; B64D 81/052; B60P 7/065
  See application file for complete search history.

(56) References Cited

U.S. PATENT DOCUMENTS

| | | | | |
|---|---|---|---|---|
| 2,706,605 A | * | 4/1955 | Rose | B64D 1/14 137/38 |
| 4,163,535 A | * | 8/1979 | Austin | B64C 39/024 244/17.11 |
| 4,164,970 A | * | 8/1979 | Jordan | A45C 3/00 206/522 |
| 4,267,987 A | * | 5/1981 | McDonnell | B64D 39/00 244/137.4 |
| 4,601,443 A | * | 7/1986 | Jones | B64D 17/025 244/13 |
| 5,518,205 A | * | 5/1996 | Wurst | B64B 1/20 136/291 |

(Continued)

OTHER PUBLICATIONS

PCT International Search Report; International App. No. PCT/US2017/013124; dated May 29, 2017; pp. 1-3.

*Primary Examiner* — Medhat Badawi

(57) ABSTRACT

A system and method for payload management for an unmanned aircraft system is disclosed. The payload management system and method may comprise a containment system configured to contain payload carried by the UAV/aircraft. The UAV/aircraft may be configured to carry payload in an external pod as part of the containment system. The pod carried by the UAV/craft may be fillable/inflatable to contain payload and facilitate aerodynamic performance of the UAV/craft carrying payload (e.g. on a mission from originator to destination for delivery in operating conditions). Systems and methods may provide managing and monitoring for payload carried by UAV/aircraft (e.g. with instrumentation).

23 Claims, 28 Drawing Sheets

(56) References Cited

U.S. PATENT DOCUMENTS

| | | | | |
|---|---|---|---|---|
| 5,678,969 | A * | 10/1997 | Farrell | B60P 7/135 410/119 |
| 5,730,564 | A * | 3/1998 | Howlett, Jr. | B60P 7/065 410/119 |
| 7,059,566 | B2 * | 6/2006 | Byers | B64C 1/061 244/119 |
| 7,299,925 | B1 * | 11/2007 | Ansay | B65D 81/052 206/522 |
| 7,341,223 | B2 * | 3/2008 | Chu | B64B 1/14 244/24 |
| 7,500,442 | B1 * | 3/2009 | Schanz | B63B 21/66 114/256 |
| D672,440 | S * | 12/2012 | Mears | D23/266 |
| 8,366,037 | B2 * | 2/2013 | Morris | B64C 27/02 244/1 TD |
| 8,540,183 | B2 * | 9/2013 | Morris | B64C 27/02 244/1 TD |
| 8,727,280 | B1 * | 5/2014 | Lutke | B64C 3/30 244/123.11 |
| 8,827,613 | B2 * | 9/2014 | Liao | B60P 7/065 410/119 |
| 8,979,023 | B1 * | 3/2015 | Wang | B64C 25/32 244/100 A |
| 9,508,264 | B2 * | 11/2016 | Chan | G08G 5/0043 |
| 9,517,838 | B1 * | 12/2016 | Howard | B64C 27/12 |
| 9,758,247 | B2 * | 9/2017 | Alber | B64D 5/00 |
| 2001/0017175 | A1 * | 8/2001 | Mangum | C06B 45/10 149/19.7 |
| 2005/0236519 | A1 * | 10/2005 | Handley | B64B 1/06 244/97 |
| 2005/0258306 | A1 * | 11/2005 | Barocela | B64C 39/10 244/30 |
| 2010/0012769 | A1 * | 1/2010 | Alber | B64C 27/10 244/17.23 |
| 2011/0084162 | A1 * | 4/2011 | Goossen | B64C 39/024 244/12.1 |
| 2014/0217230 | A1 * | 8/2014 | Helou, Jr. | B64C 25/14 244/17.17 |
| 2015/0037113 | A1 * | 2/2015 | Maness | B60P 7/065 410/119 |
| 2015/0158587 | A1 * | 6/2015 | Patrick | B64C 39/024 244/137.4 |
| 2016/0068273 | A1 * | 3/2016 | Renn | B64D 25/20 340/982 |
| 2016/0117929 | A1 * | 4/2016 | Chan | G06Q 30/04 701/3 |
| 2016/0117933 | A1 * | 4/2016 | Chan | G08G 5/0069 705/317 |
| 2016/0159471 | A1 * | 6/2016 | Chan | B64C 39/024 244/39 |
| 2016/0159472 | A1 * | 6/2016 | Chan | B64C 27/08 244/39 |
| 2017/0015414 | A1 * | 1/2017 | Chan | B64C 39/024 |
| 2017/0015415 | A1 * | 1/2017 | Chan | B64C 39/024 |
| 2017/0235018 | A1 * | 8/2017 | Foster | G01V 99/005 702/5 |
| 2017/0320574 | A1 * | 11/2017 | Richardson | B64D 1/02 |

* cited by examiner

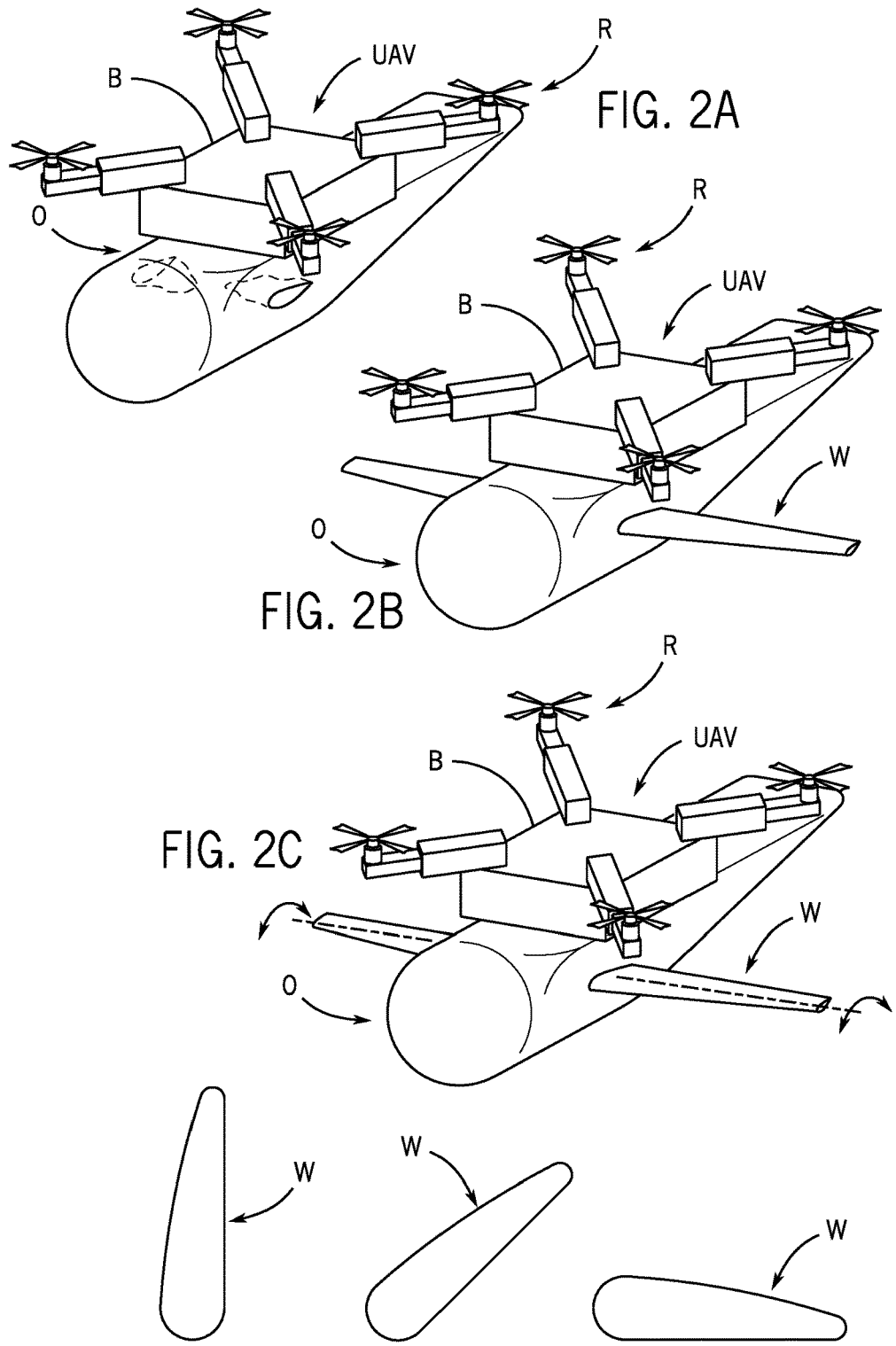

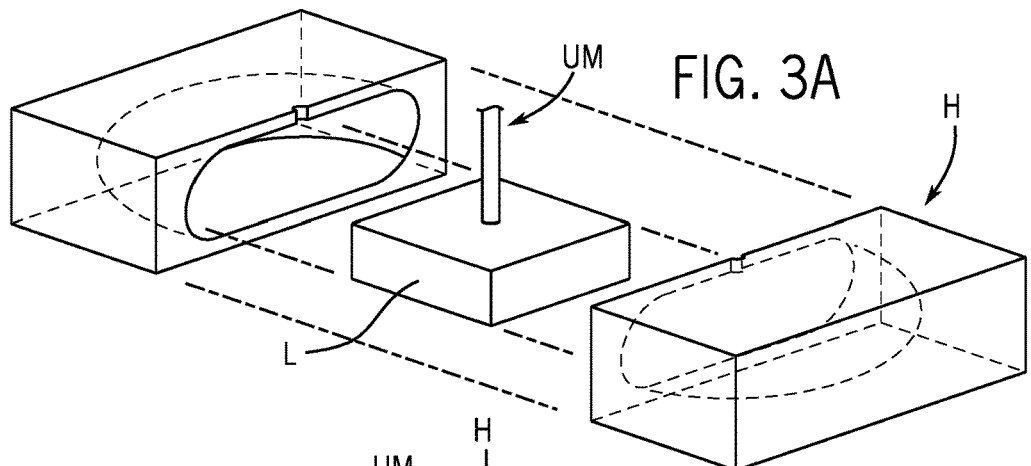
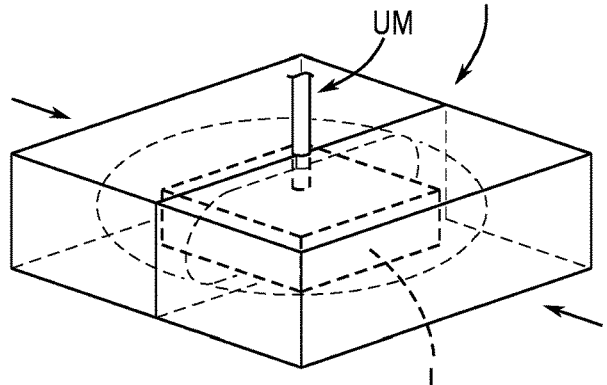
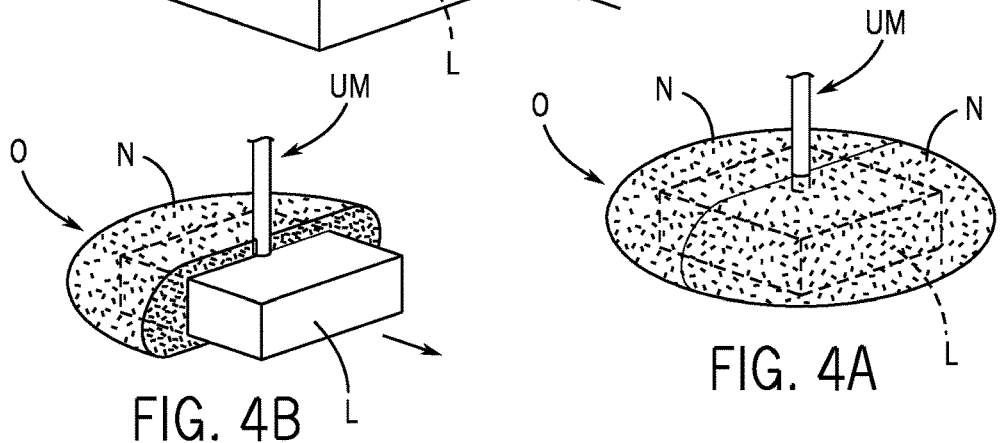
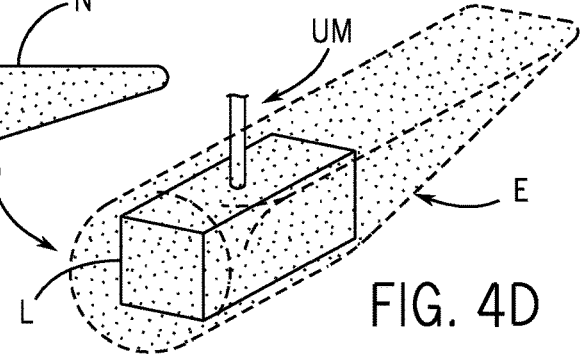
FIG. 3A
FIG. 3B
FIG. 4A
FIG. 4B
FIG. 4C
FIG. 4D

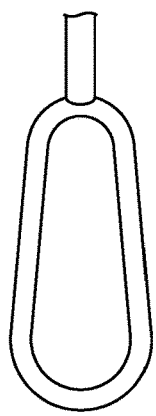
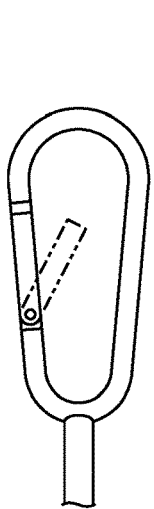
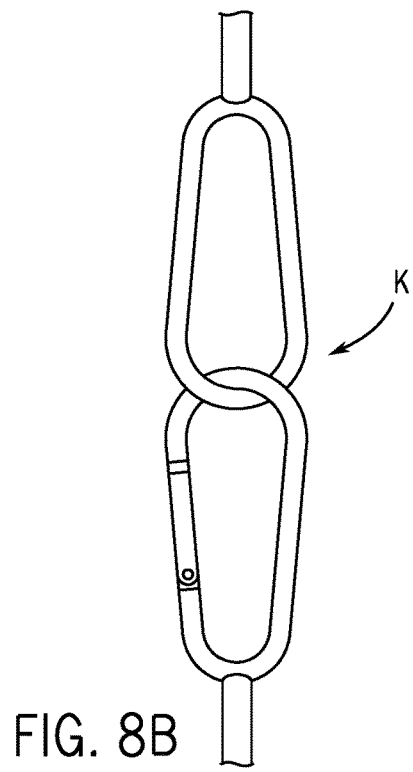
FIG. 8A    FIG. 8B
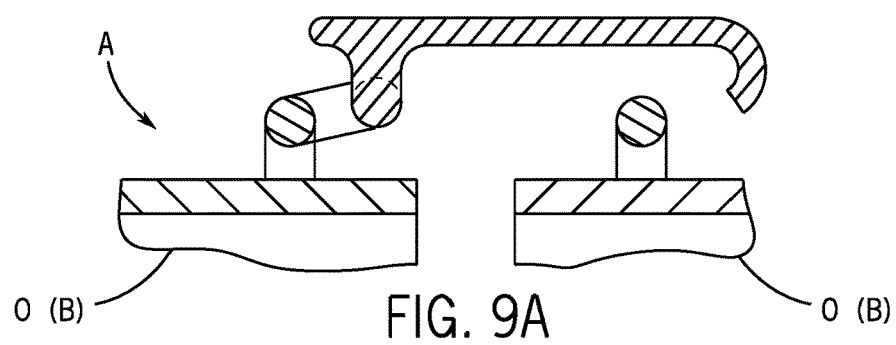
FIG. 9A
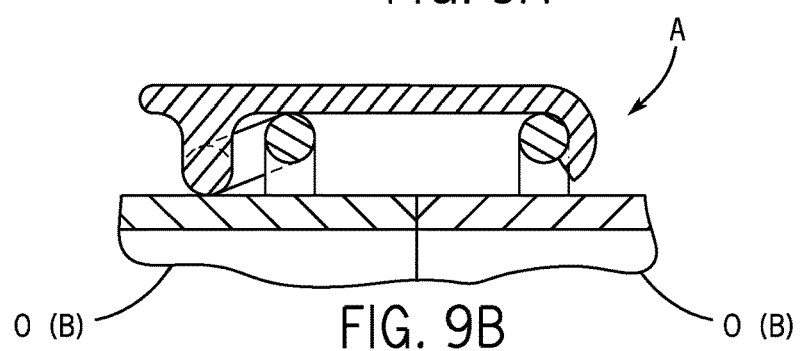
FIG. 9B

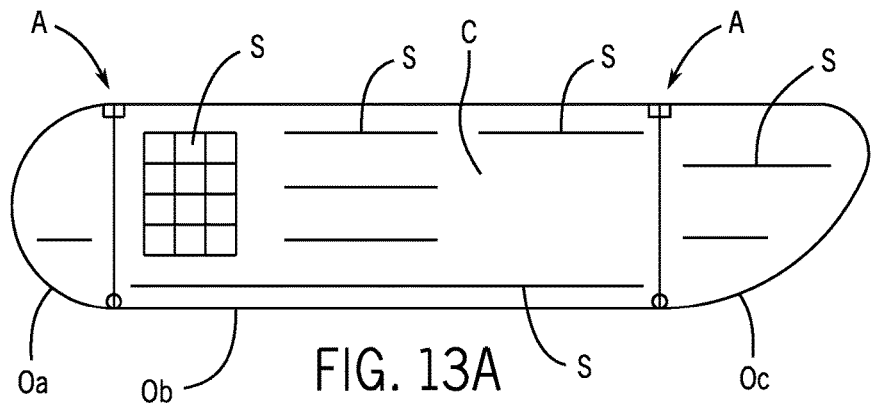
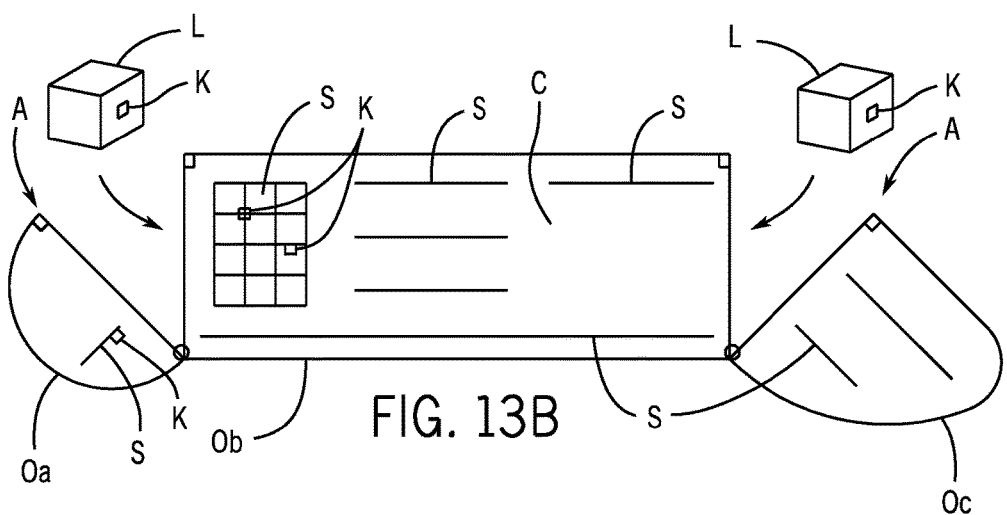
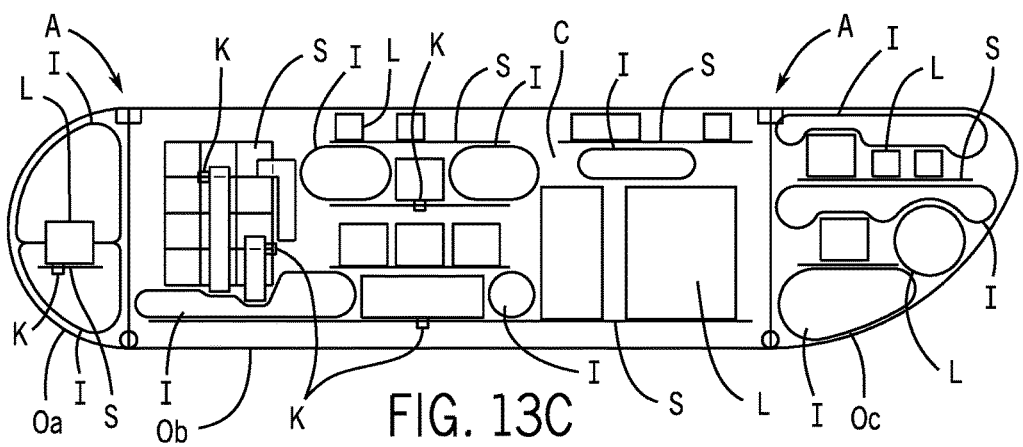

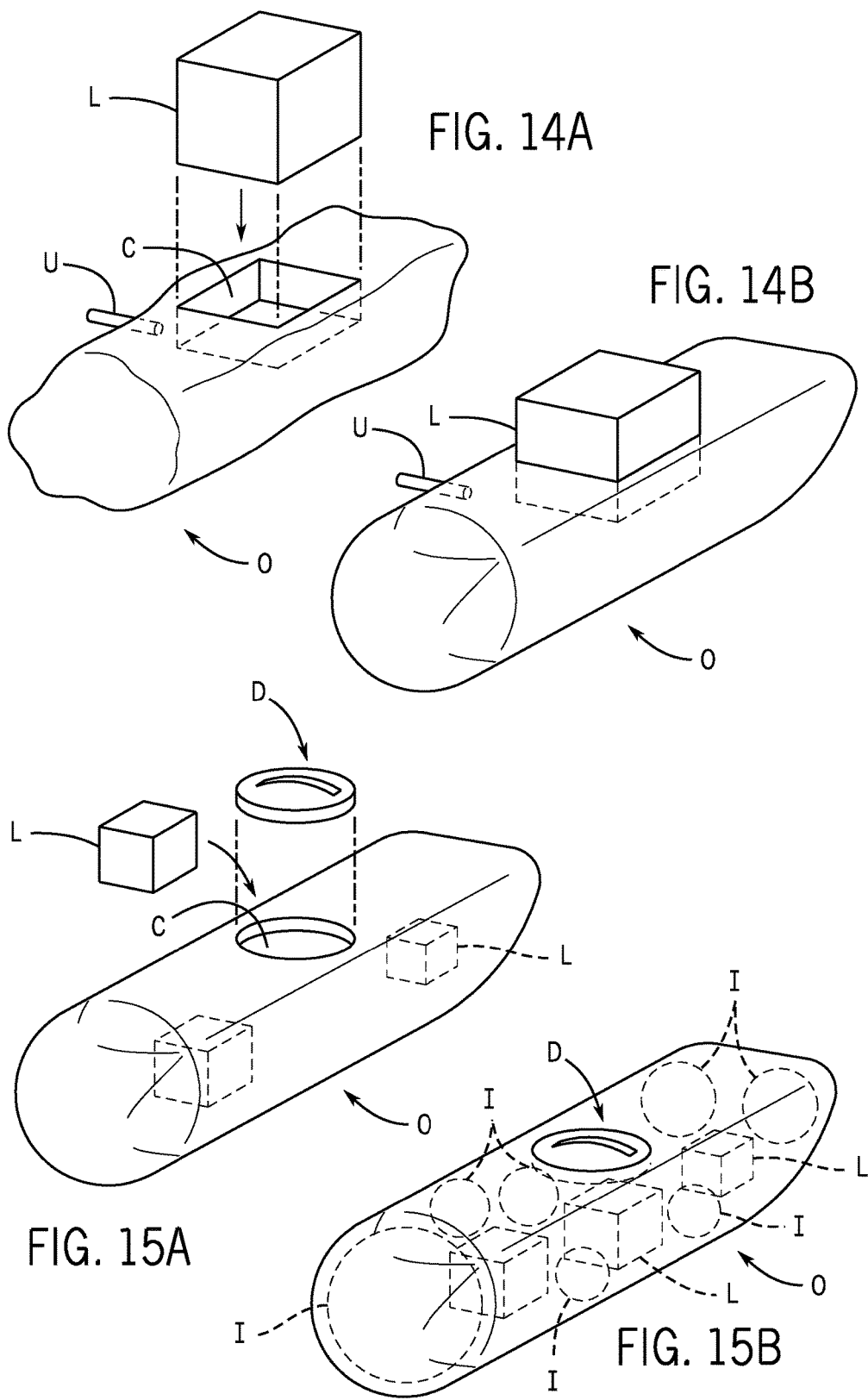

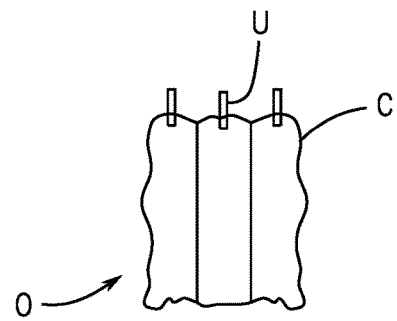
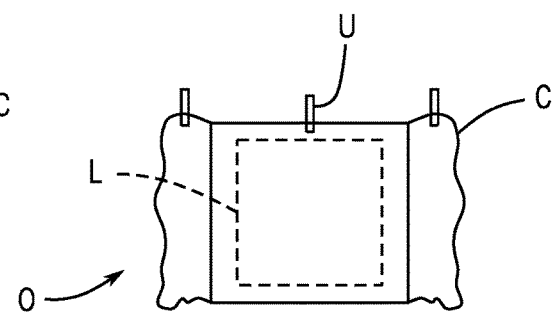
FIG. 20A    FIG. 20B
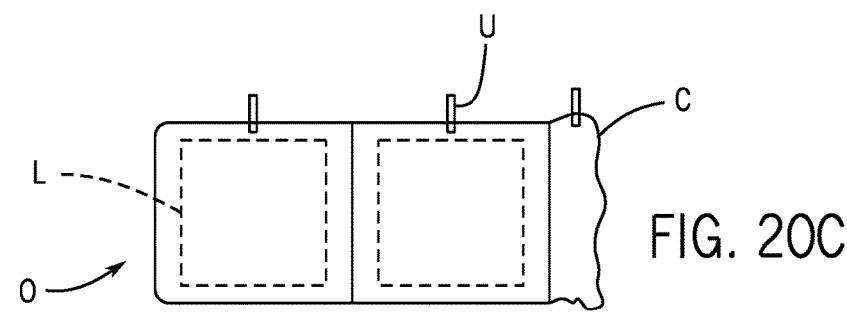
FIG. 20C
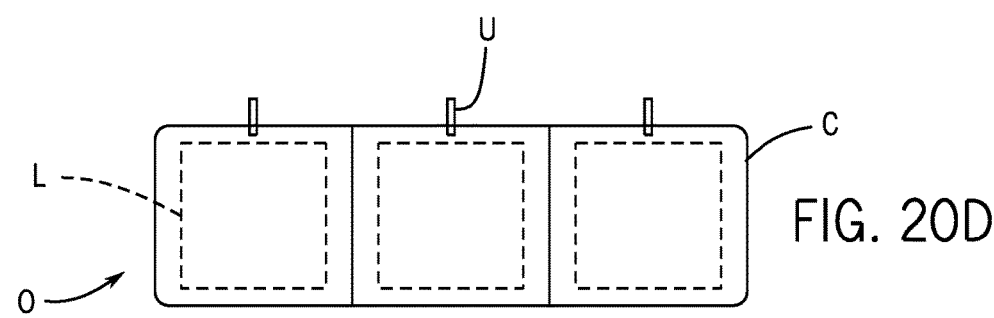
FIG. 20D
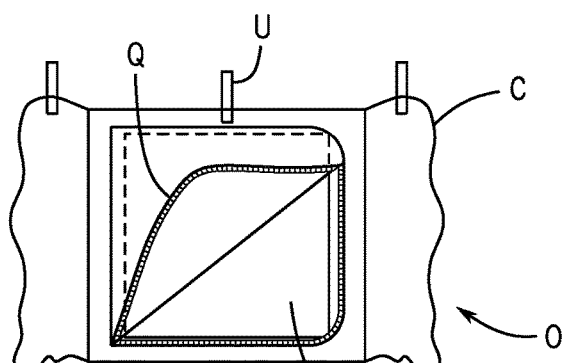
FIG. 21

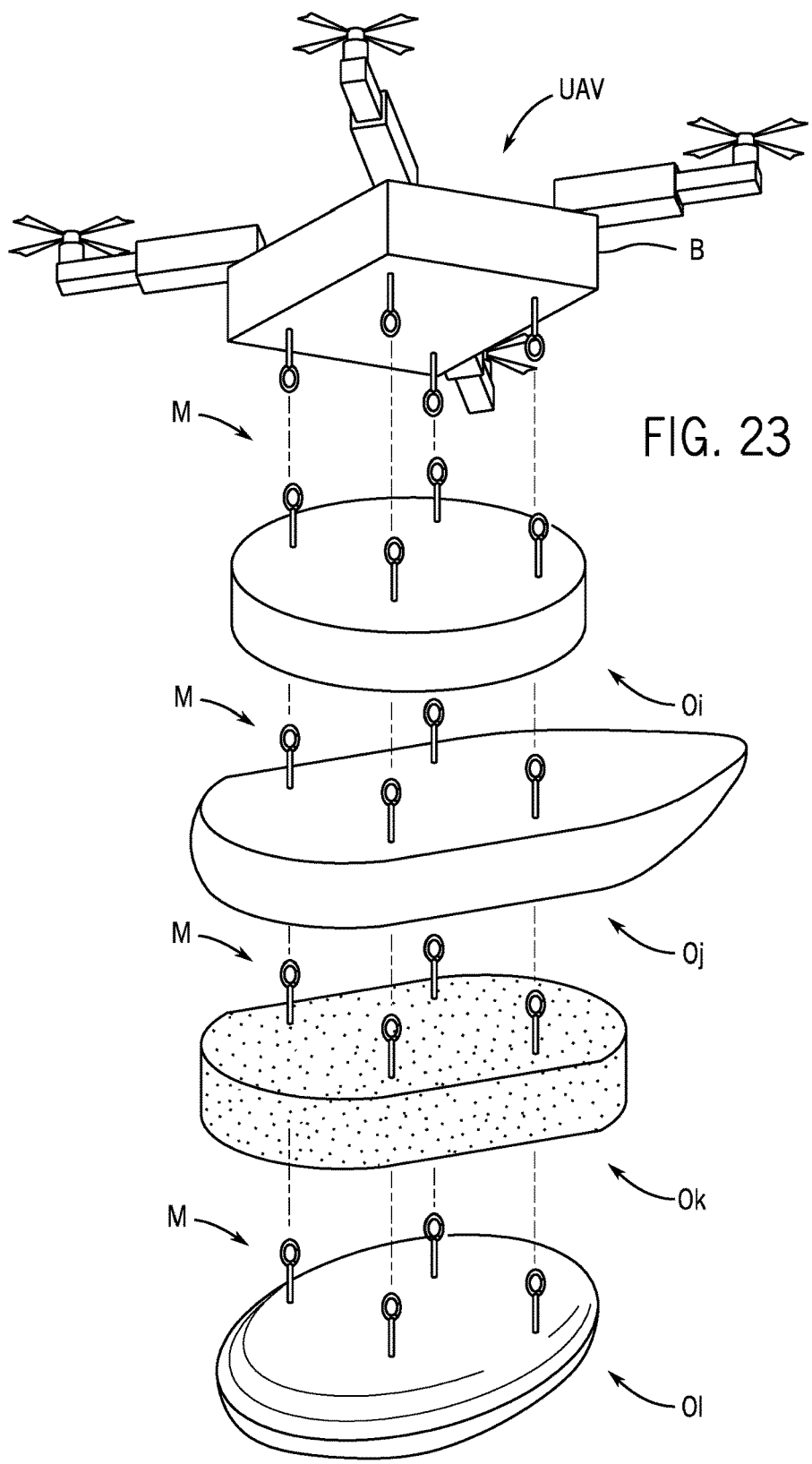

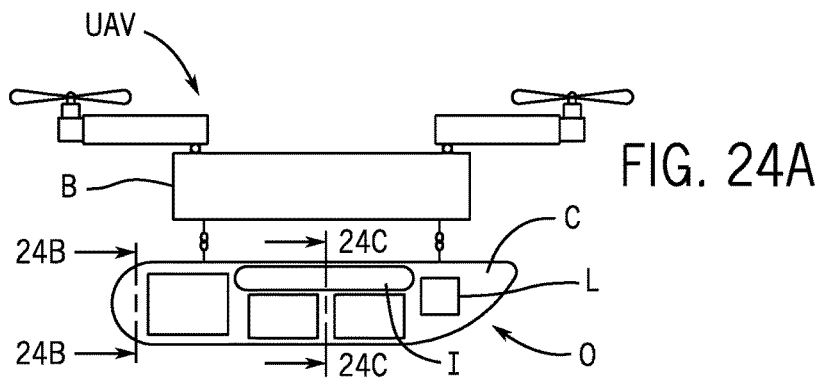
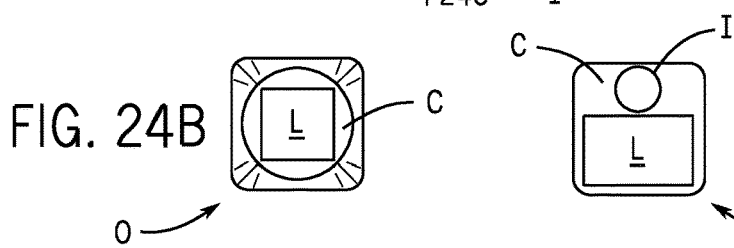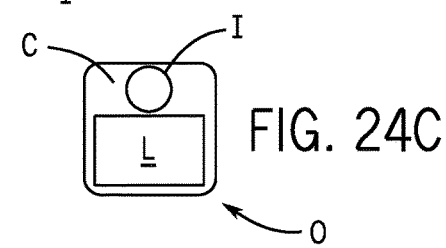
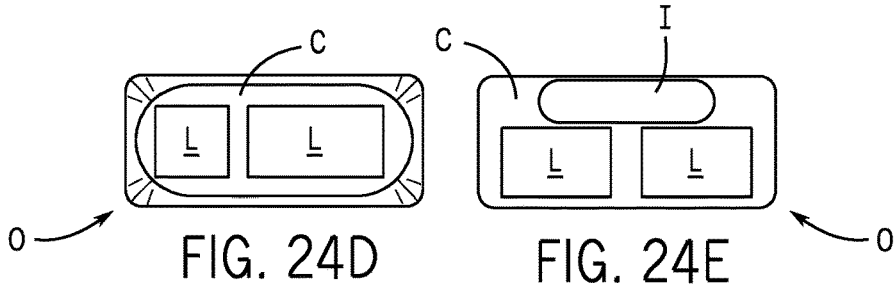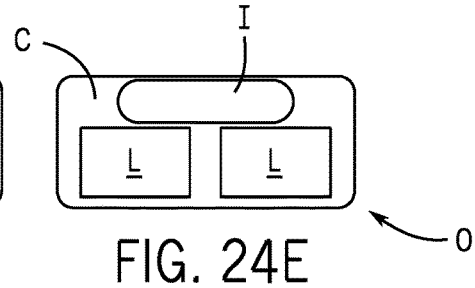
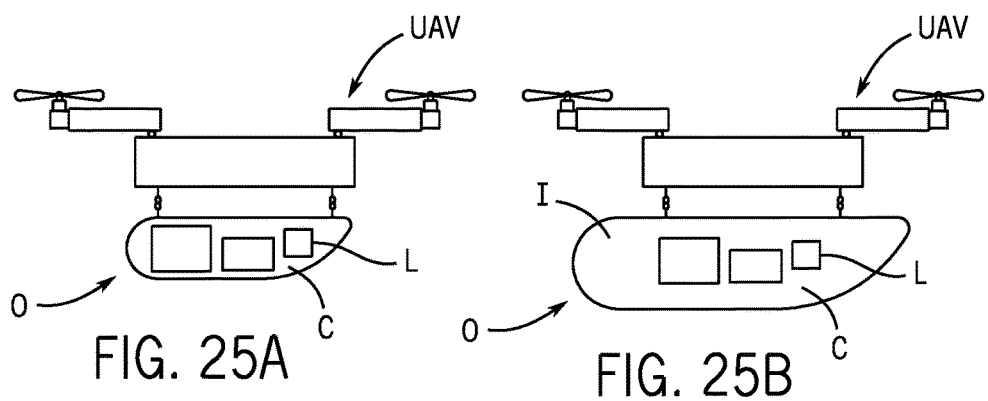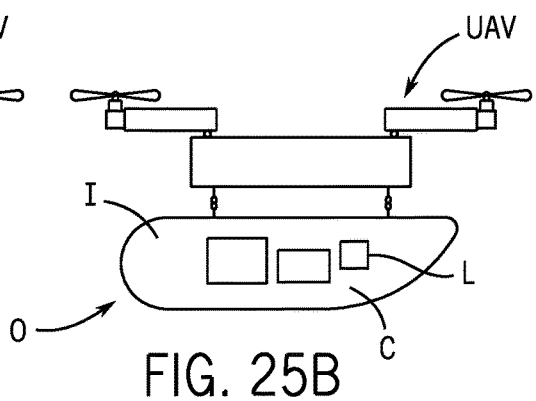
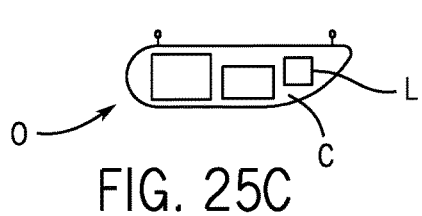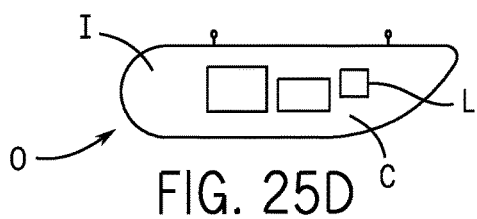

SYSTEM AND METHOD FOR PAYLOAD MANAGEMENT FOR UNMANNED AIRCRAFT

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc. applications of the Priority Application(s)).

PRIORITY APPLICATIONS

[None]

RELATED APPLICATIONS (a) U.S. patent application Ser. No. 14/501,302, titled SYSTEM AND METHOD FOR MANAGEMENT OF AIRSPACE FOR UNMANNED AIRCRAFT, naming R. Hyde et al. as inventors, filed Sep. 30, 2014 is related to and incorporated by reference in the present application; (b) U.S. patent application Ser. No. 14/501,343, titled UNMANNED AIRCRAFT CONFIGURED FOR OPERATION IN A MANAGED AIRSPACE, naming R. Hyde et al. as inventors, filed Sep. 30, 2014 is related to and incorporated by reference in the present application; (c) U.S. patent application Ser. No. 14/501,365, titled SYSTEM AND METHOD FOR OPERATION OF UNMANNED AIRCRAFT WITHIN A MANAGED AIRSPACE OR FLYWAY, naming R. Hyde et al. as inventors, filed Sep. 30, 2014 is related to and incorporated by reference in the present application; (d) U.S. patent application Ser. No. 14/546,487, titled SYSTEM AND METHOD FOR MANAGEMENT OF AIRSPACE FOR UNMANNED AIRCRAFT, naming R. Hyde et al. as inventors, filed Nov. 18, 2014 is related to and incorporated by reference in the present application.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

It has become known to use unmanned aircraft (e.g. referred to as unmanned air/aerial vehicle (UAV) or "drone") and unmanned aircraft systems (UAS) (e.g. including an operator/pilot at a remote location, etc.) for a variety of purposes in flight in various environments under various operating conditions. Such unmanned aircraft (UAV/craft or UAV/drone craft) at present are provided in a variety of forms (shapes/sizes), types (e.g. winged craft, rotor-driven craft, etc.) with a variety of propulsion systems (e.g. engines, thrust-production, etc.), capabilities, carrying capacities, control systems, telemetry systems, robustness, range, etc.; such known UAV/drone craft at present perform in military, commercial, and recreational applications.

At present, typical UAV/drone craft may be provided in a form smaller than typical manned aircraft and may typically lack certain functionality of typical commercial aircraft; some UAV/drone craft have relatively sophisticated control systems; some UAV/drone craft are operated by pilots at remote stations with data communications and instrumentation/feedback from the craft; other UAV/drone craft may have relatively simple control systems (e.g. basic remote control by line of sight by the operator).

One common form of UAV/craft or drone is configured with a base and a set of rotors (e.g. to provide lift/thrust for propulsion) as in a conventional helicopter. Another form of UAV/craft or drone is provided in a fixed wing configuration (with base or body) as to resemble a typical/conventional airplane; other UAV/craft may be configured in a modified form of existing aircraft. Various forms of UAV/craft have various similar arrangements and configurations to conventional aircraft.

It is known to provide a UAV/craft for use in any of a wide variety of functions and operations including parcel/item delivery, monitoring/surveillance, data transmission/communications, hobby/entertainment, advertising/marketing, military purposes, etc. For example, UAV/craft are able to be used on missions that may comprise the delivery of payload from an originator to a destination (e.g. with payload carried by the UAV/craft in flight). Certain commercial enterprises have begun to explore the capability of using UAV/drone craft as part of a delivery vehicle fleet to deliver goods and parcels for customers.

Differences in size/form, use and operation of UAV/drone craft allow for variations/differences in design configuration, use and operation that can be implemented to facilitate various specific functionality modifications and enhancements for UAV/drone craft. Differences in the use, operation, operational requirements and design of UAV/drone craft can facilitate differences in the manner of operation and accompanying systems and methods of operating UAV/craft and of supporting UAV/craft operation. For example, UAV/drone craft with light-weight space frames may provide improvement of energy efficiency in operation.

In relevant respects the design, configuration, size and form and operation of UAV/drone craft are different (e.g. typically smaller) from typical commercial aircraft and may vary between types of UAV/drone craft; UAV/drone craft may be provided in various forms, that range from relatively simple to relatively complex systems. As a set UAV/drone craft may vary in type, design/form, propulsion system configuration, size, primary purpose, airworthiness/robustness, controllability/telemetry, data communications and failure modes, etc. UAV/drone craft may be configured to perform functions for which a manned aircraft is generally not suitable or ideal (for various reasons) such as local/light parcel delivery, surveillance/monitoring, communications, military/government action, etc. UAV/drone craft may be designed and constructed to have widely varied capabilities useful for widely varied functions. Some UAV/drone craft may be designed as "expendable" or for finite/limited-time use; some UAV/drone craft may be designed for cost-efficiency and simplicity; other UAV/drone systems may be designed for lengthy useful lives in operation. (For an example, a typical use of a UAV/drone system may be used to carry an object such as a camera for video/photo surveillance.)

It is known that (among other features) the aerodynamic form/shape of the UAV/craft will affect performance in flight. When the UAV/craft is carrying payload the composite aerodynamic form of the UAV/craft with payload will affect performance of the UAV/drone craft system (e.g. balance, mass properties, profile, inertia, drag coefficient, etc.). For example, a bulky load carried beneath/on a UAV/craft may create discernable mass effects and discernable aerodynamic drag which may affect performance (e.g. energy efficiency, range, speed, flight dynamics, balance, controllability, etc.).

Improvement of the current state of the art of known UAV/craft carrying payload to function with improved performance would be advantageous. Improvement of systems and methods for payload management for UAV/craft would be advantageous. Improvement of UAV/aircraft carrying payload that could be configured with a containment system to contain payload and operated/managed to enhance range and performance (e.g. by improved aerodynamic form for contained/carried payload) would be advantageous.

SUMMARY

It would be advantageous to provide a system and method for improved payload management for a UAV/craft carrying payload on a mission. It would also be advantageous to provide a payload management system and method with an improved containment system for payload carried by the UAV/craft for delivery or a mission. It would further be advantageous to provide a system and method for operation and management of payload carried by a UAV/craft that could contain payload and facilitate aerodynamic performance of the UAV/craft with payload.

The present invention generally relates to improvements to methods and systems for payload management for a UAV/craft carrying payload or a mission including an improved containment system and method for items of payload carried by a UAV/craft to facilitate operation on a mission.

The present invention relates to a payload management system for an unmanned aircraft system providing an aircraft to carry payload comprising at least one payload segment on a mission from an originator by a transporter to a destination in operating conditions. The system comprises a carrier for payload configured to be carried by the aircraft and a containment system configured to contain payload. The containment system comprises an inflatable pod attachable to the carrier. The pod of the containment system is attached to the exterior of the aircraft.

The present invention also relates to a payload management system for an unmanned aircraft system providing an aircraft to carry payload comprising at least one payload segment on a mission from an originator by a transporter to a destination in operating conditions. The system comprises a carrier for payload configured to be carried by the aircraft and a containment system configured to contain payload. The containment system comprises a fillable pod carried by the carrier at least partially exterior to the aircraft. The pod comprises at least one compartment for payload.

The present invention further relates to a method of managing payload for an unmanned aircraft system providing an aircraft to carry payload comprising at least one payload segment on a mission from an originator by a transporter to a destination in operating conditions. The method comprises the steps of providing payload in a carrier configured to be carried by the aircraft; providing a containment system for payload; and configuring the containment system by inflation before the mission. The containment system comprises a fillable pod at least partially exterior to the aircraft.

The present invention further relates to a method of managing payload for an unmanned aircraft system providing an aircraft to carry payload on a mission from an originator by a transporter to a destination in operating conditions. The method comprises the steps of providing payload in a carrier configured to be carried by the aircraft; providing a containment system with the carrier for payload; and configuring the containment system by inflation during the mission. The containment system comprises an inflatable pod in an aerodynamic form carried at least partially exterior to the aircraft.

The present invention further relates to a payload management system for an unmanned aircraft system to carry payload comprising at least one payload segment on a mission from an originator by a transporter to a destination in operating conditions. The system comprises a carrier for payload to be carried by the aircraft and a containment system providing a pod for payload. The pod is provided in an at least partially inflatable form to provide containment for payload to be carried at least partially external to the aircraft.

The present invention further relates to a method of payload management for an unmanned aircraft system to carry payload comprising at least one payload segment on a mission from an originator by a transporter to a destination in operating conditions. The method comprises the steps of providing a pod comprising at least one inflatable segment to contain payload; placing payload in the pod; associating the pod with the aircraft so that the payload can be carried by the aircraft on the mission; and at least partially inflating at least one inflatable segment of the pod.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

FIGS. 1A and 1B are schematic perspective views of an unmanned aircraft system with craft and pod of a containment system for payload according to an exemplary embodiment.

FIGS. 1C and 1D are schematic side elevation views of a pod of a containment system for payload according to an exemplary embodiment.

FIG. 1E is a schematic perspective view of an unmanned aircraft system with craft and pod of a containment system for payload according to an exemplary embodiment.

FIG. 1F is a schematic side elevation view of a pod of a containment system for payload according to an exemplary embodiment.

FIG. 1G is a schematic perspective view of a pod for payload according to an exemplary embodiment.

FIGS. 2A to 2C are schematic perspective views of an unmanned aircraft system with craft and pod of a containment system for payload according to an exemplary embodiment.

FIGS. 2D to 2F are schematic side elevation views of aerodynamic control surfaces for a pod according to an exemplary embodiment.

FIGS. 3A and 3B are schematic perspective views of pod for payload according to an exemplary embodiment.

FIGS. 4A and 4B are schematic perspective views of providing a pod of a containment system for payload according to an exemplary embodiment.

FIG. 4C is a schematic side elevation view of a pod of a containment system for payload according to an exemplary embodiment.

FIG. 4D is a schematic perspective view of a pod of a containment system for payload according to an exemplary embodiment.

FIGS. 8A and 8B are schematic side elevation views of an apparatus for attachment for the containment system with carrier according to an exemplary embodiment.

FIGS. 9A and 9B are schematic side elevation views of an apparatus for attachment for the containment system with carrier according to an exemplary embodiment.

FIGS. 13A to 13C are schematic side elevation views of a pod of a containment system for payload according to an exemplary embodiment.

FIGS. 14A and 14B are schematic perspective views of the pod of a containment system with payload for the system according to an exemplary embodiment.

FIGS. 15A and 15B are schematic perspective views of the pod of a containment system with payload for the system according to an exemplary embodiment.

FIGS. 20A to 20D are schematic side elevation views of an apparatus for the pod of the containment system for payload according to an exemplary embodiment.

FIG. 21 is a schematic diagram of an apparatus for the pod of the containment system for payload according to an exemplary embodiment.

FIG. 23 is a schematic perspective view of an unmanned aircraft system with craft and pod for containment system for payload according to an exemplary embodiment.

FIG. 24A is a schematic side elevation view of an unmanned aircraft system with craft and pod for containment system for payload according to an exemplary embodiment.

FIGS. 24B and 24C are schematic front cross-section elevation views of the pod with payload according to an exemplary embodiment.

FIGS. 24D and 24E are schematic side cross-section elevation views of the pod with payload according to an exemplary embodiment.

FIGS. 25A and 25B are schematic side elevation views of an unmanned aircraft system with craft and pod for containment system for payload according to an exemplary embodiment.

FIGS. 25C and 25D are schematic side elevation views of the pod for containment system of the system according to an exemplary embodiment.

DESCRIPTION

A system and method for payload management for an unmanned aircraft system is disclosed according to exemplary and alternative embodiments. According to an exemplary embodiment, the system is configured as a payload management system for an unmanned aircraft configured to operate in an airspace. The payload management system may comprise a containment system to contain payload carried by the UAV/craft. Systems and methods for payload management for an unmanned aircraft with a containment system for payload are disclosed according to an exemplary and alternative embodiments.

Referring to FIGS. 1A-1B, 1E, 5A-5E, 6A-6E, 25A-25D, 30A-30D, 35A-35B, 36A-36B and 37A-37C, the UAV/craft with a payload management system is shown schematically and representationally according to exemplary embodiments (including with containment system comprising carrier/pod). According to exemplary embodiments, the payload management system and UAV/craft interact under management and control as indicated representationally and schematically in FIGS. 37A-37C. Methods of use and operation of UAV/craft and payload management system are shown representationally and schematically according to exemplary embodiments in FIGS. 35A-35B and 36A-36C.

Embodiments of Containment System (with Pod/Carrier)

Figure 1A:
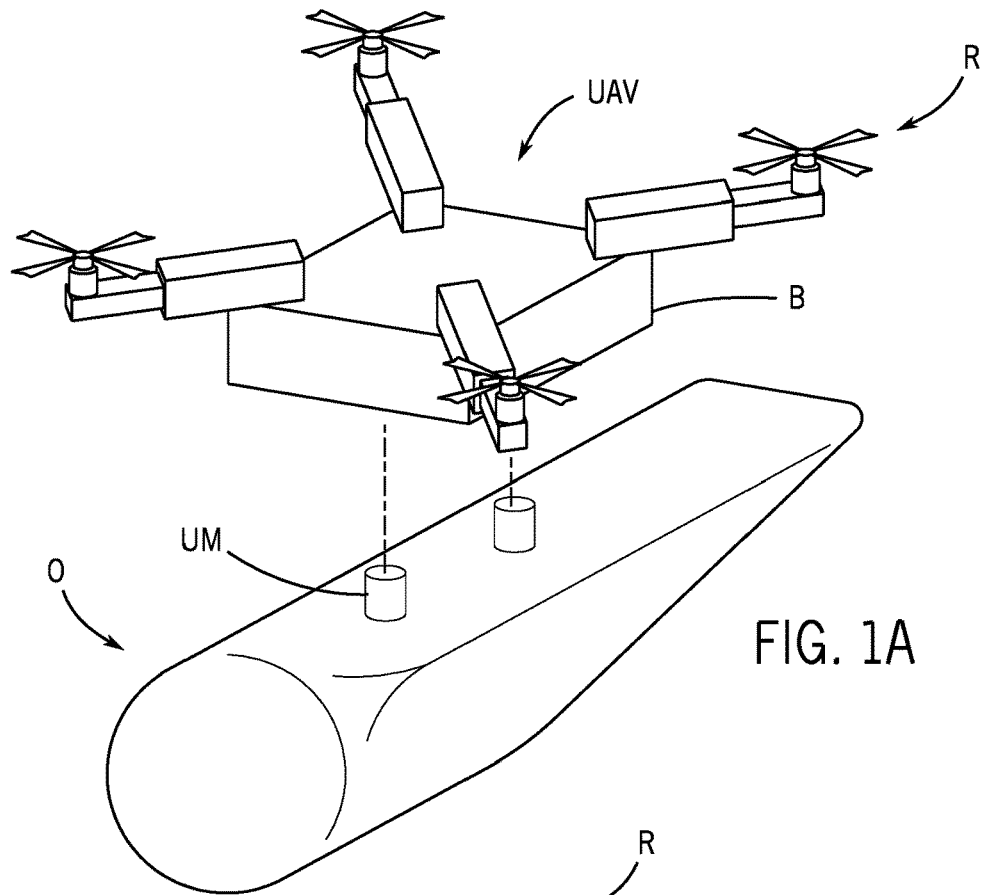
Figure 1B:
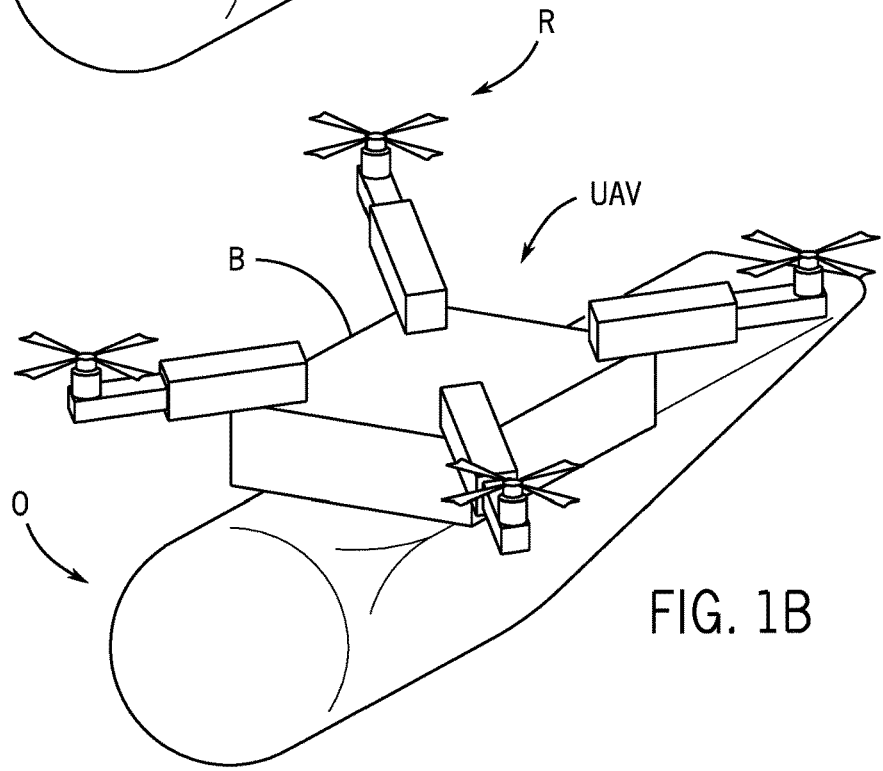
Figure 1C:
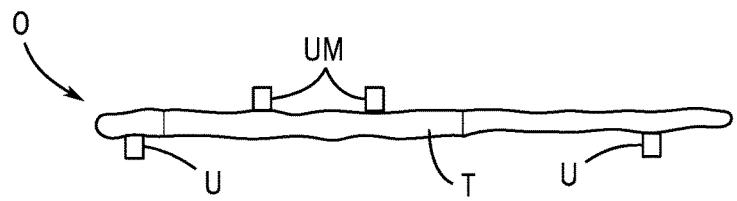

Referring to FIGS. 1A and 1B an aircraft UAV (UAV/craft) is shown schematically and representationally with a containment system comprising a pod O attachable to the aircraft according to an exemplary embodiment. See also FIGS. 37A-37C. The aircraft is shown schematically and representationally as an unmanned aircraft (e.g. of a type commonly referred to as UAV or UAS) of a generally conventional type (of any size/scale) that can be configured to carry a payload (e.g. in an attached or otherwise associated containment system providing a pod with carrier/container). According to an exemplary embodiment, the UAV/UAS may be in any of a variety of forms (e.g. a form resembling an airplane, other fixed-wing craft, helicopter, rotating blade craft, jet/rocket craft, etc.).

According to an exemplary embodiment, the pod O of the containment system is configured to contain payload L such as packages, containers, etc. (see e.g. FIGS. 1B/1E, 3B, 5B, 6B, 7B, 12B and 13B). As indicated schematically and representationally according to an exemplary embodiment in FIG. 1A and other FIGURES, the pod may be provided in a form intended to achieve one or more purposes such as to enhance aerodynamic performance (e.g. reduce or adjust drag coefficient, provide lift, etc.), to protect payload from environmental effects (e.g. weather conditions), to insulate payload from external forces and effects, to protect payload integrity or contents in the event of a crash or impact, to facilitate handling and/or attachment (e.g. providing uniformity of management and attachment), to distribute or balance loads on the aircraft (e.g. reduce likelihood of load shifting, to allow even distribution of load in the pod O (e.g. individual loads within the pod, etc.). According to any exemplary embodiment, the pod will be configured (e.g. by originator, transporter, etc.) to achieve some or all of the purposes to some degree in use and/or operation including with the UAV/craft on a mission. See FIGS. 35A-35B and 36A-36B.

Figure 1D:
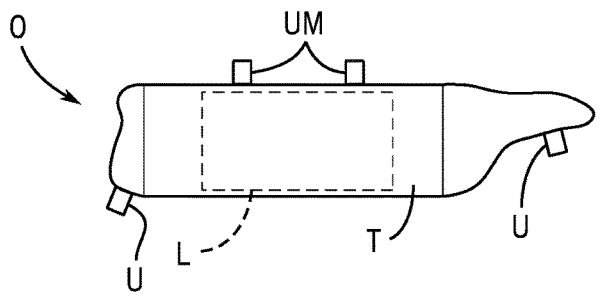
Figure 1E:
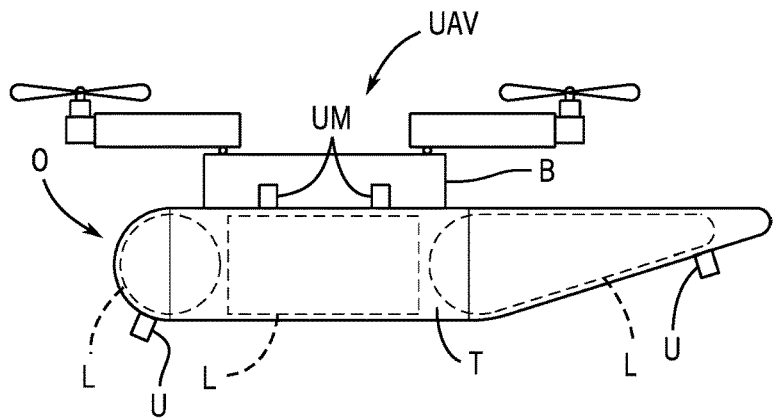

As indicated schematically and representationally in FIGS. 1A, 1B and 1E, the containment system providing the pod O is configured to be attached to an aircraft UAV so that the payload L can be carried for or from an originator by a transporter to a destination (e.g. from one location to another location or between multiple locations on a route/mission such as for delivery/distribution of payload items). As indicated schematically and representationally, payload may comprise one or more payload items or segments having any of a variety of forms, shapes, mass/weight, fragility, etc.

In FIG. 1B according to an exemplary embodiment, pod O is shown schematically and representationally attached to an aircraft UAV and able to be carried containing payload (packages, containers, etc.) to a destination for delivery. See also FIGS. 1A, 1D and 1E. According to an exemplary embodiment, the UAV/craft is shown schematically and representationally as in a helicopter form. See FIGS. 1A-1B, 1E, 2A-2C, 5A-5D, 6A-6D, 7A-7D, 10A-10B, 11A-11B, 12F, 19A-19C, 23, 24A 25A-25B, 27A-27B, 28A-28B, 29A-29D, 30A-30D, 31A-31D, 32A-32C, 33A-33C and 34A-34C.

Referring to FIGS. 1B and 1E, the pod O attached to the aircraft UAV is shown schematically and representationally as providing enhanced aerodynamic performance and mass properties/balance and to facilitate control/coordination of the aircraft and pod combination (e.g. such that the UAV/craft with pod in combination provides an aerodynamic form and controllable structure). According to an exemplary embodiment, the pod provides a structure or shell to contain the payload (e.g. payload segments/items). See FIGS. 1A-1B, 2A-2C, 7B-7D, 13A-13C and 15A-15B.

According to an exemplary embodiment shown schematically and representationally in FIGS. 1A-1G, the pod O is attachable to the UAV/craft at attachment points provided by a carrier (shown as comprising posts/members UM). As indicated in the FIGURES, according to other exemplary embodiments, the pod may be attached to the UAV/craft according to any of a wide variety of suitable carrier arrangements to facilitate the carrying of payload/cargo in an efficient and effective manner (including but not limited to any conventional/known arrangement for attachment or containment of payload to an aircraft such as a UAV/craft). See also FIGS. 8A-8B, 10A-10B, 11A-11B and 23. According to an exemplary embodiment of the payload management system, the containment system is associated (e.g. by pod/fillable container) with the UAV/craft to be deployed to carry and manage payload on the UAV/craft in flight on a mission by a transporter. See FIGS. 1A, 1E, 4A, 5A-5E, 6A-6E, 7A-7D, 10A-10B, 11A-11B, 19A-19D, 22C-22D, 23, 24A, 25A-25D, 27A-27B, 28A-28B, 29A-29D, 30A-30D, 31A-31D, 32A-32C, 33A-33C, 34A-34C, 35A-35B and 36A-36B.

Figure 1F:
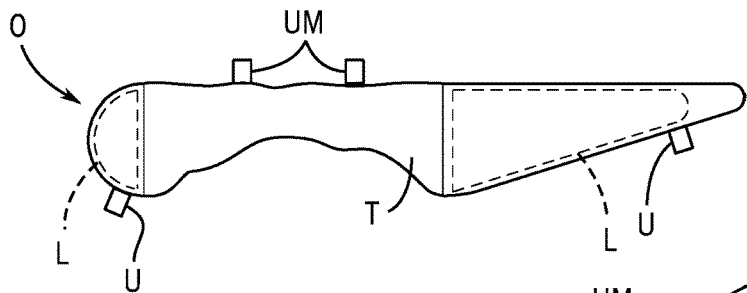

As indicated schematically in FIGS. 1A to 1F, the pod O of the containment system may be an inflatable structure (e.g. fillable at inflation stems or tubes U) that may initially be uninflated/flat (see FIG. 1C) and that can be loaded with cargo and inflated (see FIG. 1D) to take an aerodynamic form (see FIGS. 1A-1B and 1E) and then be uninflated (e.g. after cargo has been carried to a destination/delivered) (see FIG. 1F). See also FIGS. 37B-37C. As indicated in FIG. 1E, the pod O may include padded and/or inflatable segments shown as segments I (e.g. pre-inflated segments, supplemental segments or inflatable segments, etc.) that may be intended to secure/protect items of payload L (and that may also facilitate the pod taking a more rigid structural form such as indicated schematically at the nose of the pod). As indicated schematically, the segments such as inflatable segments I within the pod O may be movable/removable and may be presented in a variety of shapes and forms and positions to conform to items of cargo, to fit with precision within the internal sections, to provide a defined shape to the pod, to create a space within the pod, etc. See for example FIGS. 1E and 1F. See also FIGS. 13B and 15B.

As indicated, the pod of the containment system may be inflated/deflated before, during and/or after attachment to the UAV/craft (as configured). See for example FIGS. 1A, 1C, 1E and 1F. See also FIGS. 10A, 11A, 14A, 15A, 16A, 16C, 17A and 20A. According to an exemplary embodiment the UAV/craft may be provided with an internal system to inflate/fill the pod (see e.g. FIGS. 1A-1F, 25A-25B, 37C) or an external system may be provided to fill/inflate the pod (see e.g. FIGS. 3A-3B, 5A-5E, 6A-6E, 10B, 12E, 18B, 25C-25D and 37B). Fill/inflation of the pod may be provided by a tube or stem (e.g. tube UM or tube U). See for example FIGS. 1A and 1C. According to an exemplary embodiment indicated schematically in FIGS. 5C, 6C, 18B, 25C-25D, 35A and 37B the fill/inflation system may be external to the containment system and UAV/craft (e.g. to be used before flight). According to an exemplary embodiment indicated schematically in FIGS. 1A-1F, 25A-25B 35B, 36B and 37C the filling/inflation system may be on the UAV/craft (e.g. to be used before and/or during flight).

Figure 1G:
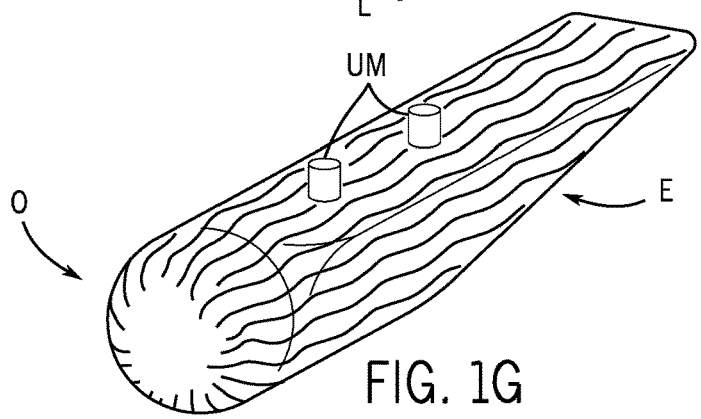

Referring to FIG. 1G, the pod O is shown schematically and representationally with features E (e.g. ripples on the surface according to the illustrated schematic embodiment) intended to enhance aerodynamic performance of the pod (e.g. to facilitate airflow efficiency, to reduce drag effects, modify drag coefficient, etc.). See also FIGS. 4C-4D, 12A-12F, 16D-16E, 23 and 25A-25D.

Referring to FIGS. 2A-2B, a pod O is shown according to an exemplary embodiment, (attached to an aircraft) provided with a space frame structure shown as wings (e.g. aerodynamic structures) inflatable to deploy laterally from the side of the pod O; as shown schematically and representationally the structure (e.g. set of wings) is intended to facilitate the aerodynamic performance of the pod (e.g. when deployed from, attached to the aircraft, etc.). According to an exemplary embodiment, the configuration of the pod with space frame structures (e.g. wing or wings) can be adjusted to achieve particular aerodynamic performance in particular circumstances such as to reduce, modify drag or facilitate lift and/or otherwise to maintain or enhance flight characteristics. As indicated, according to an exemplary embodiment shown schematically and representationally in FIGS. 2C and 2D-2F, aerodynamic structures shown as wings W (or other structures) on the pod can be configured with a mechanism/control system to be adjusted in orientation (see also FIG. 2C) before or during flight of the aircraft to enhance performance (e.g. generally in coordination with flight control of the aircraft carrying the pod). According to an exemplary embodiment, the structures may comprise other forms and/or mechanisms providing surfaces or shapes to facilitate aerodynamic performance; as indicated schematically and representationally the structures may be wholly or partially inflatable, wholly or partially rigid, wholly or partially adjustable (or fixed/non-adjustable). See for example FIGS. 12A-12F (tail structure Z).

Referring to FIGS. 3A through 3B and 4A through 4D, an arrangement configured to contain and protect the payload (e.g. package or container) in the pod O of the containment system is shown to an exemplary embodiment. As indicated schematically and representationally according to an exemplary embodiment in FIGS. 3A and 3B, the payload L is inserted into a mold (e.g. tool or fixture for compression or injection molding or etc.) and a molded material N can be filled or applied (e.g. injection molded around the form of the payload) to encapsulate the payload with the molded material. See FIGS. 3B and 4A. As indicated schematically and representationally according to an exemplary embodiment in FIG. 4A, the payload encapsulated with the moldable/molded material N (e.g. an encapsulating foam or packing material such as urethane or other suitable material that has been filled or injected as a liquid and then is cured or solidified) can be attached as a unit to the aircraft for delivery (e.g. by member shown as an arm). After delivery the material encapsulation can be removed from the payload at the destination. See FIG. 4B. As indicated schematically and representationally according to an exemplary embodiment in FIGS. 4C and 4D, the pod O may be formed (e.g. molded) in any of a wide variety of shapes including aerodynamic shapes and features (such as surface E) as to facilitate flight dynamic for the UAV/craft with pod (carrying payload L). According to an exemplary embodiment, the formed pod is attachable to the UAV/craft by a carrier such as the structure UM or other carrier arrangement. See for example FIGS. 4A-4C, 8A-8B and 23.

Figure 5A:
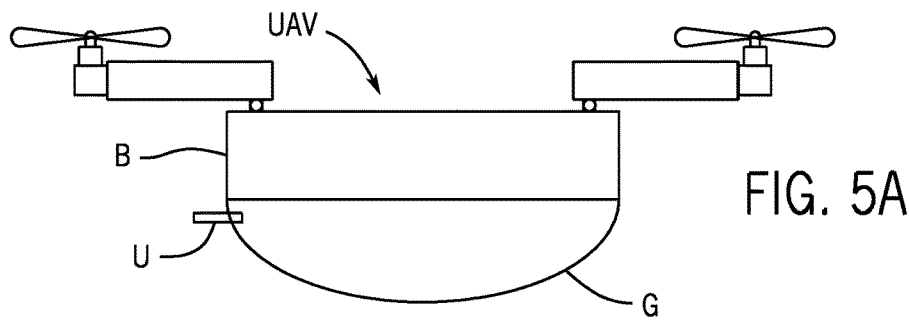
FIGS. 5A to 5D are schematic side elevation views of an unmanned aircraft system with craft and pod of a containment system for payload according to an exemplary embodiment.
Figure 5B:
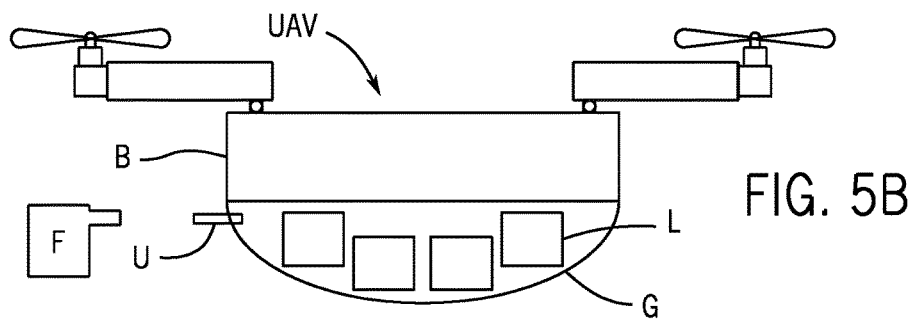
Figure 5C:
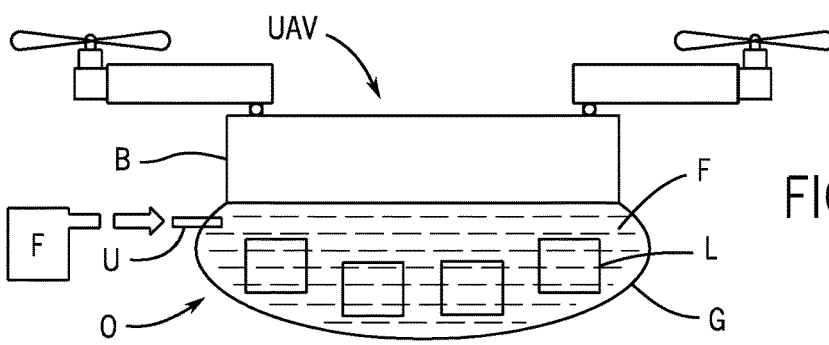
Figure 5D:
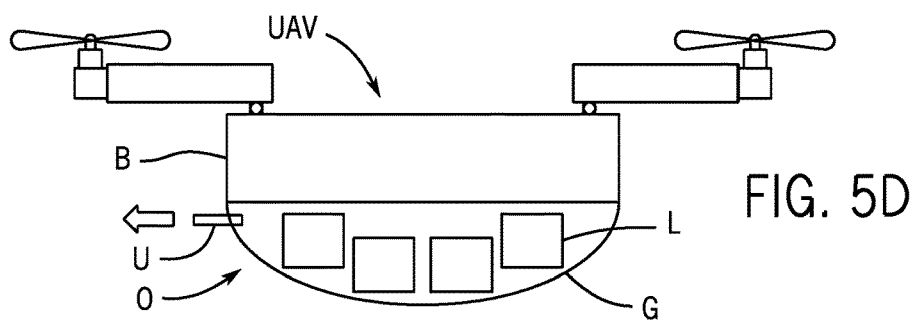
Figure 5E:
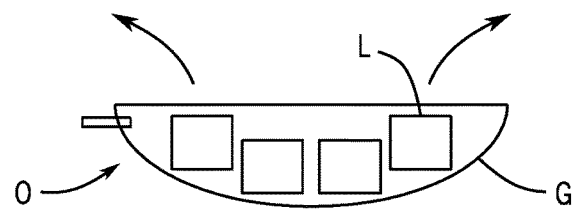
FIG. 5E is a schematic side elevation view of the pod of a containment system for payload according to an exemplary embodiment.
Figure 6A:
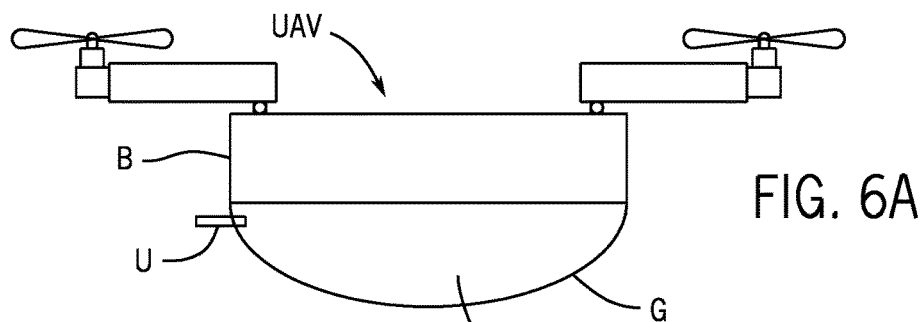
FIGS. 6A to 6D are schematic side elevation views of an unmanned aircraft system with craft and pod of a containment system for payload according to an exemplary embodiment.
Figure 6B:
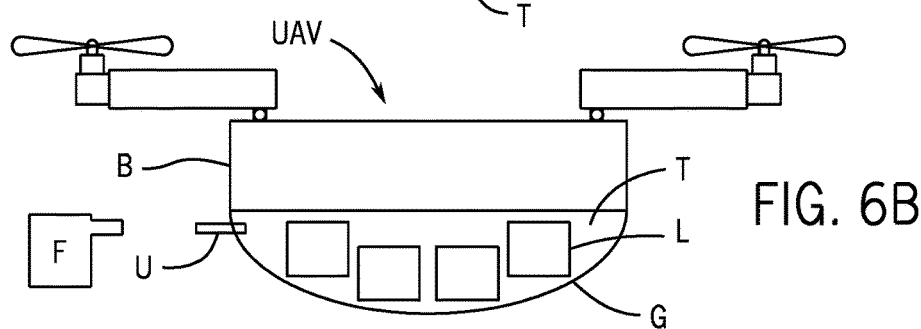

Referring to FIGS. 5A through 5E and 6A through 6C, arrangements for a pod O attachable to an aircraft are shown schematically and representationally according to an exemplary embodiment and alternative embodiments. According to an exemplary embodiment the containment system with the pod O may provide a carrier shown as body G formed of a structure such as from a flexible sheet or form configured to contain and carry a payload L (e.g. one payload segment or multiple payload segments such as containers and packages) as indicated in FIGS. 5B and 6B.

Referring to FIGS. 5A through 5E, according to an exemplary embodiment deployment of the containment system with pod O is shown schematically and representationally, in sequence before cargo loading (FIG. 5A) and during or after cargo loading (FIG. 5B). According to an exemplary embodiment, the pod O can be inflated or filled with a gas or fluid (at an inlet/outlet, filler/valve, etc. shown as a tube/stem U) to provide a form or structure for containment and protection or enhancement for the payload L to be carried to the destination (see FIG. 5C); at the destination the gas or fluid inflated fill F can be evacuated (see FIG. 5D) and the pod O can be removed from the craft so that payload (e.g. containers or packages) can be removed (see FIG. 5E). As indicated schematically and representationally in FIGS. 5A though 5E, according to an exemplary embodiment the system and method can be configured so that the pod can be loaded and then inflated prior to flight (e.g. by the originator/customer and/or by the transporter/carrier) or inflated during flight (e.g. to adjust flight dynamics, in anticipation of a risk to the payload or craft, upon sensing impact or fire, etc.). See FIGS. 35A-35B, 36A-36B and 37A-37C. See also FIGS. 25A to 25O.

Figure 6C:
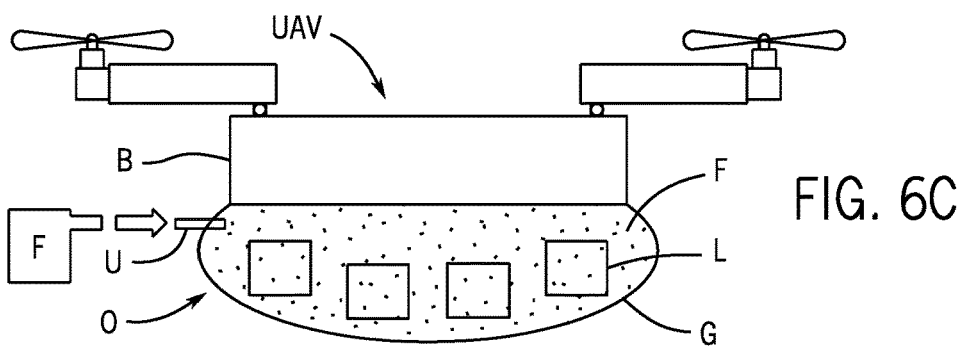
Figure 6D:
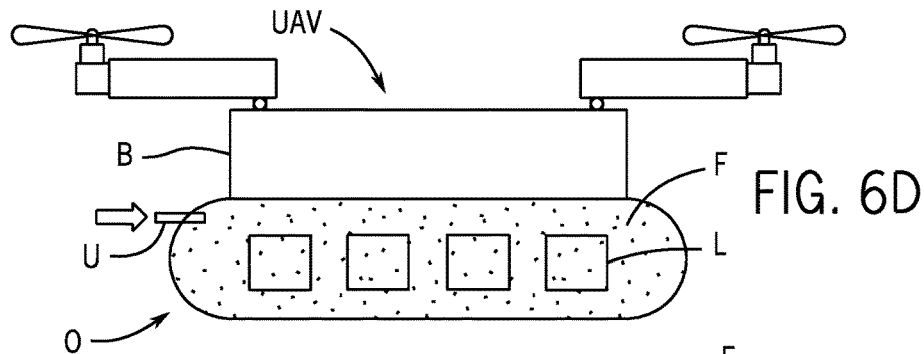
Figure 6E:
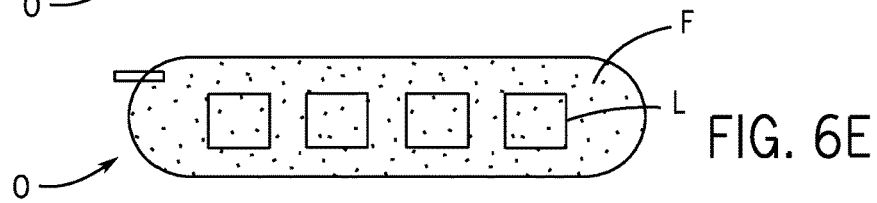
FIG. 6E is a schematic side elevation view of the pod of a containment system for payload according to an exemplary embodiment.

Referring to FIGS. 6A through 6C, according to an exemplary embodiment shown schematically and representationally, the pod O of the containment system provides a container C that can be inflated/filled (e.g. through a tube U). According to an exemplary embodiment, the inflated or filled material can be a foam or packing material F (e.g. a foam/plastic or protective material such as urethane or cushion/pad material or other compound used for packaging) encapsulating the payload L within the containing body G (e.g. formed by a flexible material) providing pod O. As indicated schematically and representationally in FIGS. 6C and 6D, the foam/packing material F can provide a form to the pod O (e.g. an aerodynamically advantaged shape or profile may provide a reduced drag coefficient or enhanced aerodynamic performance). See also FIGS. 4C-4D and 25M-25N. According to an exemplary embodiment as shown schematically in FIG. 6E the encapsulated payload L can be removed from the craft UAV during a mission or after delivery. See also FIGS. 4B to 4D and 25A-25D.

According to an exemplary embodiment indicated schematically in FIGS. 1A-1G, 2A-2F, 12A-12F, 25A-25D, 25L-25O, the pod O of the containment system (to carry payload L) may be configured to provide enhanced aerodynamic performance including (but not limited to) by taking an aerodynamic shape/form, providing surface effects, comprising aerodynamic control surfaces that may generate lift or manage aerodynamic torque, etc. The pod of the containment system may be shaped to enhance aerodynamic control and performance (e.g. reduce drag, generate/increase lift, facilitate control of aerodynamic torque/forces, etc.). For example, a pod may be inflated and/or deflated while being carried in flight by a UAV/craft to adjust aerodynamic effects/performance of the UAV/craft with pod (see FIGS. 25A-25B); control surfaces on the pod may be adjustable under operation of a control system while being carried in flight by a UAV/craft to adjust aerodynamic effects/performance of the UAV/craft with pod (see FIGS. 2B-2F, 12A-12F, 35B, 36B and 37A-37C). According to an exemplary embodiment, inflatable cargo pod may be shaped to control aerodynamic performance/forces on the payload (and hence on the UAV/craft); aerodynamic performance may be to reduce drag to generate lift, etc. (as indicated schematically). The inflation or shape of the pod carried by the UAV/craft may be dynamically controlled during the flight (e.g. based on speed, conditions, etc). (According to an exemplary embodiment, surface of the pod may be dynamically rippled to reduce drag.) Inflation of cargo pod (or portion thereof) may act to attach the pod to the UAV/craft (e.g., inflating into a concave volume in UAV/craft hull, inflating around a knob or rail, etc.). See FIGS. 10A-10B and 11A-11B. An inflatable pod may have multiple compartments selectively inflated to match size/shape of cargo (e.g. not to hold cargo, but to match cargo size/shape). The inflation may be by a gas or a liquid (e.g. fill material); the fill material may be formulated to solidify into a foam. (Foam may be used to contain or protect the payload from impact or fire.) The fill/inflation of the pod may be performed by the customer or transporter or other provider (typically inflation may be performed by the transporter).

Figure 7A:
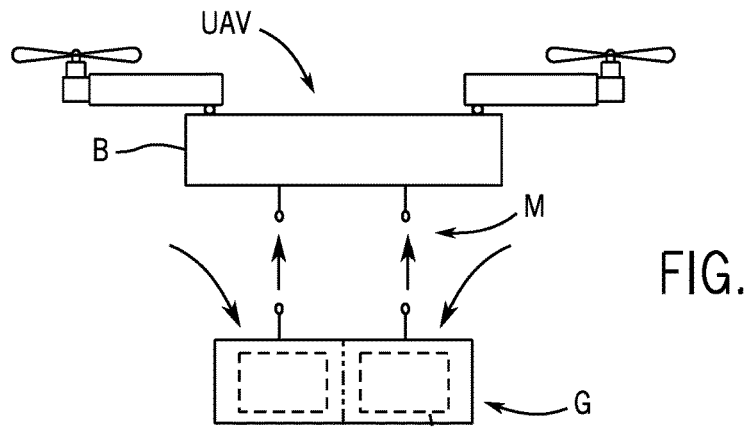
FIGS. 7A to 7D are schematic side elevation views of an unmanned aircraft system with craft and pod of a containment system for payload according to an exemplary embodiment.
Figure 7B:
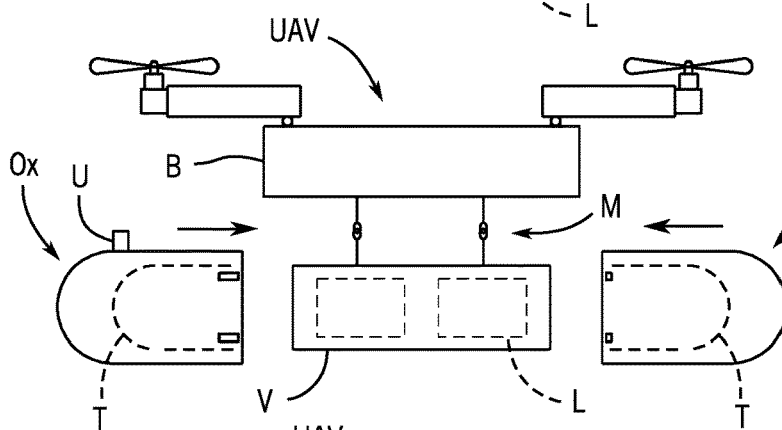
Figure 7C:
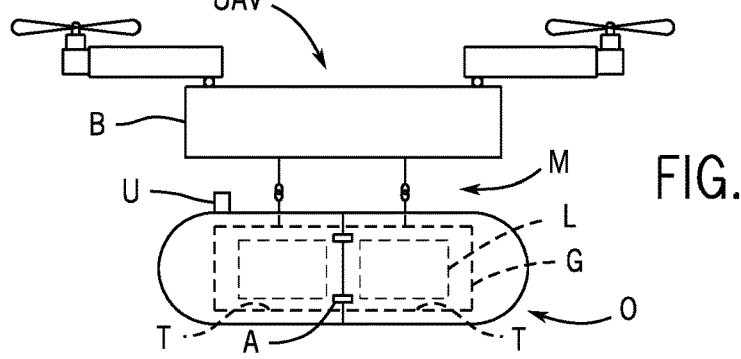
Figure 7D:
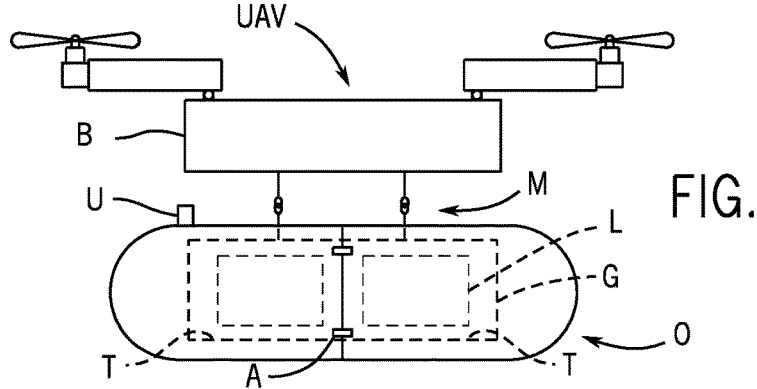

Referring to FIGS. 7A to 7C a configuration for attachment of a payload to an aircraft UAV is shown schematically and representationally according to an exemplary embodiment. As shown in FIGS. 7B and 7C, a pod or shell O (e.g. section Ox and section Oy) may be attached and secured around the payload (e.g. containers or packages, see FIG. 7A) and secured to protect the payload L after attachment to the craft during flight and delivery; at the destination the pod or shell O can be removed and the payload released from attachment and/or containment in the pod and aircraft for delivery. As shown according to an exemplary embodiment schematically and representationally in FIGS. 7A-7C, payload L is contained in a compartment T with carrier that can be configured within the pod O (e.g. section Ox and section Oy) attached to aircraft UAV at base B (e.g. by connectors of any suitable type); pod O can be secured by a mechanism such as a latch (see FIGS. 8A-8B and 9A-9B) to retain sections of pod O around the compartment T. According to an exemplary embodiment as shown schematically in FIG. 7D, the pod may be filled or inflated (e.g. through tube U) and may take an enlarged (e.g. inflated) form (e.g. sealed at interface of sections of cover). As indicated, the pod may be selectively inflated to provide a form and/or structure to facilitate aerodynamic performance of the UAV/craft with pod. See also FIGS. 1A-1B and 4C-4D.

Referring to FIGS. 8A-8B and 9A-9B, schematic diagrams of mechanisms for use with a pod O or craft UAV (e.g. as may comprise the carrier) are shown schematically and representationally according to an exemplary embodiment. FIGS. 8A and 8B show in schematic, form a clasp and loop arrangement K as may be used to attach payload to an aircraft. See also FIG. 7A. Referring to FIGS. 9A and 9B, a latch mechanism A may be used to attach sections of a pod or shell is shown in a clasped (see FIG. 9B) and unclasped (see FIG. 9A) arrangement (e.g. to secure and/or seal the compartment of the pod). See also FIG. 7C (indicating schematically the use of a mechanism to secure pod or shell sections).

Figure 10A:
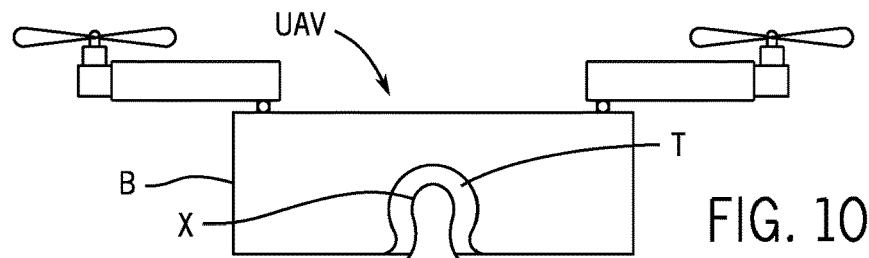
FIGS. 10A and 10B are schematic side elevation views of an unmanned aircraft system with craft and pod of a containment system for payload according to an exemplary embodiment.
Figure 10B:
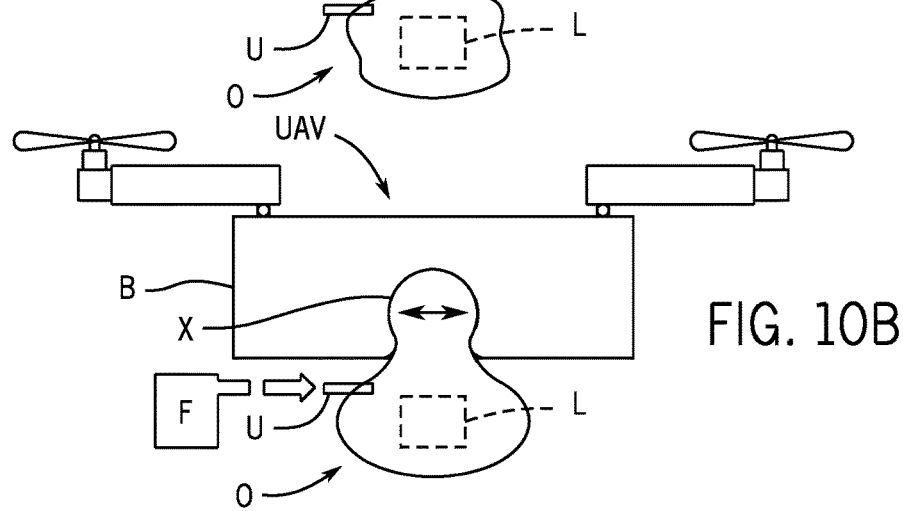
Figure 11A:
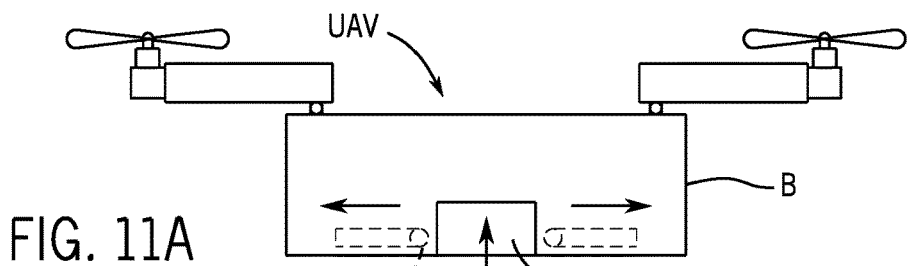
FIGS. 11A and 11B are schematic side elevation views of an unmanned aircraft system with craft and pod of a containment system for payload according to an exemplary embodiment.
Figure 11B:
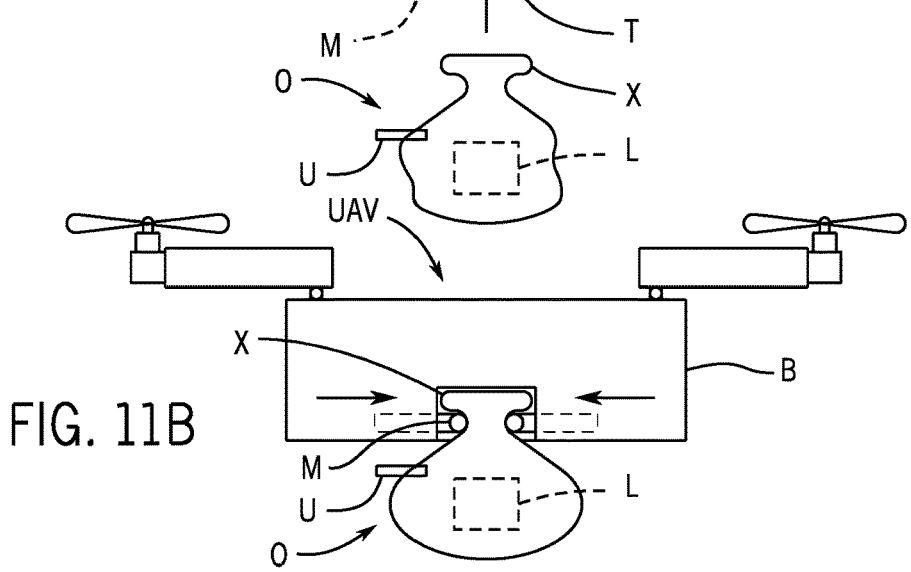

Referring to FIGS. 10A and 10B according to an alternative arrangement, a pod O of the containment system may be provided in a form that is fillable (e.g. bag, balloon, pouch, etc.); the fillable structure or form (e.g. bag) of pod may engage the UAV/craft with a carrier mechanism or arrangement, shown schematically and representationally, as a neck and head arrangement X configured to fit within an accompanying receptacle or compartment T in or associated with the base B of the UAV/craft. According to an exemplary embodiment, as indicated in FIGS. 10A-10B, attachment of the pod to the aircraft can be achieved by inflating or filling the pod such that the head and neck section X will expand to fill and fit within the receptacle T in the base B of the UAV/craft (aircraft). Referring to FIGS. 11A and 11B, a mechanical arrangement M for securing the top P (e.g. cap, holder, projection, neck and head etc.) of a pod is shown schematically and representationally according to an exemplary embodiment; the mechanism/arrangement M comprises a set of movable members or arms (e.g. providing a catch or latch or trap at the base of the aircraft) that tighten or engage around the neck of the pod once the head X is inserted into the receptacle T in the base of the aircraft. As indicated schematically and representationally according to an exemplary embodiment, the arrangement of a type shown in FIGS. 10A-10B and 11A-11B could be configured to provide for a payload/cargo drop (e.g. at a delivery location or in the event of a risk to the craft/payload) without stopping or landing the UAV/craft (e.g. by releasing the pod from the compartment/receptacle by partially deflating or unlatching the pod). See for example FIGS. 10A-10B and 11A-11B.

As indicated schematically and representationally according to an exemplary embodiment, the pod of the containment system with carrier is configured to carry payload (shown schematically as a package or container in FIGS. 10A-10B and 11A-11B) and to be carried by the aircraft; as indicated schematically and representationally any of a wide variety of mechanisms and/or arrangements can be used to configure and carry payload. According to an exemplary embodiment and other/alternative embodiments of the apparatus, system and methods.

Figure 12A:
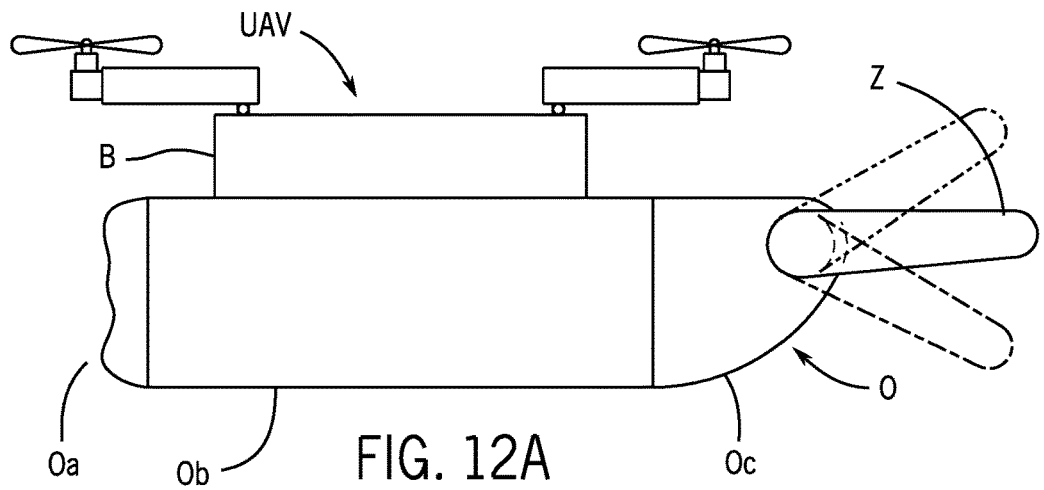
FIG. 12A is a schematic side elevation view of an unmanned aircraft system with craft and pod of a containment system for payload according to an exemplary embodiment.
Figure 12B:
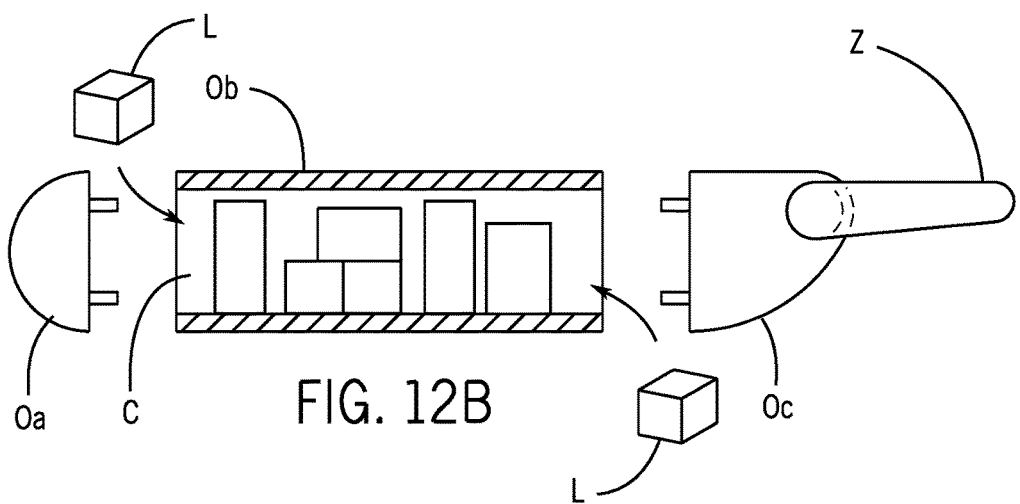
FIG. 12B is a schematic side elevation view of the pod of a containment system for payload according to an exemplary embodiment.
Figure 12C:
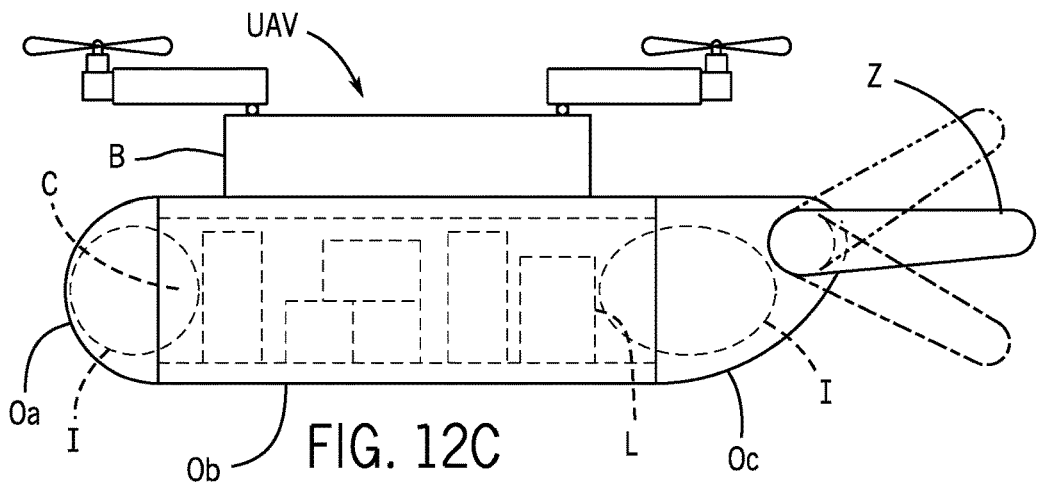
FIG. 12C is a schematic side elevation view of an unmanned aircraft system with craft and pod of a containment system for payload according to an exemplary embodiment.

Referring to FIGS. 12A-12F and 13A-13C as shown schematically and representationally according to an exemplary embodiment, a pod O of the containment system with carrier may comprise a multi-segment configuration providing a nose section Oa, a base Ob or body and a tail section Oc. As indicated in FIG. 12B the base or body Ob of the pod O may be loaded with payload such as containers and packages L. The nose section and tail section may then be secured to the base or body to form the complete pod structure (e.g. by such as a fastener A, latch mechanism, etc. with a seal) and attached to the aircraft by a carrier to be carried for flight on the mission. As indicated in FIGS. 12A and 12C the tail section of pod O may provide a fixed or movable or reconfigurable fin or rudder (e.g. flight control surface Z) configured to assist or enhance aerodynamics performance of the pod and UAV/craft.

Figure 12D:
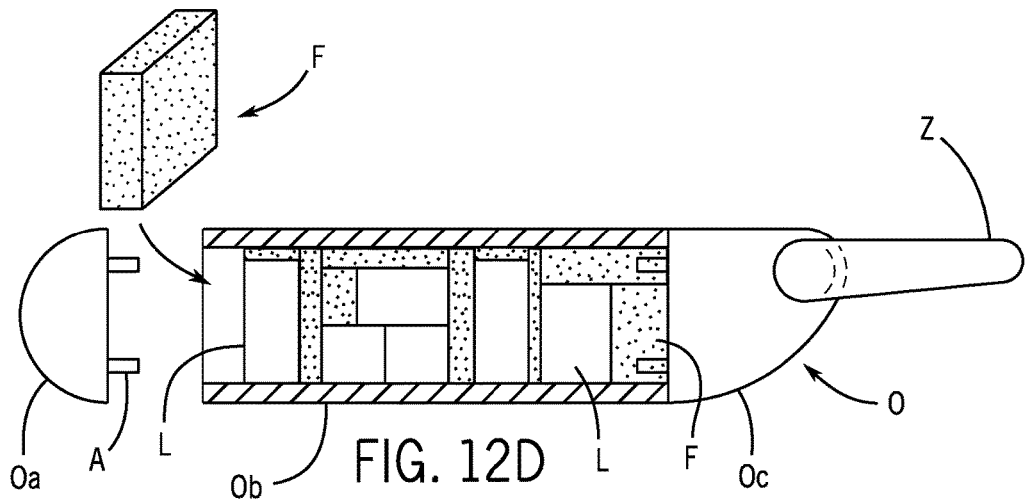
FIG. 12D is a schematic side elevation view of the pod of a containment system for payload according to an exemplary embodiment.
Figure 12E:
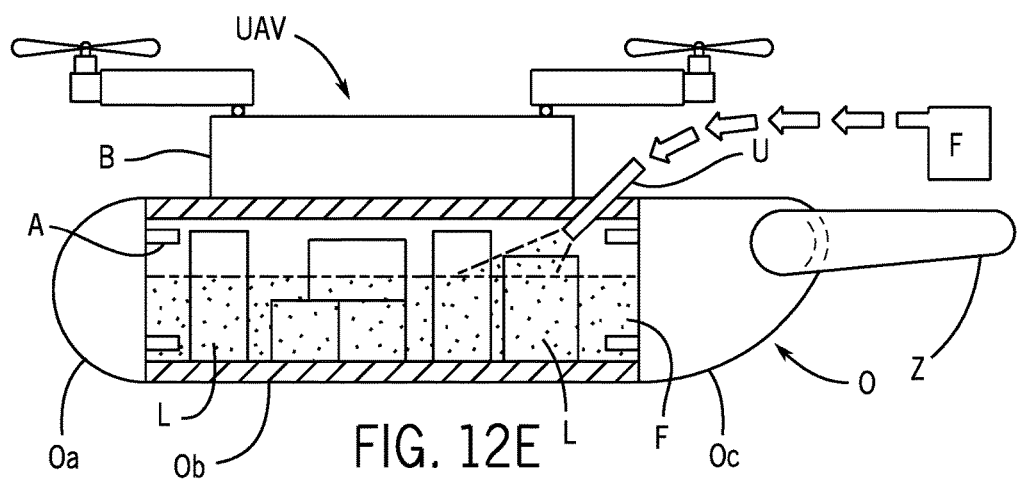
FIGS. 12E to 12F are schematic side elevation views of an unmanned aircraft system with craft and pod of a containment system for payload according to an exemplary embodiment.
Figure 12F:
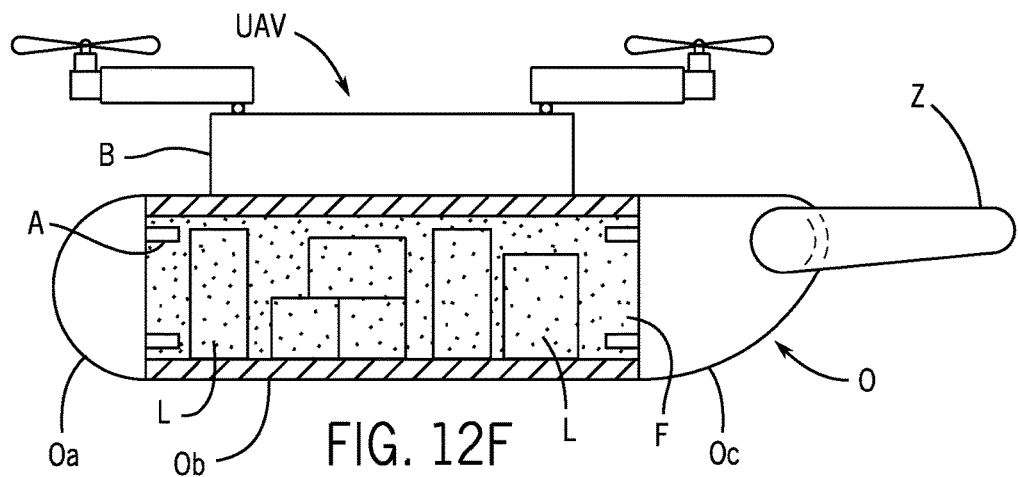

As indicated schematically and representationally according to an exemplary embodiment in FIGS. 12D through 12F, the base Ob or body of the pod may be configured to carry payload such as containers and packages L and a fill F to provide protection for the payload; as indicated in FIG. 12D the fill may comprise pads F or inserts (e.g. foam/packing segments) inserted between and around payload sections L (e.g. containers and packages); as shown in FIG. 12E the protection may comprise a fill material F (e.g. foam fill) inserted into the base or body after it is loaded with the payload segments. As indicated schematically in FIG. 12C according to an exemplary embodiment, the compartment T of the pod O may be filled wholly or partially with an inflated/padded or inflatable segment I. According to any preferred embodiment the fill or pad inserts will be configured to protect/secure and manage/contain payload in the base or body, for example to balance and distribute and maintain the spacing and position of payload within the base or body. As indicated schematically and representationally, the base or body can be loaded with payload contained in a manner to achieve an intended mass/load balance which is maintained by the fill/inserts during the flight/mission.

According to an exemplary embodiment indicated schematically in FIGS. 1A-1G, 2A-2F, 12A-12F, 25A-25D, 25L-25O, the pod O of the containment system (to carry payload L) may be configured to provide enhanced aerodynamic performance including (but not limited to) by taking an aerodynamic shape/form, providing surface effects, comprising aerodynamic control surfaces that may generate lift or manage aerodynamic torque, etc. The pod of the containment system may be shaped to enhance aerodynamic control and performance (e.g. reduce drag, generate/increase lift, facilitate control of aerodynamic torque/forces, etc.). For example, a pod may be inflated and/or deflated while being carried in flight by a UAV/craft to adjust aerodynamic effects/performance of the UAV/craft with pod (see FIGS. 25A-25B); control surfaces on the pod may be adjustable under operation of a control system while being carried in flight by a UAV/craft to adjust aerodynamic effects/performance of the UAV/craft with pod (see FIGS. 2B-2F, 12A-12F, 35B, 36B and 37A-37C). According to an exemplary embodiment, inflatable cargo pod may be shaped to control aerodynamic performance/forces on the payload (and hence on the UAV/craft); aerodynamic performance may be to reduce drag to generate lift, etc. (as indicated schematically). The inflation or shape of the pod carried by the UAV/craft may be dynamically controlled during the flight (e.g. based on speed, conditions, etc). (According to an exemplary embodiment, surface of the pod may be dynamically rippled to reduce drag.) Inflation of cargo pod (or portion thereof) may act to attach the pod to the UAV/craft (e.g., inflating into a concave volume in UAV/craft hull, inflating around a knob or rail, etc.). See FIGS. 10A-10B and 11A-11B. An inflatable pod may have multiple compartments selectively inflated to match size/shape of cargo (e.g. not to hold cargo, but to match cargo size/shape). The inflation may be by a gas or a liquid (e.g. fill material); the fill material may be formulated to solidify into a foam. (Foam may be used to contain or protect the payload from impact or fire.) The fill/inflation of the pod may be performed by the customer or transporter or other provider (typically inflation may be performed by the transporter).

Referring to FIGS. 13A through 13C, a configuration of the containment system with a pod O providing an internal compartment C with multiple configurations of payload containment and/or securement is shown schematically. Configurations within the pod may include apparatus S (e.g. carriers, shelves, walls, racks, slats, supports, attachments, hooks, hangers, etc. of a known/conventional type for storage) for support of payload L (e.g. packages and containers) in compartment C (e.g. enclosed within pod O). As indicated in FIG. 13B, the base Ob or body and/or nose Oa and tail of the pod Oc of the containment system may be configured to carry payload (e.g. in addition to the central base or body). As indicated in FIG. 13B, according to an exemplary embodiment the nose and tail of the pod O may be hinged for attachment to the body and openable to expose compartments for loading with payload (and secured by a mechanism such as latch A). As indicated in FIG. 13C, payload L may be loaded and distributed in any of a wide variety of arrangements in compartment C to achieve balance and distribution and/or generally efficient carrying of payload in the pod O by the aircraft UAV when the pod O is attached for the aircraft UAV for delivery (e.g. load distribution/balancing); inflatable or padded segments or forms I may be used to secure/protect and manage/contain cargo items within the compartment of the pod during the mission of the UAV/craft.

Referring to FIGS. 14A-14B and 15A-15B as shown schematically and representationally according to an alternative embodiment, a pod O of the containment system may contain a receptacle C into which a container such as payload item L may be inserted and carried; the pod with container can be attached to an aircraft and carried to the destination by the aircraft; at the destination the container inserted into the pod O before flight may be removed from the pod O and delivered. As indicated schematically and representationally in FIGS. 14A and 14B, the pod O may be configured to carry/fit at least some portion of the cargo (e.g. partial containment); the pod may be at least partially inflatable (or fillable) into a form or structure (e.g. aerodynamic form). See also FIGS. 1A-1F. Referring to FIGS. 15A and 15B as shown schematically and representationally according to an exemplary embodiment, a pod O may be configured with a removable securable lid D or sealable cover for an opening through which containers and packages may be inserted in the pod structure to be carried by the containment system when attached with a carrier to the aircraft; as indicated schematically and representationally the lid may be removed while packages are inserted (or removed) (and filled or inflation is performed) and then attached/sealed for carrying flight to the destination for delivery. See FIG. 15A. According to an exemplary embodiment, inflatable or padded segments or forms I may be used to secure and protect and maintain cargo items within the compartment of the pod during the mission of the UAV/craft. See FIG. 15B.

Figures 16A, 16B:
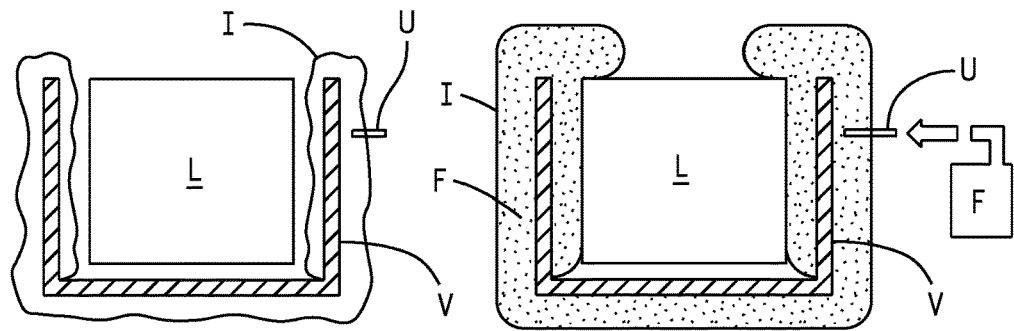
FIGS. 16A to 16E are schematic elevation views of an apparatus providing the pod of a containment system of the system according to an exemplary embodiment.
Figure 16C:
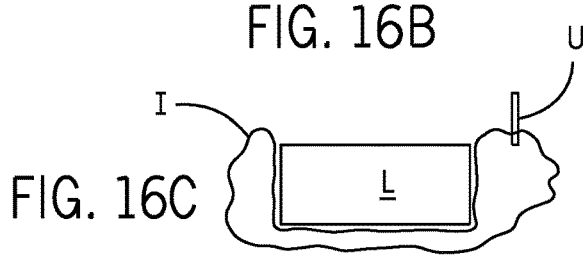
Figure 16D:
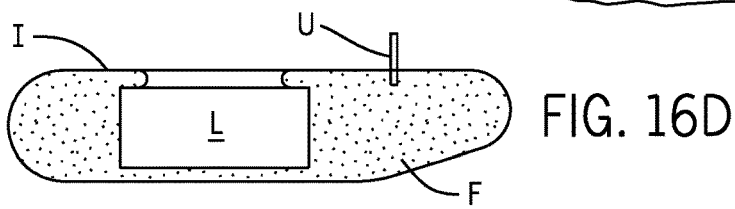
Figure 16E:
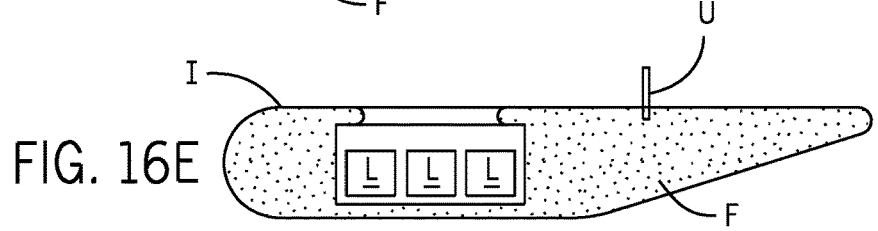
Figures 17A, 17B:
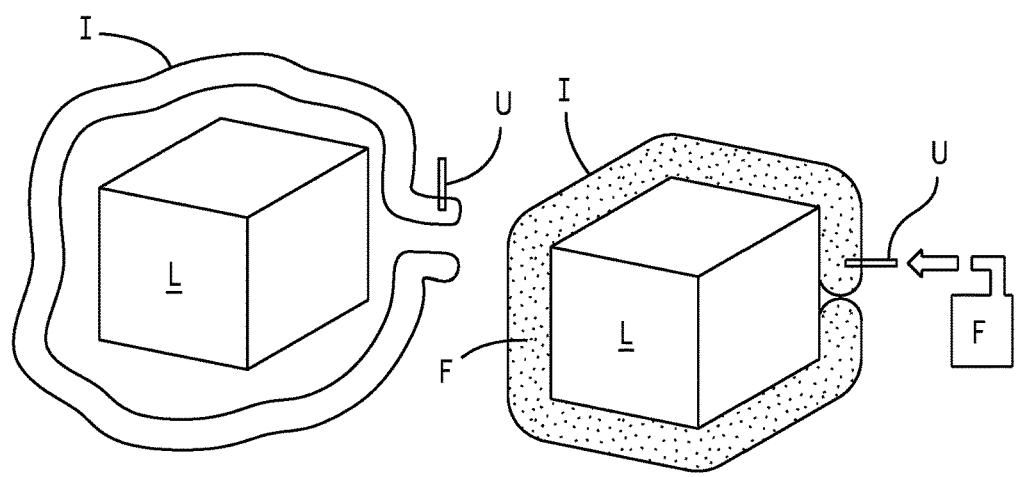
FIGS. 17A and 17B are schematic perspective diagrams of an apparatus providing the pod of a containment system of the system according to an exemplary embodiment.

Referring to FIGS. 16A and 16B, 16C to 16E, 17A and 17B shown schematically and representationally according to an exemplary embodiment, a pod O of the containment system may comprise an inflatable apparatus/arrangement I intended to secure a payload such as a package in the pod for management, carrying and distribution. See also FIGS. 37B-37C. As shown in FIGS. 16A and 16B the pod O may comprise an inflatable segment I (or set of segments) and a base structure V (e.g. a carrier/frame); a gas or liquid foam fill F from a source or system may be used to inflate the segment I of the pod (e.g. through tube U) to secure the package in the pod. See FIG. 16B. According to an alternative embodiment shown schematically in FIG. 16C, the pod O may comprise an inflatable arrangement I that is inflated (e.g. with a fill F from a source or system) around the shape of the package L (e.g. to conform to the shape of the package). See also FIGS. 17A, 17B and 37B-37C. According to an exemplary embodiment shown schematically and representationally in FIGS. 16D-16E, the pod may be configured so that when filled with a fill F from a source or system the structure generally will take an aerodynamically-enhanced form or shape containing the payload L (e.g. items of cargo). According to an exemplary embodiment, the pod can then be attached to/carried by the aircraft.

Figure 18A:
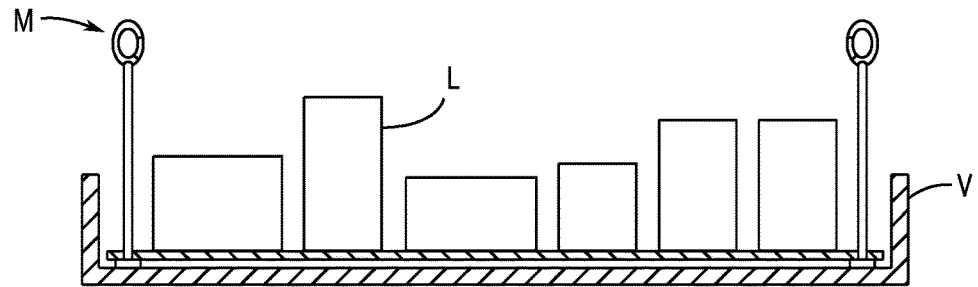
FIGS. 18A to 18C are schematic side elevation views of the pod for the containment system for payload according to an exemplary embodiment.
Figure 18B:
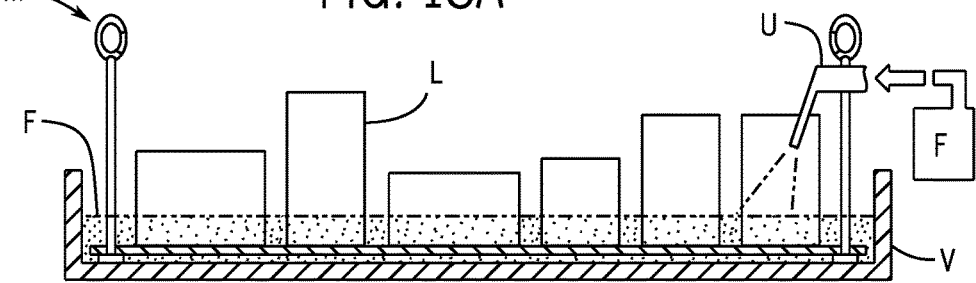
Figure 18C:
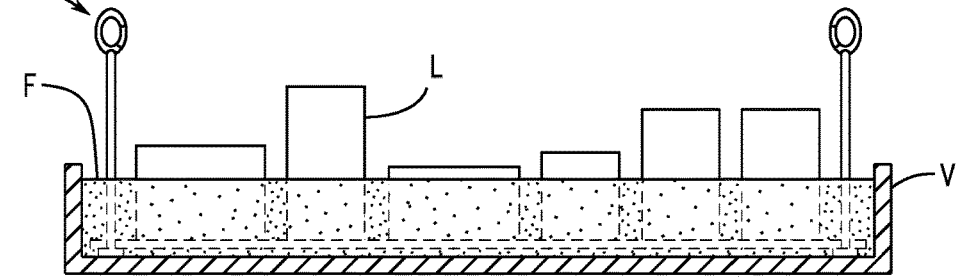
Figure 18D:
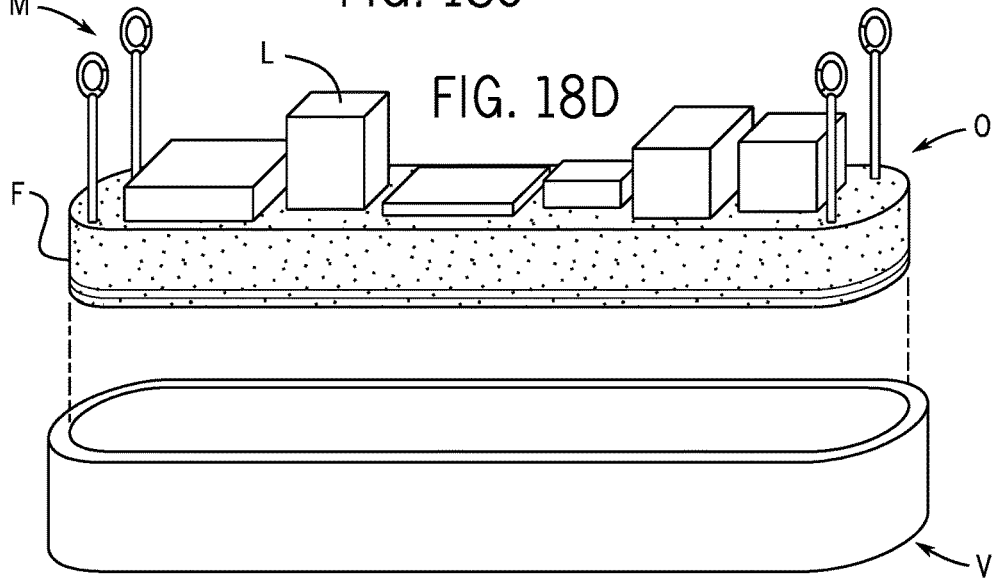
FIG. 18D is a schematic perspective view of the pod for the containment system for payload according to an exemplary embodiment.

Referring to FIGS. 18A through 18D as shown schematically and representationally according to an exemplary embodiment (or according to an alternative embodiment), a pod O of the containment system with carrier for packages can be formed around payload or packages L (e.g. using a formable foam material). See also FIG. 37B. As indicated schematically and representationally in FIG. 18A, payload may be placed or position on a carrier base V or mold form; as indicated in FIGS. 18B and 18C, a foam fill or material F may be supplied from a source or system (e.g. injected) in the mold/carrier in and around the payload; as shown in FIG. 18C the foam or fill may be allowed to set or cure to form a pod or carrier O for the payload; referring to FIG. 18D as shown schematically and representationally upon curing or setting the foam may form or provide at least partial encapsulation of packages in a formed pod arrangement that can be attached to an aircraft (after removal from the carrier or mold). See also FIG. 23. As indicated schematically and representationally according to an exemplary embodiment in FIGS. 18A through 18D, the pod may provide attachment points M for attachment to the aircraft (by a carrier with or without a carrier base).

Figure 19A:
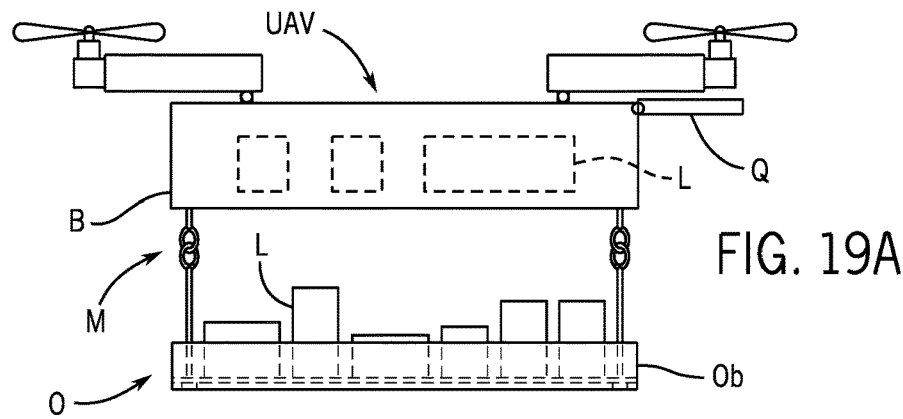
FIGS. 19A to 19C are schematic side elevation views of an unmanned aircraft system with craft and pod of a containment system for payload for the system according to an exemplary embodiment.
Figure 19B:
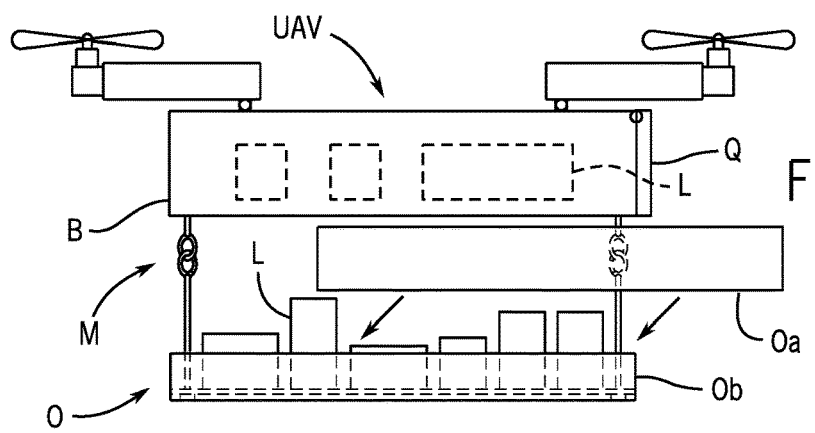
Figure 19C:
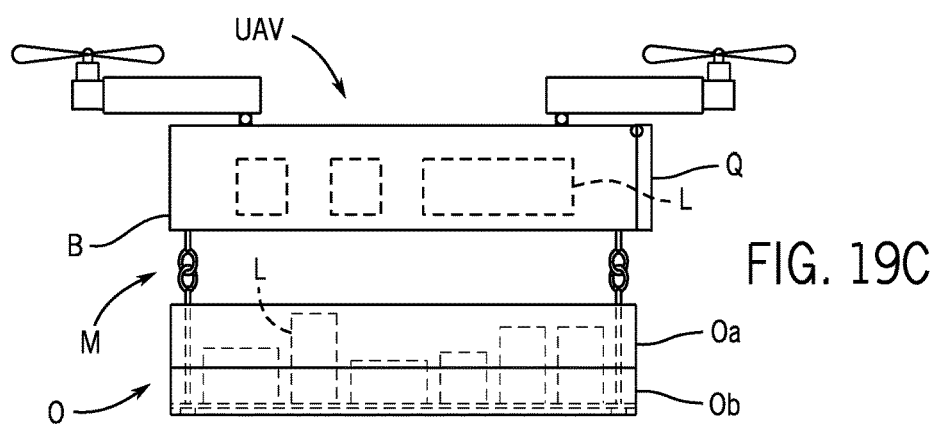
Figure 19D:
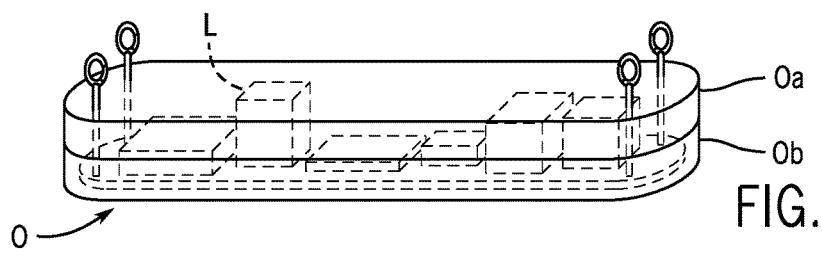
FIG. 19D is a schematic perspective view of the pod for the system with payload according to an exemplary embodiment.

As indicated schematically and representationally in FIGS. 19A through 19D according to an exemplary embodiment, payload L (e.g. packages) loaded in a pod O may be provided further aerodynamic enhancement and/or containment protection by a lid or cover Oa over a carrier base or body Ob of the containment system; lid or cover may be optionally used as needed to contain and protect and/or shield packages (or form a structural pod shape as indicated). A two-piece pod O comprising a base and lid or cover is shown in FIGS. 19B and 19C; the pod/carrier O (e.g. in combination) may take an aerodynamic form as designed and carried by the aircraft. See also FIG. 23. As indicated, the interior of the pod O may be filled with a fluid or material to protect payload segments L during transit on the mission/flight of the UAV/craft; as also indicated, the pod O when separated from the UAV/craft (e.g. before/after delivery) may function as a multi-mode carrier for the payload segments L (e.g. detached and loaded into another vessel such as a van, truck, rail, car, ship, etc.). See also FIGS. 35A-35B, 36A-36B, 37A-37C. As shown schematically and representationally according to an exemplary embodiment in FIG. 19D, the pod/carrier may be separated from the UAV/craft and filled/loaded with cargo by the originator and provided to the transporter for the mission then separated from the UAV/craft and unloaded at the destination.

As indicated schematically in the FIGURES, according to an exemplary embodiment the UAV/craft will be designed to carry payload externally in the containment system (with pod). According to an exemplary embodiment, the pod of the containment system may comprise a cargo pod. The cargo pod may completely enclose the payload or may just extend around a portion of the payload. To reduce drag (e.g. drag coefficient), weather exposure, or enhance crash protection the containment system may embed payload within an inflatable cargo pod. The pod may be streamlined to reduce drag coefficient; the pod may be foam-filled for crash/handling protection. The pod may be supplied by the transporter operating the UAV/craft or by the customer (who might preload payload in the inflatable pod). The pod may attach to the UAV/craft via standardized load points. The pod may be pre-inflated or might be inflated by the UAV/craft after attachment (e.g. as an externally carried payload is attached in an inflatable cargo pod). According to an exemplary embodiment, the containment system comprises attachment to the carrier. The payload may attach to the UAV/craft directly or via attachment points on the cargo pod to be carried by the UAV/craft on a mission. The pod may provide nose-cone and tail-cone and base areas (as front and back and center areas for containing cargo). See for example FIGS. 12A-12F.

Referring to FIGS. 20A through 20D as shown schematically and representationally according to an exemplary embodiment, a containment system may provide a multi-segment pod O comprising inflatable segments for payload L. As indicated schematically and representationally the pod O may comprise multiple separate inflatable segments that can be used to carry multiple corresponding payload segments (e.g. packages or containers C). As shown schematically and representationally according to an exemplary embodiment in FIGS. 20A-20D, the apparatus may be provided and/or configured in a variety of arrangements (e.g. to conform to the payload volume and configuration/quantity). As indicated schematically and representationally in FIGS. 20A-20D according to an exemplary embodiment, the set of pod segments may be inflated or filled (selectively) through a set of filler tube/stem U (e.g. filled with a gas or fluid, such as air, nitrogen, inert gas, etc.). See also FIGS. 1A-1F, 5C, 6C, 12E, 18B and 37B-37C. As shown in FIG. 20B, to configure the containment system (e.g. selectively dependent upon the payload amount) one inflatable/fillable pod segment C is used; as shown in FIG. 20C two inflatable/fillable pod segments are used; FIG. 20D each of three inflatable/fillable pod segments C is indicated to be carrying a payload segment. FIG. 20A indicates the empty inflatable/fillable pod (e.g. with no payload segments and uninflated). Referring to FIG. 21, an opening (e.g. zipper or zip lock Q or equivalent air-tight seal) is shown schematically and representationally according to an exemplary embodiment; packages may be inserted into each segment of the pod selectively through the opening; upon delivery or destination payload segments may be removed through the opening.

Figure 22A:
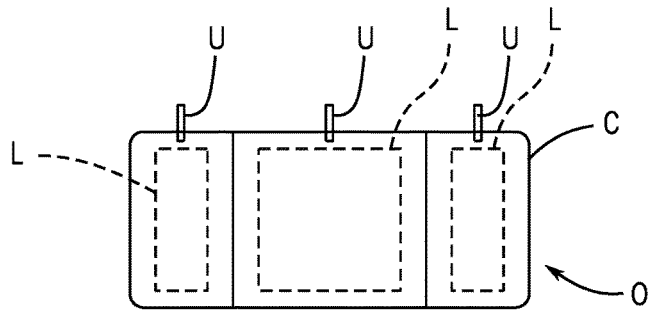
FIGS. 22A and 22B are schematic side elevation views of the apparatus for the pod of the containment system for payload according to an exemplary embodiment.
Figure 22B:
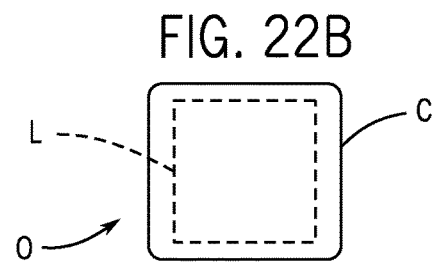
Figure 22C:
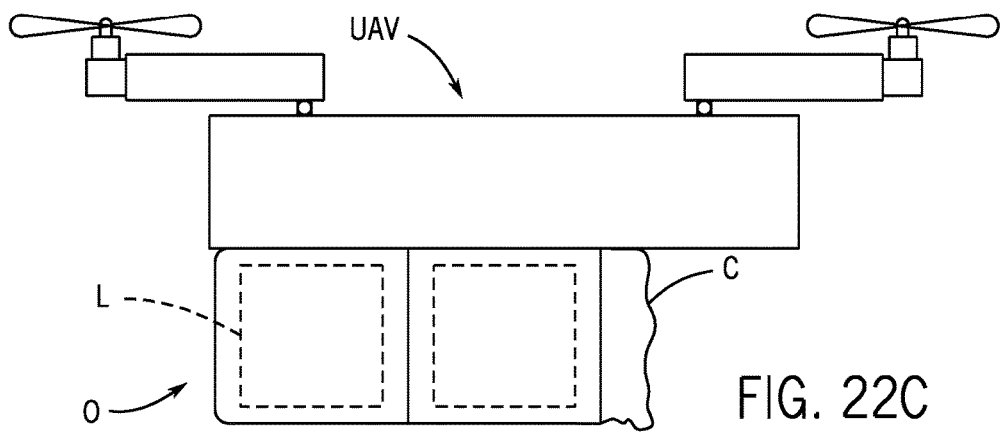
FIGS. 22C and 22D are schematic side elevation views of an unmanned aircraft system with craft and pod for containment system for payload according to an exemplary embodiment.
Figure 22D:
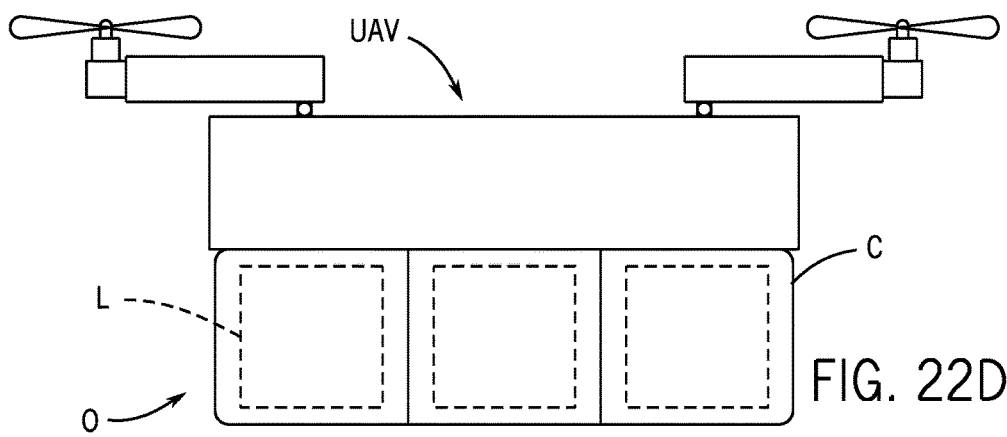

As shown schematically and representationally according to an exemplary embodiment in FIG. 22A through 22D pod segments may be provided in multiple sizes (e.g. corresponding to various payload segment sizes). Referring to FIGS. 22C and 22D the inflatable pod segments can be configured to be carried by a UAV/craft (e.g. using any suitable system/method for attachment); as indicated, the pod segments containing a payload segment may be inflated (and pod segments not in use may selectively be inflated or uninflated e.g. through tube/stem U). Compare FIGS. 22C (empty compartment) and 22D (each compartment loaded). See also FIGS. 35B, 36B and 37B-37C. As indicated schematically in FIGS. 20A-20D and 22A-22D, according to an exemplary embodiment the containment system (with pod/carrier) could be provided with any of a number of (and size of) compartments to be used (e.g. filled/inflated as needed selectively) to carry payload on the UAV/craft.

As indicated schematically and representationally in FIG. 23, according to an exemplary embodiment a variety of forms of pods/carriers may be provided by the containment system with a standard carrier attachment pattern to attach to an aircraft (e.g. regardless of variations in type or form). As indicated schematically and representationally, according to an exemplary embodiment pods/carriers may be provided in different shapes and of different forms and of different aerodynamic configurations/profiles to contain a variety of sizes, types, forms, quantity, etc. of payload items. See for example pod Oi (disk-shaped), pod Oj (box-shaped), pod Ok (foam/pad material) and Ol (aerodynamic form at pod) shown schematically according to an exemplary embodiment in FIG. 23. See also FIGS. 8A-8B. According to other exemplary embodiments other variations of form, shape, size, etc. of pod/carrier are possible as may be required to contain/carry any of a variety of payload items of different types; according to an exemplary embodiment any suitable type of carrier/attachment arrangement may be used with the containment system providing the carrier/attachment function to the UAV/craft. See FIGS. 35A-35B, 36A-36B, 37A-37C.

As indicated schematically and representationally according to an exemplary embodiment in FIGS. 24A through 24E, the payload L (e.g. payload segments) may fit within the container or compartment C provided by the pod O of the containment system and be managed/secured for flight with the aircraft UAV on a mission. See also for example FIGS. 8A-8B, 9A-9B and 23. According to an exemplary embodiment, the containment system may provide segments I in the pod to contain/secure payload carried by the UAV/craft. See FIGS. 24C and 24E. According to an exemplary embodiment indicated schematically in FIGS. 24A-24E, the pod segments may be configured to be deployed/inflated/deflated before/after or during flight or a mission. See FIGS. 35A-35B, 36A-36B and 37A-37C.

Referring to FIGS. 25A through 25D, a pod configuration of the containment system attached/attachable to an aircraft (e.g. by a carrier) is shown schematically and representationally according to an exemplary embodiment. As indicated schematically and representationally, the pod may be configured to carry any of a wide variety of payload segments (shown schematically as packages/containers). As shown schematically in FIGS. 25A/B and 25C/D, the pod can be inflated to secure and/or protect the payload and/or for purposes of flight dynamics/aerodynamic performance (e.g. reduce drag-coefficient) of the UAV/craft. As indicated according to an exemplary embodiment schematically in FIGS. 25A/B (inflated/filled when placed on craft) and FIGS. 25 C/D (inflated/filled before placed on craft) the pod can be configured before attached to the UAV/craft or during loading after attached to the craft (or during flight). As indicated schematically and representationally in FIGS. 25C-25D, the pod may be detached from the craft so that payload may be transported in the pod in a multi-modal route (e.g. by UAV/air, commercial/air, land/truck, rail, boat, etc.). See also FIGS. 1C-1F, 4C-4D, 5E, 6E, 13C, 14B, 15B, 19D, 20D, 22A, and 23.

Figures 25E, 25F, 25G, 25H:
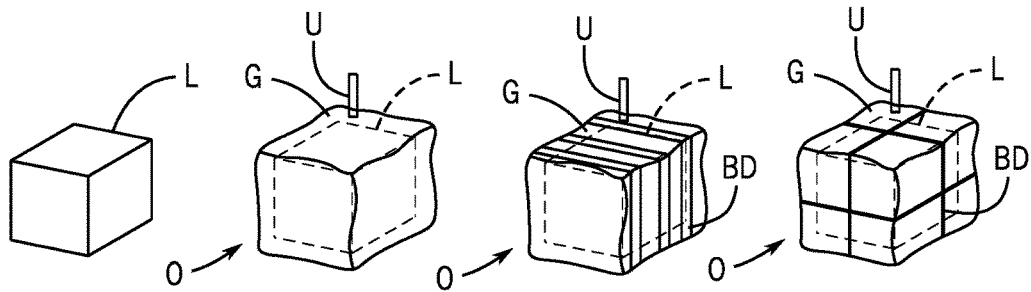
FIGS. 25E through 25H are schematic perspective views of payload for a pod of the containment system according to an exemplary embodiment.
Figures 25I, 25J:
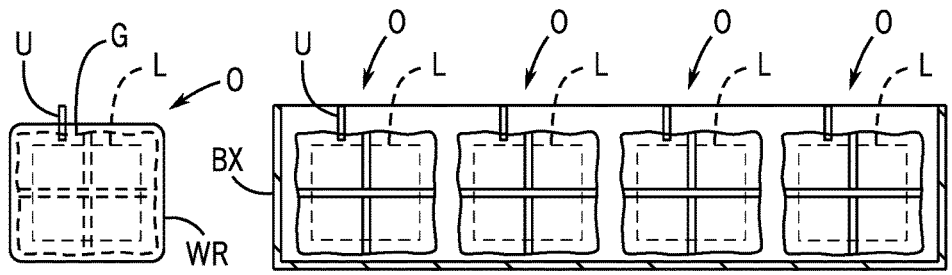
FIGS. 25I to 25L are schematic side elevation views of the pod of the containment system according to an exemplary embodiment.
Figures 25K, 25L:
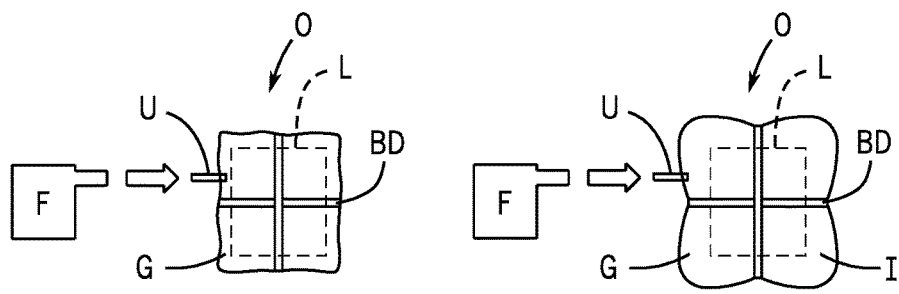
Figures 25M, 25N:
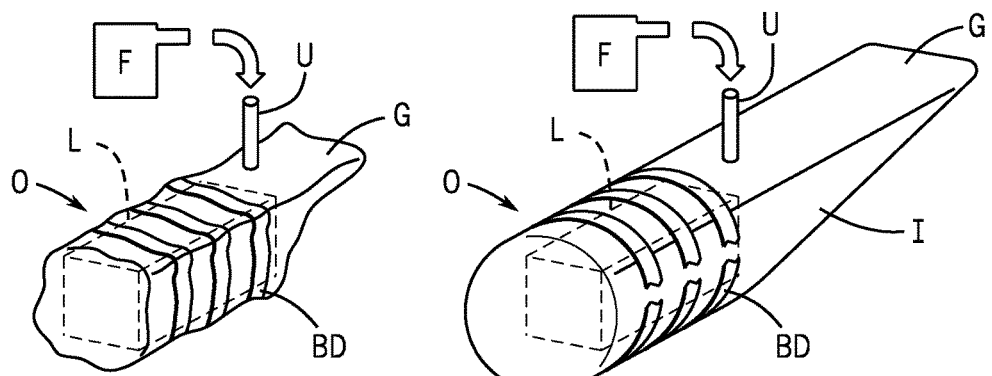
FIGS. 25M and 25N are schematic perspective views of the pod of the containment system according to an exemplary embodiment.
Figure 25O:
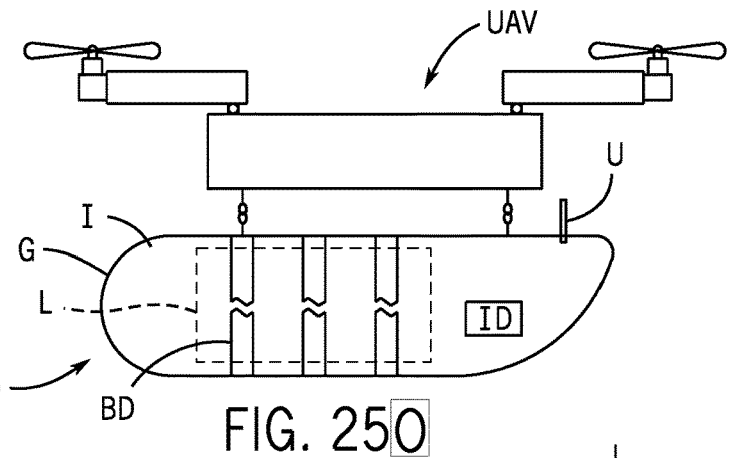
FIG. 25O is a schematic side elevation view of an unmanned aircraft system with craft and pod for containment system for payload according to an exemplary embodiment.

According to an exemplary embodiment shown schematically in FIGS. 25E to 25O, the containment system may be configured to provide an inflatable/fillable pod that comprises payload L (e.g. a payload item or items, see e.g. FIG. 25E) to be carried by a UAV/craft (see e.g. FIG. 25O). As indicated schematically according to an exemplary embodiment, the pod O may comprise an inflatable bag or enclosure into which the payload segment L is placed; as indicated, the pod (e.g. unfilled/uninflated) may be secured to or around the payload segment by a band or set of bands BD (e.g. a stretchable, elastomeric, tape, yieldable/tearable material, wrap, bind, etc.) shown as a tape/wrap (see FIGS. 25F and 25M-25N) and as a elastomeric band (see FIG. 25G). According to an exemplary embodiment, the originator may package the payload in the pod and carry the pod with payload to the transporter in a wrap WR (see FIG. 25H) or box/container BX (see FIG. 25I) by ground transport in a compact form/state (e.g. unfilled/uninflated and/or intended to be shielded from damage while in ground transport). As indicated schematically and representationally at and/or by the transporter (e.g. at a flight dispatch center such as an airport for UAV/craft or operations center) the pod O of the containment system can be filled/inflated with fill F (e.g. fluid such as a suitable gas) to take a form to be carried by the UAV/craft. See FIGS. 25K-25L and 25M-25N (inflated to expand/rupture bands BD). According to an exemplary embodiment shown schematically, payload contained with the pod with carrier for attachment to the UAV/craft is prepared for transport by flight (e.g. on a mission for delivery to a destination). See FIG. 25O. According to an exemplary embodiment, the pod may be configured with payload by an originator. The pod may be configured for the transporter in an uninflated condition. The pod may be secured for transport to the transporter (e.g. in a band, by tape, by a fabric, by an elastomer, etc.). According to an exemplary embodiment, the pod is transported to the transporter in an uninflated condition with payload. The pod may be inflated with the band removed and/or when secured in the band; the band may stretch and/or rupture when the pod is inflated. The band may comprise at least one of (a) tape; (b) tape strips; (c) tape wrap; (d) fabric segments; (e) tearable material; (f) elastomeric material; (g) stretchable material. See for example FIGS. 25E to 25O. According to an exemplary embodiment, the pod of the containment system may comprise a plastic bag (e.g. an inflatable bag of an elastomeric material). According to an exemplary embodiment in use payload is sealed in the pod; the pod is configured by inflation/deflation. (According to an exemplary embodiment, the pod is configured by at least partial inflation/deflation.) According to an exemplary embodiment, the containment system comprises a plurality of pods for payload attachable to the aircraft.

Figures 26A, 26B:
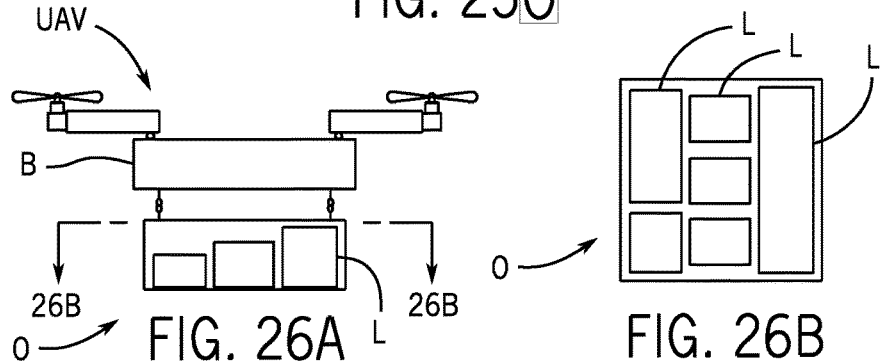
FIG. 26A is a schematic elevation view of an unmanned aircraft system with craft and pod of a payload management system with payload according to an exemplary embodiment.
FIG. 26B is a schematic top plan view of the pod of the system according to an exemplary embodiment.
Figures 27A, 27B:
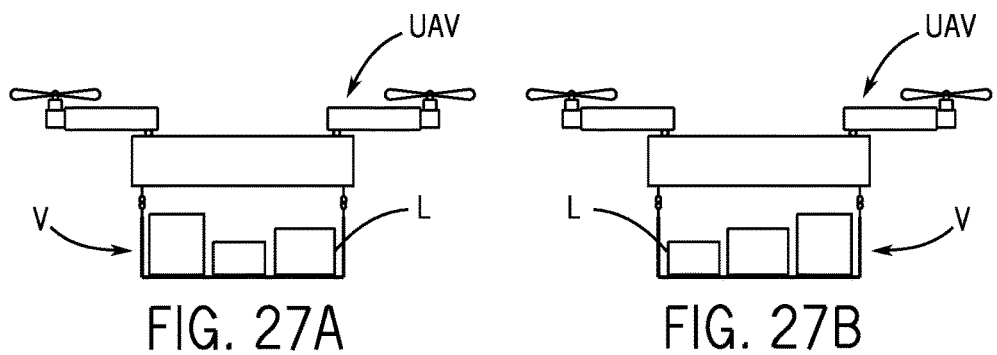
FIGS. 27A and 27B are schematic elevation views of an unmanned aircraft system with craft and pod for payload of the system according to an exemplary embodiment.
Figures 28A, 28B:
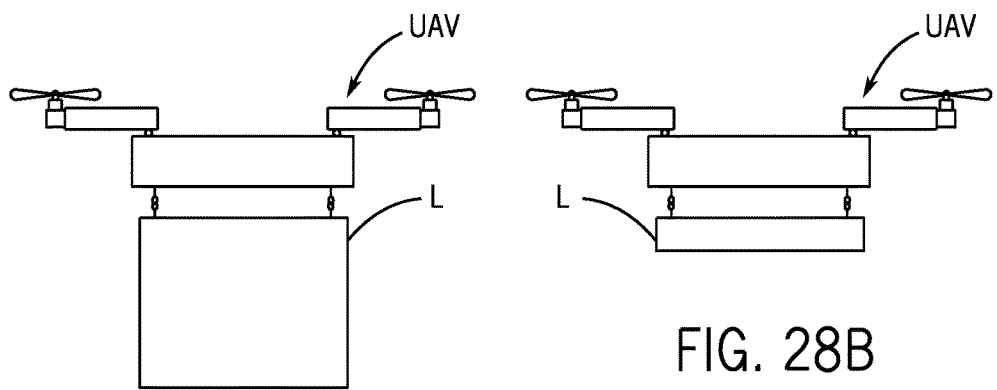
FIGS. 28A and 28B are schematic elevation views of an unmanned aircraft system with craft and pod for payload of the system according to an exemplary embodiment.
Figures 29A, 29B:
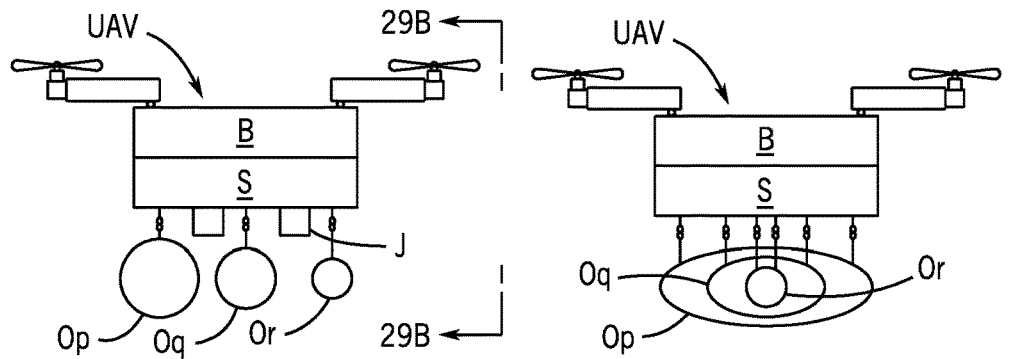
FIG. 29A is a schematic side elevation view of an unmanned aircraft system with craft and containment system for payload according to an exemplary embodiment.
FIG. 29B is a schematic rear elevation view of an unmanned aircraft system with craft and containment system for payload according to an exemplary embodiment.
Figures 29C, 29D:
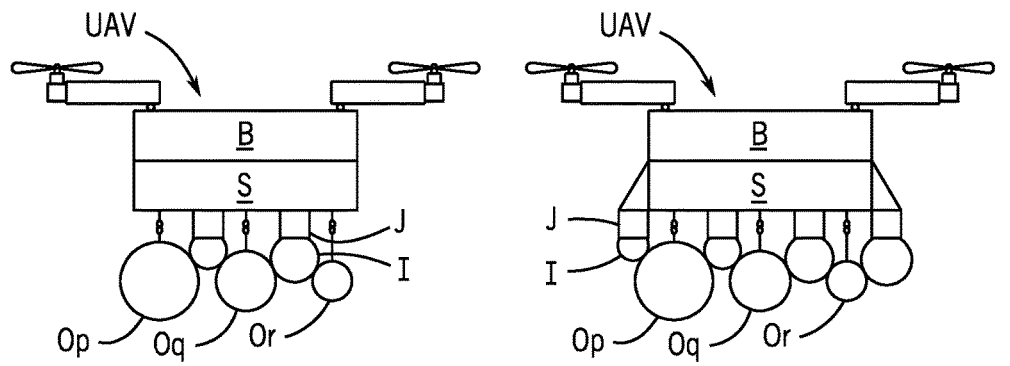
FIGS. 29C and 29D are schematic side elevation views of an unmanned aircraft system with craft and pod for containment system for payload according to an exemplary embodiment.
Figures 30A, 30B:
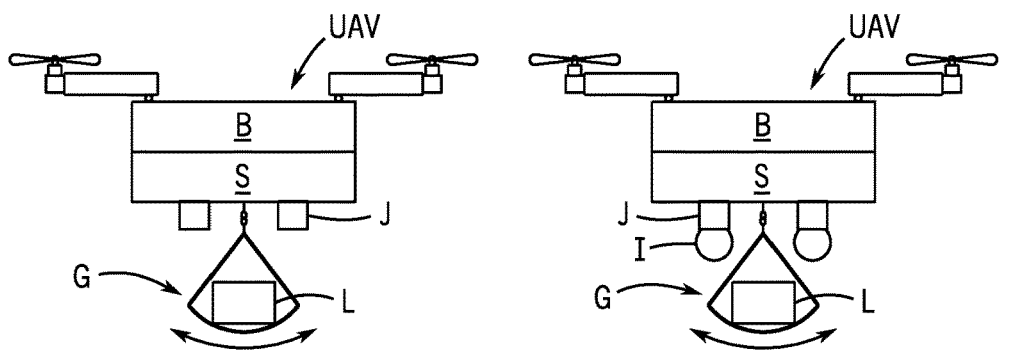
FIGS. 30A to 30D are schematic side elevation views of an unmanned aircraft system with craft and pod for containment system for payload according to an exemplary embodiment.
Figures 30C, 30D:
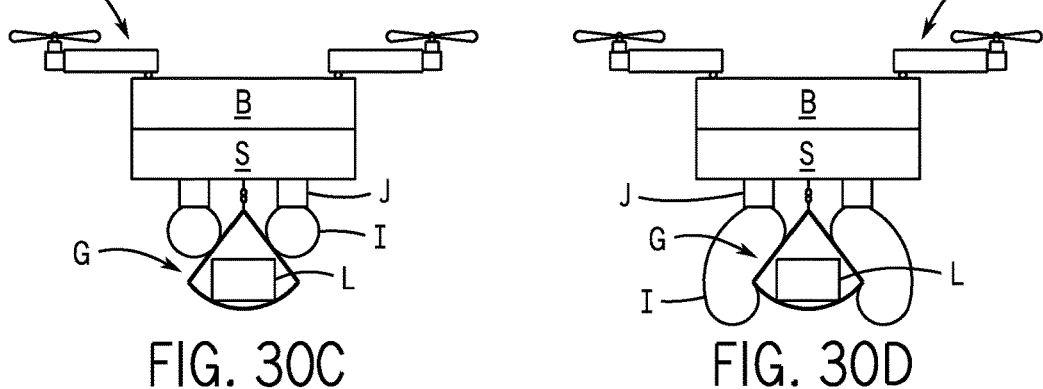
Figure 31A:
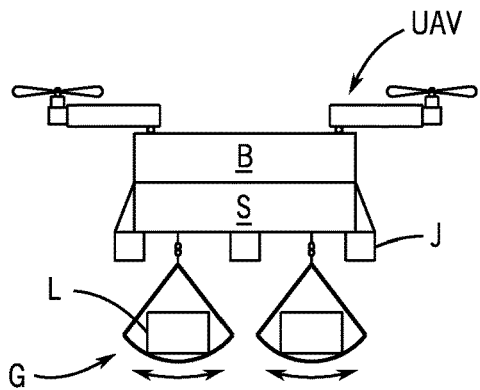
FIGS. 31A to 31D are schematic side elevation views of an unmanned aircraft system with craft and pod for containment system for payload according to an exemplary embodiment.
Figure 31B:
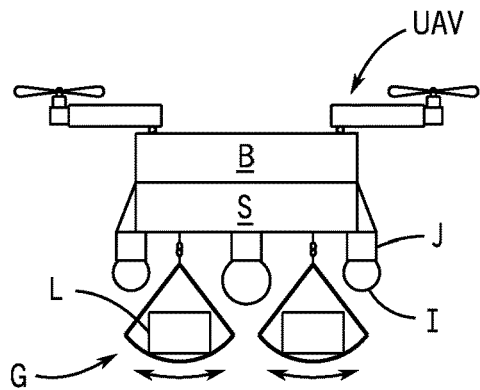
Figure 31C:
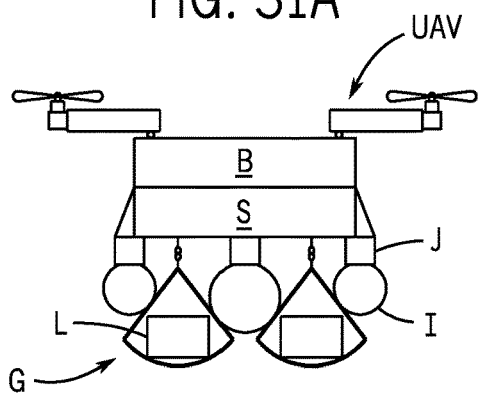
Figure 31D:
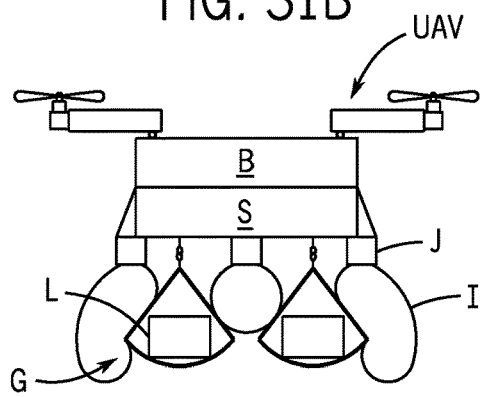

Referring to FIGS. 26A/B, 27A/B and 28A/B as shown schematically and representationally according to an exemplary embodiment, variations of load-carrying/load-balancing distribution and arrangement of payload segments in a containment system for carrying on UAV/craft may be configured and reconfigured (e.g. based on relative weight/mass, shape, etc. of payload segments). As indicated in FIGS. 26A/B, 27A/B and 28A/B schematically and representationally according to exemplary embodiments of the containment system, single or multiple payload segments of payload L of multiple different shapes and forms may be carried by an aircraft UAV; as indicated schematically according to exemplary embodiments of the containment system, the payload segments of payload L may be arranged or configured in a variety of configurations/arrangements to be carried by the UAV/craft. See also for example FIGS. 1A-1G, 2A-2C, 4A-4D, 5A-5E, 6A-6E, 7A-7D, 10A-10B, 11A-11B, 12A-12G, 13A-13C, 14A-14B, 15A-15B, 16A-16E, 17A-17B, 18A-18D, 19A-19D, 20A-20D, 22A-22D, 23, 24A-24D, 25A-25D, 29A-29D, 30A-30D, 31A-31D, 32A-32C, 33A-33C, 34A-34C and 37A-37C. As shown schematically and representationally in the FIGURES and according to an exemplary embodiment in FIGS. 28A-28B, the payload L carried by the UAV/craft may vary in profile and shape (and also in mass/density, etc.). As indicated schematically and representationally in the FIGURES according to an exemplary embodiment, the pod/carrier/body (O/G) of containment system configured to carry payload segments (L) may be provided in a variety of forms and structures to facilitate the safe and efficient carrying of cargo/payload of a variety of types (e.g. size, shape, mass, content, moment of inertia, etc.) for purposes of payload management.

Referring to FIGS. 29A through 34C as shown schematically and representationally according to an exemplary embodiment, a variety of pod O and sling/carrier configurations attachable to an aircraft to carry payload segments may be provided in a variety of forms, sizes and shapes for a variety of payload segments (e.g. packages and containers) and with a variety of associated apparatus and systems. Compare for example FIGS. 28A and 28B.

Referring to FIGS. 29A, 30A, 31A, 32A, 33A and 34A as shown schematically and representationally according to an exemplary embodiment, the pod segments (e.g. shown as segments Op and Oq and Or) of the containment system can be arranged in a wide variety of configurations as needed for a mission/delivery and/or to optimize aerodynamic and/or flight efficiency considerations for the combined aircraft and pod arrangement. As shown schematically and representationally according to an exemplary embodiment, the system may be configured to provide for an inflation/fill system shown as comprising a nozzle J (e.g. inflation interface system) and inflatable/fillable segment arrangement I (e.g. inflatable airbag, balloon, membrane, etc.) that can selectively be inflated and deflated with fill (F) from a source/system. See also FIGS. 37B-37C. As indicated schematically and representationally according to an exemplary embodiment, the inflatable airbag/balloon arrangement provided with the containment system can be used to secure and/or protect the payload carried by the UAV/craft. See for example FIGS. 5B-5C, 6B, 10A-10B, 16A-16B, 17A-17B, 20A-20D, 29A-29D, 30A-30D, 31A-31D, 32A-32C, 33A-33C and 34A-34C. See also FIGS. 35A-35B and 36A-36B.

Referring to FIGS. 29A-29D, the UAV/craft is carrying a containment system for a set of payload segments having a variety of sizes; segment Op is large and segment Oq is intermediate and segment Or is small. As indicated, in flight payload segments Op, Oq, and Or may tend to move and/or shift under dynamic loading and inertia effects. As shown schematically according to an exemplary embodiment in FIGS. 29C and 29D a set of inflatable segments shown as airbags/balloons I provided with the containment system can be selectively inflated at a port shown as nozzle J (with fill (F) from a source/system) to protect/secure and contain/manage each payload segment carried on the UAV/craft during flight. See also FIGS. 35B, 36B and 37A-37C. (According to an exemplary embodiment, the inflatable segments are made of a strong puncture-resistant light weight elastomeric material.)

Referring to FIGS. 30A-30D, the payload is carried in a containment system comprising a body carried below the UAV/craft shown schematically and representationally as a carrier/sling G and potentially subject to dynamic effects (e.g. moving, shifting, swinging, oscillating, etc.) during flight (which effects may cause variations of flight control dynamics or challenges for operation of the UAV/craft during takeoff/landing and flight on a mission). As shown schematically and representationally according to an exemplary embodiment, inflatable segments I are configured to be inflated (see FIG. 30B) to contain/secure (see FIG. 30C) and/or secure and protect (see FIG. 30D) the payload segments L in the pod/body G carried by the UAV/craft. See also FIGS. 35B, 36B and 37A-37C. Referring to FIGS. 31A-31D, an arrangement of the UAV/craft is shown with two pods/slings G; inflatable segments I are configured to inflate (FIG. 31B) and contain/secure (FIG. 31C) and/or contain/secure and protect (FIG. 31D) the pods/payload segments during flight on the mission (e.g. from originator to delivery destination).

Figure 32A:
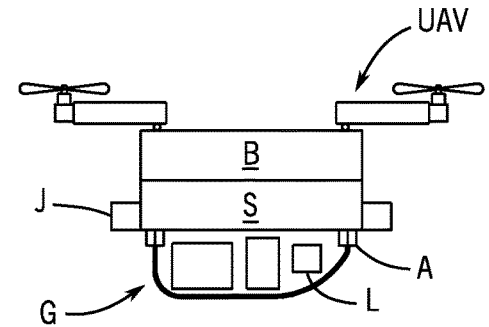
FIGS. 32A to 32C are schematic side elevation views of an unmanned aircraft system with craft and pod for containment system for payload according to an exemplary embodiment.
Figure 32B:
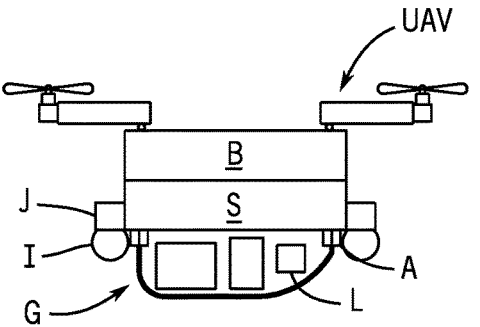
Figure 32C:
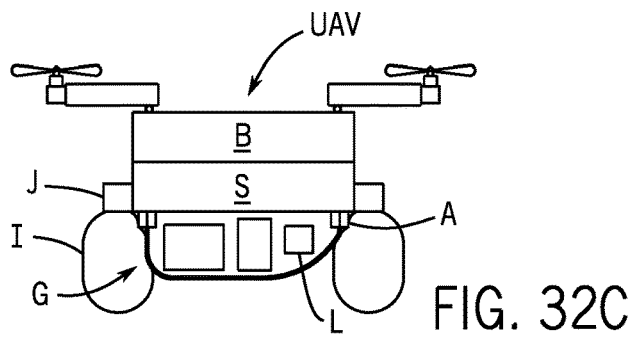
Figure 33A:
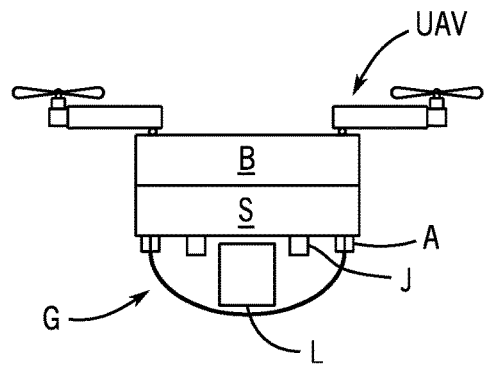
FIGS. 33A to 33C are schematic side elevation views of an unmanned aircraft system with craft and pod for containment system for payload according to an exemplary embodiment.
Figure 34A:
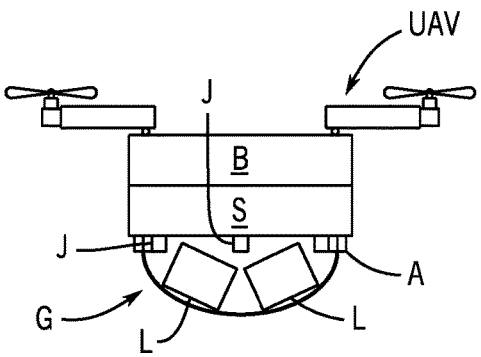
FIGS. 34A to 34C are schematic side elevation views of an unmanned aircraft system with craft and pod for containment system for payload according to an exemplary embodiment.
Figure 33B:
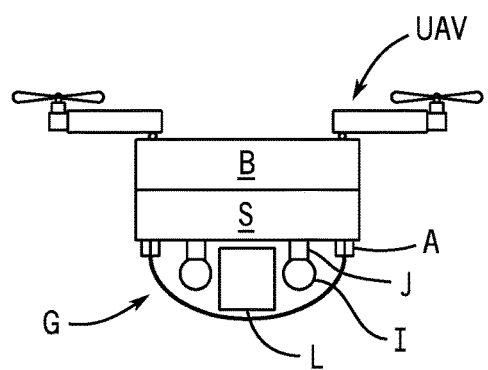
Figure 34B:
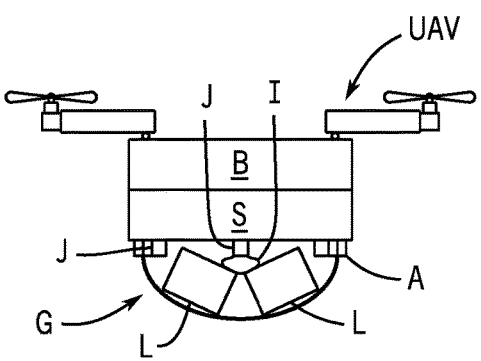
Figure 33C:
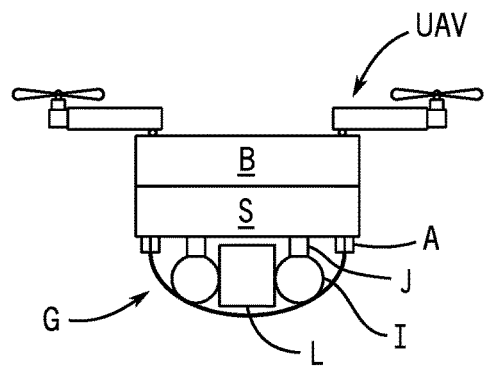
Figure 34C:
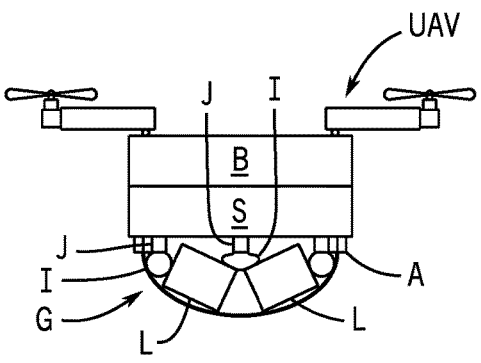
Figure 35A:
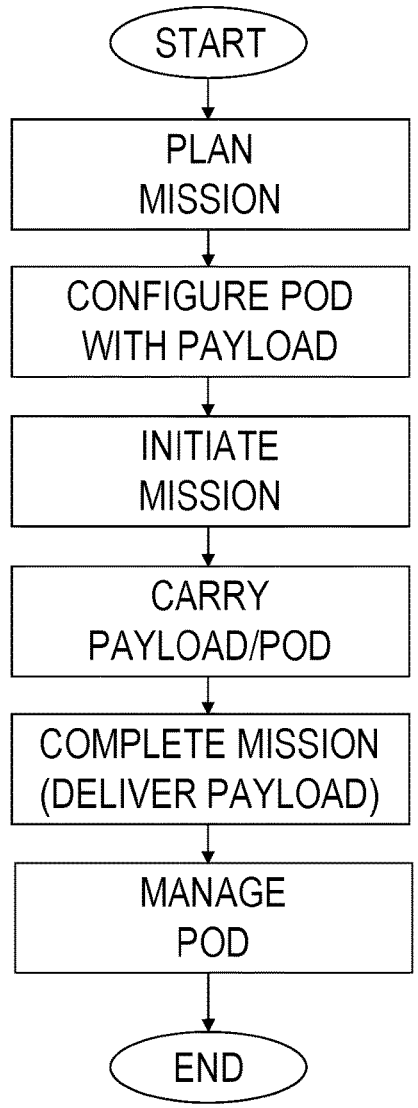
FIGS. 35A to 35B are schematic flow diagrams of method of payload management for a UAV/craft carrying payload according to an exemplary embodiment.
Figure 35B:
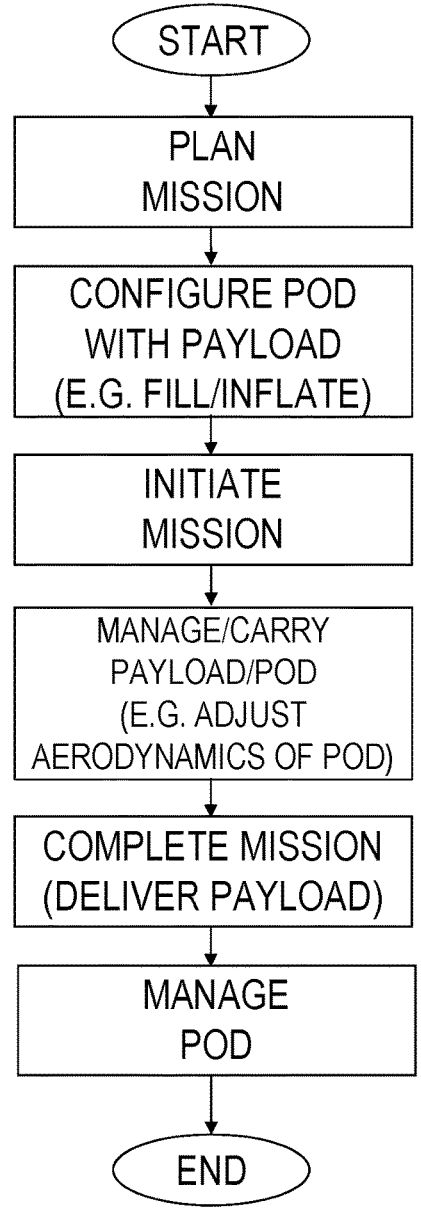

Referring to FIGS. 32A to 32C, as shown schematically and representationally according to an exemplary embodiment, UAV/craft is carrying a containment system comprising payload segments L in a carrier shown as pod/body G; inflatable segments I may be activated (e.g. under control in operation and/or from the UAV/craft) to deploy as may be useful to provide protection for the payload (e.g. dynamic control). See also FIGS. 35B, 36B and 37A-37C. For example as indicated schematically in FIGS. 29A-29D, 30A-30D, 31A-31D, 32A-32C, 33A-33C and 34A-34C, the inflatable segments of the containment system may be deployed for carrying certain types/shapes of cargo, at take-off and landing, when certain environmental conditions are encountered (e.g. storms, high winds, etc.), if the UAV/craft is at risk of crash or malfunction, instantaneously upon detection of impact (e.g. deployed using conventional technology such as an automotive airbag is deployed for driver/passenger), etc. operated by a control system with instrumentation (e.g. directed by an operator/transporter). See also FIGS. 35A-35B, 36A-36B and 37A-37B. As shown schematically the inflatable segment is configured to form/fit to contain/maintain and protect the pod/payload segment from impact forces. (As indicated, according to an exemplary embodiment the interior compartment of the pod/body may also be inflated/filled to protect the payload. See for example FIGS. 5C, 6C, 7D, 10B, 11B, 12C, 12E-12F, 13C, 14B, 15B, 24C and 25D.)

Referring to FIGS. 33A to 33C and 34A to 34C, according to an exemplary embodiment of the containment system as shown schematically and representationally, the carrier shown as pod/body G for the containment system may be configured to carry one payload segment (FIGS. 33A-33C) or multiple payload segments (FIGS. 34A-34C) for a mission. According to an exemplary embodiment of the containment system, the inflatable segment configuration in the pod/body for the containment system may be adjustable to fit and deploy (e.g. selectively) inflatable segments if the appropriate size/inflation and in the appropriate position/spacing (and of the appropriate number) to provide protection for the payload segments as arranged in the pod/body to be carried by the UAV/craft. See FIGS. 33A-33C and 34A-34C. See also FIGS. 35B, 36B and 37A-37C. As shown schematically and representationally in FIGS. 33A to 33C, a single segment of payload for the containment system may be secured to and within the interior of the pod/body by development of an arrangement of multiple inflatable segments (e.g. to maintain/contain/retain the payload segment adjust movement in the pod). As shown schematically and representationally in FIGS. 34A to 34C, a set of payload segments for the containment system may be secured to and within the interior of the pod/body by deployment of an arrangement of multiple inflatable segments (e.g. to retain the payload segments against movement in the pod).

As indicated schematically and representationally according to an exemplary embodiment of the containment system in FIGS. 1A-1G, 2A-2C, 4A-4D, 5A-5E, 6A-6E, 7B-7D, 10A-10B, 11A-11B, 12A-12F, 13A-13C, 14A-14B, 15A-15B, 16A-16E, 17A-17B and 37A-37C the pod (O) and/or pod/carrier (G) of the containment system may be provided (e.g. for payload L) in any of a wide variety of arrangements, configurations and shapes/forms, sizes. See also FIGS. 18A-18D, 19A-19D, 20A-20D, 21, 22A-22D, 23, 24A-24E, 25A-25D, 26A-26B, 27A-27B, 20A-20D, 21, 22A-22D, 23, 24A-24E, 25A-25D, 26A-26B, 27A-27B, 28A-28B, 29A-29D, 31A-31D, 32A-32C, 33A-33C and 34A-34C.

Configuration/Use and Operation of Containment System (Pod/Carrier)

According to an exemplary embodiment shown schematically indicated in FIGS. 35A-35B, 36A-36B and 37A-37B a payload management system (and method) may be provided for an unmanned aircraft system to carry payload comprising at least one payload segment by a containment system (e.g. with carrier and/or pod) on a mission from an originator by a transporter to a destination in operating conditions. See for example FIGS. 1A-1B, 5A-5E, 6A-6E, 10A-10B, 18A-18D, 32A-32C, 33A-33C and 34A-34C. The system may comprise a carrier for payload configured to be carried by the aircraft; according to an exemplary embodiment the system may comprise a containment system configured to contain payload. See for example FIGS. 1A-1F, 12A-12F and 18A-18D. According to an exemplary embodiment, the containment system may comprise an inflatable pod attachable to the aircraft by the carrier; the containment system for payload may comprise a fillable/inflatable container at least partially within the carrier and/or external to the aircraft. See for example FIGS. 1A-1F, 5A-5E, 6A-6E, 7A-7D, 12A-12F, 16A-16E and 18A-18D. According to an exemplary embodiment, the carrier with containment system may comprise or create a pod for payload to be carried external to the aircraft. See for example FIGS. 1A-1B, 6A-6F and 18A-18D.

According to an exemplary embodiment indicated schematically in FIGS. 35A-35B and 36A-36B, the containment system with carrier may be attached to the aircraft. See for example FIGS. 1A-1B, 5A-5E, 6A-6E, 19A-19D and 23. According to an exemplary embodiment, the payload management system may comprise a containment system with any of a variety of types/forms of carrier configured to contain payload. See for example FIGS. 1A-1B, 5A-5E, 6A-6E, 18A-18D, 19A-19D, 22A-22D, 25A-25D and 33A-33C. The containment system may comprise a protection system configured to protect payload. See for example FIGS. 5A-5E, 6A-6E, 18A-18D, 19A-19D, 29A-29D, 30A-30D, 31A-31D, 32A-32C, 33A-33C and 34A-34C.

According to an exemplary embodiment shown schematically payload may comprise cargo; payload may comprise a payload unit or payload units. See for example FIGS. 26A-26B.

According to an exemplary embodiment shown schematically, the pod may comprise an external pod to the aircraft (see FIGS. 1A-1G, 4A-4D, 5A-5E, 6A-6E and 23) (or at least partially contained in the aircraft) (see FIGS. 10A-10B and 11A-11B). According to an exemplary embodiment shown schematically, the aircraft may provide a mounting structure and the pod may be coupled to the mounting structure. See FIG. 23. According to an exemplary embodiment shown schematically, the pod/carrier may comprise a frame and may provide a base and a cover or other formed structure. See for example FIGS. 16A-16E, 18A-18D and 19A-19D. According to an exemplary embodiment shown schematically, the carrier may comprise a pod providing a compartment. See for example FIGS. 1A-1E, 14A-14B, 15A-15B, 16A-16E, 20A-20D and 22A-22D. The pod/carrier may be formed with a compartment for payload (e.g. with a payload unit). See FIGS. 6A-6E, 14A-14B, 16A-16E, 18A-18D and 20A-20D.

According to an exemplary embodiment the carrier and/or containment system may be provided in an at least partially inflatable form to create a pod for payload to be carried by the aircraft. See FIGS. 1A-1F, 5A-5E, 7A-7D, 10A-10B, 11A-11B, 14A-14B, 16A-16E, 20A-20D, 22A-22D, 25A-25D and 33A-33C.

According to an exemplary embodiment shown schematically, the container (e.g. Tillable/inflatable pod) may be inflated with a fluid (e.g. a fill/material comprising a liquid and/or gas from a source/system). See FIGS. 5A-5E and 6A-6E. See also FIGS. 10A-10B, 11A-11B, 12E, 18B, 35B, 36B and 37B-37C. According to an exemplary embodiment shown schematically, the containment system/pod may be fully inflatable. See for example FIGS. 1A-1F. The form of the carrier may comprise an aerodynamic pod and/or an inflatable pod. See for example FIGS. 1A-1F, 4A-4D, 14A-14B and 15A-15D.

According to an exemplary embodiment shown schematically, the containment system may comprise containment of payload by using at least one of (a) foam elements; (b) fluid/foam-fill; (c) a fluid introduced adjacent to payload; (d) inflation with gas adjacent to payload; (e) inflatable segments. See for example FIGS. 4A-4D, 5A-5E, 6A-6E, 12E-12F, 18B-18D, 24A-24E, 25A-25D, 29A-29D, 30A-30D, 31A-31D, 32A-32C, 33A-33C, 34A-34C. See also FIGS. 35A-35B, 36A-36B and 37A-37C.

According to an exemplary embodiment shown schematically, the pod may comprise a plurality of inflatable sections or segments. See FIGS. 20A-20D and 22A-22D. According to an exemplary embodiment shown schematically, the pod may be inflated to form an inflatable pod by the originator or by the transporter before attachment to the aircraft. See FIGS. 1A-1F, 25A-25D, 35A-35B and 36A-36B. According to an exemplary embodiment the inflatable pod may be created after the pod/carrier is attached to the aircraft. According to an exemplary embodiment the pod may be inflatable during the mission and may be inflated during the mission and deflated at the destination. See FIGS. 1A-1E and 37B-37C. According to an exemplary embodiment the pod may be inflatable and deflatable in flight. See FIGS. 24A-24C and 25A-25B. See also FIGS. 30C-30D, 32B-32C, 33A-33C and 34A-34C.

According to an exemplary embodiment the method of using/deploying the container/containment system (e.g. carrier with pod) may comprise the step of filling/inflating the container with a fluid such as gas and/or with a liquid (e.g. foam or fill from a source/system). See FIGS. 5A-5E and 6A-6E. See also FIGS. 35A-35B, 36A-36B and 37A-37C. According to an exemplary embodiment the fluid may comprise a gas; the pod/container may comprise a gas-inflated container. See FIGS. 1A-1F, 5A-5E, 7A-7D and 10A-10B, 11A-11B, 14A-14B, 16A-16E, 20A-20E, 22A-22D and 25A-25B. See also FIG. 37B. The gas may comprise at least one of air from ambient atmosphere, air, inert gas, nitrogen, helium, etc. According to an exemplary embodiment the fluid (e.g. material) may be a foam provided to contain payload; the container may be a fluid/foam-filled container; the fluid may be a foam fill. See FIGS. 12E and 18B. According to an exemplary embodiment shown schematically, the method may also comprise the step of filling at least one segment of the containment system with a fluid (e.g. gas, liquid/foam). See FIGS. 35B and 36B.

According to an exemplary embodiment the carrier with containment system (e.g. pod) may comprise a foam pod or a formed pod. See FIGS. 1A-1F and 4A-4D. According to an exemplary embodiment the pod may be formed by injection of a material (e.g. formed by injection of a foam). See FIGS. 5A-5E and 6A-6E. According to an exemplary embodiment the liquid may comprise a material configured to form a foam, such as urethane, a packing foam, a gel material. See FIGS. 12E and 18B. According to an exemplary embodiment the inflatable pod may be inflated with a foam that may comprise a liquid foam configured to cure into a solid form comprising a formed structure. See FIGS. 12F and 18D. The foam/material may form the formed structure (e.g. foam provided in an aerodynamic shape). See FIG. 23. See for example FIGS. 4A-4D, 6A-6E, 12E-12F, 18A-18D and 23. According to an exemplary embodiment shown schematically, the foam/material at least partially encompasses each item of payload in the compartment. See FIGS. 4A-4D, 6C-6E, 12E-12F, 18A-18D and 23.

According to an exemplary embodiment the fill/fluid (e.g. material filled) may be impact absorbing and/or fire retardant and/or rigid and/or semi-rigid; the fluid may solidify into a protective form or structure. See FIGS. 4A-4D, 6C-6E, 12E-12F, 18D and 23.

According to an exemplary embodiment of the containment system, the pod may be inflated after items of payload are in the pod; for example may be inflated to a first inflated state before flight, inflated to a second inflated state during flight, in a third state (e.g. deflated) after the mission is completed. See FIGS. 1C, 1D and 1E. See also FIGS. 25A and 25B.

According to an exemplary embodiment shown schematically, the pod may comprise a first drag coefficient in the first inflated state and a second drag coefficient in the second inflated state. See for example FIGS. 1B-1E, 6C-6D, 7C-7D, 19A-19B and 25A-25D.

According to an exemplary embodiment shown schematically, the pod may be configured in a first size comprising a first volume in the first inflated state and a second size comprising a second volume in the second inflated state (e.g. the first size of the pod in the first inflated state is smaller than the second size of the pod in the second inflated state). See for example FIGS. 1D-1E, 20A-20D, 22A-22D and 25A-25B. See also FIGS. 35A-35B and 36A-36B.

According to an exemplary embodiment a pod of the containment system may be dynamically adjusted in shape during the mission by inflation of the pod (see for example FIGS. 25A-25B) or by inflation of segments of the pod. (see for example FIGS. 20A-20D and 22A-22D). See also FIGS. 35A-35B, 36A-36B and 37A-37C. According to an exemplary embodiment the pod may comprise a set of inflatable segments. See FIGS. 1C-1F and 22A-22D.

According to an exemplary embodiment indicated schematically, inflating/filling of the pod with fill material/fluid may be controlled by a separate system, on the pod, by the aircraft (with fill from a source/system). See FIGS. 37A-37C.

According to an exemplary embodiment shown schematically, the pod provides aerodynamic characteristics; aerodynamic characteristics of the pod can be adjusted by selective inflation and deflation of the pod. See FIGS. 1C-1F, 12B, 20A-20D, 22A-22D and 25A-25B. According to an exemplary embodiment shown schematically, the inflatable pod may comprise a shape configured to reduce aerodynamic drag. See FIGS. 1E, 1H, 4A, 4C-4D, 23 and 25A-25D. For example, the drag coefficient of the pod can be adjusted before the mission or during the mission (e.g. drag coefficient of the pod can be adjusted by selective inflation and deflation of the pod). See FIGS. 1D-1E and 25A-25B. The pod may comprise a shell or the pod may comprise a surface (which may comprise ripples providing enhanced aerodynamic performance). See FIG. 1G.

A method of managing payload may be provided for an unmanned aircraft system providing an aircraft to carry payload comprising at least one payload segment (e.g.

associated with the UAV/craft to be loaded, carried, contained, managed, etc.) on a mission from an originator (e.g. source providing payload for delivery) by a transporter (e.g. operation of the UAV/craft carrying payload) to a destination (e.g. recipient of payload at a location) in operating conditions. See FIGS. 35A-35B and 36A-36B. The method may comprise the steps of (a) providing payload in a pod/carrier configured to be carried by the aircraft; (b) providing a containment system for payload; and (c) configuring the containment system by inflation and/or filling. See FIGS. 5A-5E, 6A-6E, 35A-35B and 36A-36B. The step of configuring the containment system may be performed before the mission and/or during the mission. See FIGS. 25A-25D, 33A-33C, 34A-34C, 35A-35B and 36A-36B.

The method may comprise the steps of (a) providing a pod comprising at least one inflatable segment to contain payload; (b) placing payload in the pod; (c) associating the pod with the aircraft so that the payload can be carried by the aircraft on the mission; (d) at least partially inflating at least one inflatable segment of the pod. See for example FIGS. 5A-5E and 6A-6E. The step of at least partially inflating at least one inflatable segment of the pod may be performed before flight and/or during flight. The step of at least partially inflating at least one inflatable segment of the pod may be performed to adjust the aerodynamic profile of the pod. See for example FIGS. 1A-1E and 25A-25D. The method may further comprise the step of deflating the pod. The step of deflating the pod may be performed during flight and/or after flight (e.g. during and/or after the mission).

According to an exemplary embodiment, the step of providing the pod (e.g. to have associated payload to be managed) may be performed by the originator and/or by the transporter; the step of placing payload in the pod may be performed by the originator and/or by the transporter. According to an exemplary embodiment, the containment system may be configured (e.g. by the originator) prior to providing payload to the transporter for the mission and/or configured by the transporter prior to the mission. According to an exemplary embodiment, payload contained by the containment system is associated with the UAV/craft; the pod of the containment system associated with the UAV/craft is configured to carry payload for flight on the mission of the UAV/craft.

According to an exemplary embodiment shown schematically, the originator may comprise the carrier; the originator may comprise a customer of the transporter. The customer may comprise the destination. According to an exemplary embodiment, the originator may comprise the transporter. According to an exemplary embodiment, the transporter may comprise an operator at the aircraft; the transporter may comprise ground crew for the aircraft. According to an exemplary embodiment, the containment system may be configured by the transporter after receipt of payload from the originator and/or deployed by the transporter prior to the mission.

According to an exemplary embodiment shown schematically, the customer may comprise the destination of the mission. (According to an exemplary embodiment shown schematically, the step of providing payload in the container may be performed by an originator/customer and/or the step of receiving payload carried in the container may be performed by a customer/delivery site.)

According to an exemplary embodiment, the containment system may comprise the system and/or a structure for the containment system. See for example FIGS. 5A-5E, 6A-6E, 16A-16B, 18A-18D and 19A-19D. The carrier may comprise at least one container and payload may be provided in a container of the carrier. See FIGS. 12B-12D, 13B-13C, 15A-15B, 19C-19D, 22A-22D, 24A-24E, 25A-25D and 32A-32C. A method step of providing payload in the container may comprise at least one of the steps of: (a) loading cargo in the container; (b) attaching cargo in the container; (c) positioning cargo in the container. See FIGS. 10A-10B, 11A-11B, 12A-12F, 13A-13C, 18A-18D, 33A-33C, 34A-34C, 35A-35B and 36A-36B. The method may also comprise the step of configuring payload for the mission. According to an exemplary embodiment, a method step of configuring payload for the mission may comprise at least one of: (a) securing payload in the carrier; (b) deploying the containment system for payload. See FIGS. 35A-35B.

According to an exemplary embodiment shown schematically, the containment system for payload may be partially or completely maintained within the carrier for payload. See FIGS. 14A-14B and 15A-15B.

Payload may comprise items of cargo (e.g. one or multiple items) to be transported on the mission (e.g. of one or multiple destinations and delivery points). According to an exemplary embodiment shown schematically, payload and/or items of cargo may comprise at least one segment. See for example FIGS. 14A-14B, 15A-15B, 16A-16E, 29A-29D, 30A-30D and 31A-31D.

According to an exemplary embodiment, the containment system may be deployed for at least one event (e.g. an event during the mission). According to an exemplary embodiment, the mission may comprise at least one event such as (a) takeoff of the aircraft; (b) flight of the aircraft on the mission; (c) landing of the aircraft during the mission; (d) landing of the aircraft at the end of the mission; (d) an identified condition during flight; (f) a hazard during flight; (g) a potential malfunction of the aircraft during flight; (h) an impact by payload; (i) an impact by the aircraft. The identified condition may comprise an environmental condition during the mission that is identified as a potential hazard to the aircraft. The identified condition may comprise at least one of (a) a forecast weather condition on the route of the aircraft for the mission; (b) an actual weather condition potentially affecting the mission. The identified condition may comprise an operating condition that is identified as a potential hazard to the aircraft, for example, at least one of (a) potential malfunction of a system of the aircraft; (b) a reduction of the airworthiness of the aircraft; (c) a malfunction of an a system of the aircraft.

According to an exemplary embodiment, payload may comprise at least one payload segment and the containment system may be configured to provide containment of payload during at least one of (a) impact of the aircraft with an object; (b) effect of environmental conditions in flight; (c) effect of operating conditions in flight; (d) contact between a payload segment with another object; (e) heat; (f) fire; (g) exposure to environmental conditions. An environmental condition may comprise a weather condition. Operating conditions for a mission comprise at least one of: (a) environmental conditions; (b) loading of the carrier; (c) route of the mission; (d) flight speed for the mission. Containment of payload may comprise at least one of containment during: (a) operating conditions; (b) vibration; (c) oscillation; (d) environmental effects; (e) fire; (f) impact.

According to an exemplary embodiment, the method may also comprise the step of configuring the aircraft with carrier for transit on the mission. The method may also comprise the step of configuring the aircraft with the carrier to reduce aerodynamic drag in flight. The method may also comprise the step of initiating the mission; the step of configuring payload for the mission may be performed before initiating the mission; the step of configuring payload for the mission may be performed after initiating the mission. The method may also comprise the step of performing the mission. The step of configuring (e.g. loading, filling, inflating, etc.) the container/carrier (e.g. pod) may be performed by a customer of the transporter (e.g. by an originator). The step of unloading (e.g. emptying, deflating, compacting the container/carrier (e.g. pod) may be performed at a destination upon completion or termination of the mission by the transporter; the step of unloading can be performed by a customer of the transporter. According to an exemplary embodiment, the container/pod may be deflated and/or reduced after the mission (see FIGS. 1A-1F) and transported back to a site where the pod/container and packing materials (if any) may be reused. See FIG. 36B.

According to an exemplary embodiment shown schematically, the method may also comprise the step of associating the carrier with the aircraft by attachment to the aircraft. The method may also comprise the step of associating the carrier with the aircraft by insertion of payload into the base of the aircraft. According to an exemplary embodiment shown schematically, the base may comprise a hull of the aircraft. See for example FIGS. 10A-10B and 11A-11B.

According to an exemplary embodiment shown schematically, the aircraft may comprise a hull. See FIGS. 10A-10B and 11A-11B. The hull may comprise a concave volume and the fill of the container provides a volume securing the container to the aircraft at the concave volume. See FIGS. 10A-10B and 11A-11B. According to an exemplary embodiment shown schematically, the hull may comprise a knob and/or a rail.

According to an exemplary embodiment shown schematically, the form (e.g. shape/size) of the pod/container of the containment system may conform to payload shape and/or to payload size and/or to payload form. See FIGS. 3A-3B, 4A-4B and 17A-17B. The form may be configured stabilize payload in flight. See for example FIGS. 24A-24E and 25A-25D. According to an exemplary embodiment shown schematically, the step of associating the container with the aircraft may comprise creation of an aerodynamically configured combination of the carrier and the aircraft. See FIGS. 1B, 1E, 2A-2F, 5B-5D, 6B-6D, 7B-7D, 12A, 24A, 25A-25B and 32A-32C. According to an exemplary embodiment shown schematically, the carrier may comprise an aerodynamic body or form. See FIGS. 1G, 4C-4D, 12C, 16D-16E and 23.

According to an exemplary embodiment shown schematically, the carrier may comprise a wing and/or set of wings. See FIGS. 2A-2F. According to an exemplary embodiment shown schematically, the wings may be adjustable. See FIGS. 2C-2F. According to an exemplary embodiment the aircraft may be configured to adjust the position of the wings of the container. According to an exemplary embodiment shown schematically, the wings are retractable and/or otherwise adjustable in flight. See FIGS. 2A-2F.

According to an exemplary embodiment shown schematically, the pod encompasses payload (e.g. some or the entire payload) and/or encloses payload (e.g. some of the entire payload). See FIGS. 1C-1D. According to an exemplary embodiment shown schematically, the container may comprise a pod configured to at least one of (a) reduce aerodynamic drag when carried in flight by the aircraft; (b) shield contents of the container from weather exposure; (c) contain the contents (e.g. payload, payload/cargo items, etc.) of the container during effects of impact. See for example FIG. 23. According to an exemplary embodiment, the pod or container may be Tillable/inflatable (e.g. with fill material supply (F) from a source) by an external system and/or by an integrated system with the aircraft (e.g. using a conventional inflation/filling system). See FIGS. 37B (external) and 37C (internal). See also FIGS. 5C, 6C, 12E and 18B.

According to an exemplary embodiment shown schematically, the container may comprise a plurality of separate segments and/or a plurality of compartments. See FIGS. 20A-20D and 22A-22D. Each compartment may be configured for a type of payload item, to match a size of payload item, to match a shape of payload item. According to an exemplary embodiment shown schematically, each compartment may be configured to be separately loaded with payload and/or to be separately filled. See FIGS. 20A-20D and 22A-22D. The UAV/craft and/or the operator may provide a control system to inflate/deflate the pod/container. See FIG. 37A-37B.

According to an exemplary embodiment shown schematically, the compartment of the container and/or pod may comprise a nose compartment and/or a base compartment and/or a tail compartment. See FIGS. 12A-12F and 13A-13C. According to an exemplary embodiment shown schematically, the pod may be inflatable at each compartment provided by the container. See FIGS. 1C-1F, 20A-20D and 22A-22D. See also FIGS. 35A-35B, 36A-36B and 37A-37C.

According to an exemplary embodiment shown schematically, the container may be configured to reduce drag coefficient (e.g. provided a surface treatment/features and/or otherwise streamlined form). See FIGS. 1G, 4C-4D and 16E.

According to an exemplary embodiment the container may be pre-loaded and attached to the aircraft. According to an exemplary embodiment the pod may be configured by the operator. According to an exemplary embodiment the pod may be configured to modify aerodynamic forces on the aircraft for flight during or before the mission. See FIGS. 2A-2F and 25A-25B.

According to an exemplary embodiment the pod may be configured to generate lift for the aircraft (e.g. with a flight control surface and/or inflated with a lighter-than-air gas). See FIGS. 2A-2D and 25A-25D. According to an exemplary embodiment, the pod may comprise a treated surface; the surface may be rippled to reduce aerodynamic drag forces; the treated surface may be configured to reduce drag forces at a transit speed. See for example FIGS. 1F and 4C-4D.

According to an exemplary embodiment of the containment system the pod carried by the aircraft attaches directly to the aircraft. As shown schematically, the aircraft provides attachment points for connecting to the pod; the pod provides attachment points for connecting to the aircraft. See FIGS. 1A, 1E, 8A-8B, 9A-9B, 10A-10B, 11A-11B, 23 and 37A-37C. FIG. 37C is a schematic block diagram of an unmanned aircraft with fill/inflation system for interface with the payload management system according to an exemplary embodiment.

According to an exemplary embodiment as indicated schematically and representationally in FIGS. 5A-5D, 6A-6D and 37A-37C, the base (B) of the UAV/craft and/or the pod/carrier (O/G) of the containment system may be provided with an interface configured for the payload management system (e.g. to provide control/instrumentation, etc.). See also FIGS. 35A-35B and 36A-36B. According to an exemplary embodiment as indicated schematically and representationally in FIGS. 29A-29D, 30A-30D, 31A-31D, 32A-32C, 33A-33C, 34A-34C and 37A-37C, an interface system S of the payload management system may be provided at the interface of the UAV/craft and the containment system. See also FIGS. 35A-35B and 36A-36B. As indicated, the interface system may be included with the UAV/craft (e.g. base) and/or with the containment system (e.g. carrier/pod) and/or as a separate system/interface between the UAV/craft and the containment system to provide the functionality of the payload management system and method indicated in the FIGURES. See FIGS. 35A-35B, 36A-36B and 37A-37C. The interface system is shown integrated with UAV/craft and/or containment system in FIGS. 1A-1B, 5A-5D and 6A-6D to provide a physical/functional interface (separate or shared/distributed); the interface system S is shown between UAV/craft to provide the containment system for payload in FIGS. 29A-29D, 30A-30D, 31A-31D, 32A-32C, 33A-33C and 34A-34C. According to an exemplary embodiment, the interface/system for the payload management system indicated in FIGS. 37A-37C may be implemented in any suitable arrangement between the UAV/craft and the containment system.

According to an exemplary embodiment, the aircraft and/or containment system may provide a control system and instrumentation to monitor the containment system/pod during the mission. See FIGS. 37A-37C. The control system may be configured to activate the containment system/pod (e.g. to inflate/deflate by associated mechanisms/systems and otherwise to operate and configure the pod). The instrumentation system (as indicated schematically in FIGS. 37A-37C) may provide monitoring and communications for the containment system (e.g. including between the UAV/craft and the pod and with other data sources including the internet); instrumentation may include data acquisition/recording devices/systems such as status indicator, fault monitoring, impact sensors, accelerometers, speedometers, altitude measurement, audio recording, video camera, weather/barometric measurement, wireless network access/data interchange, etc. According to an exemplary embodiment, the instrumentation and associated devices/systems will be integrated with other UAV/craft systems; the control system may be (wholly or partially) associated with the containment system/pod or connected (e.g. by data link) to the UAV/craft systems. According to an exemplary embodiment, information (from instrumentation and other data sources) is used by the system to determine configuration of the payload management system to contain/carry payload (e.g. including pre-mission and/or in-mission fill deployment of the pod/containment system). See FIGS. 25A-25D, 33A-33C, 34A-34C, 35A-35B, 36A-36B and 37A-37C.

Figure 37A:
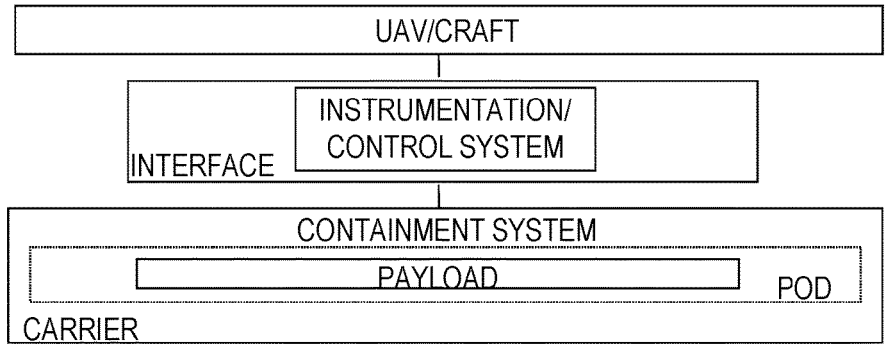
FIG. 37A to 37C are schematic block diagrams of a payload management system for a UAV/craft carrying a payload according to an exemplary embodiment.
Figure 37B:
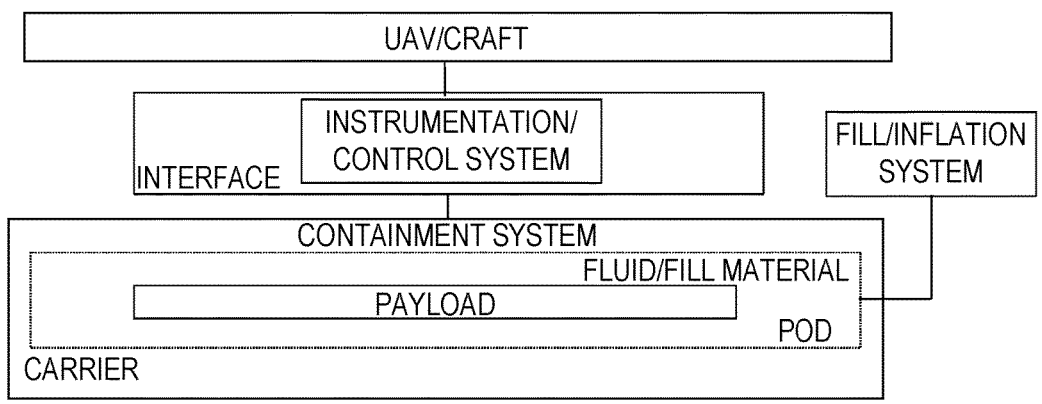
Figure 37C:
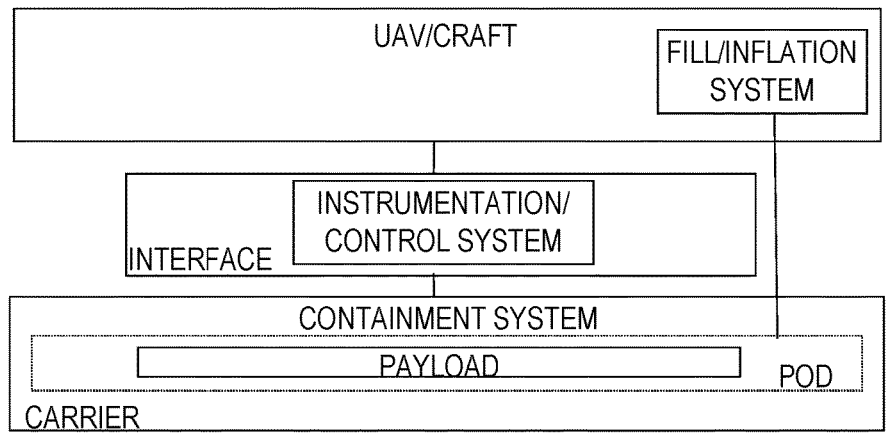

According to an exemplary embodiment as indicated schematically in FIGS. 37A-37C, the pod of the containment system may comprise indicia to provide information/data (e.g. to the UAV/craft, to data sources, over a network (such as the internet), to data storage, for a detectors, for a control system, etc.). According to an exemplary embodiment, the pod of the containment system may be configured to provide indicia; the indicia may be a marking on the pod (e.g. visually perceptible, marking, registration/identifier, marking identifier, human-readable indicator); the indicia may be machine-readable (e.g. a device, transmitter, tag, RFID tag, etc.). The indicia may comprise an identifier/identification, profile, registration, license, access code, other information, etc. as data. Data may be communicated and/or transmitted on a network (e.g. LAN local area network, virtual private network, public network, internet, etc.). According to an exemplary embodiment, the indicia may comprise data as to pod configuration or status; data may indicate aerodynamic performance of the pod (e.g. lift, drag, aero-moment coefficients, area-coefficient products, forces/torques at a reference speed. etc.). Indicia (indicated schematically as identifier/marking ID) may comprise visually perceptible information (e.g. a marking that is visible to a detector/machine, human, etc.); indicia may comprise machine-readable data or information (e.g. data transmission, RFID tag, etc.). See FIGS. 25O and 37A-37C. Indicia may comprise a data profile/identifier of the pod, ownership/operator information, configuration shape/form data, aerodynamic characteristics or form, etc.; indicia stored and/or transmitter or communicated as data may vary as the pod is configured/reconfigured or otherwise in use. See FIGS. 35B and 36B.

According to an exemplary embodiment, a method of payload management for an unmanned aircraft system to carry payload comprising at least one payload segment on a mission from an originator by a transporter to a destination in operating conditions may comprise the steps of providing payload in a carrier configured to be carried by the aircraft; and providing a containment system for payload. See FIGS. 35A-35B and 36A-36B.

According to an exemplary embodiment, the method may comprise the steps of providing a pod comprising at least one inflatable segment to contain payload; placing payload in the pod; associating the pod with the aircraft so that the payload can be carried by the aircraft on the mission; at least partially inflating at least one inflatable segment of the pod. See FIGS. 35A-35B and 36A-36B.

Figure 36A:
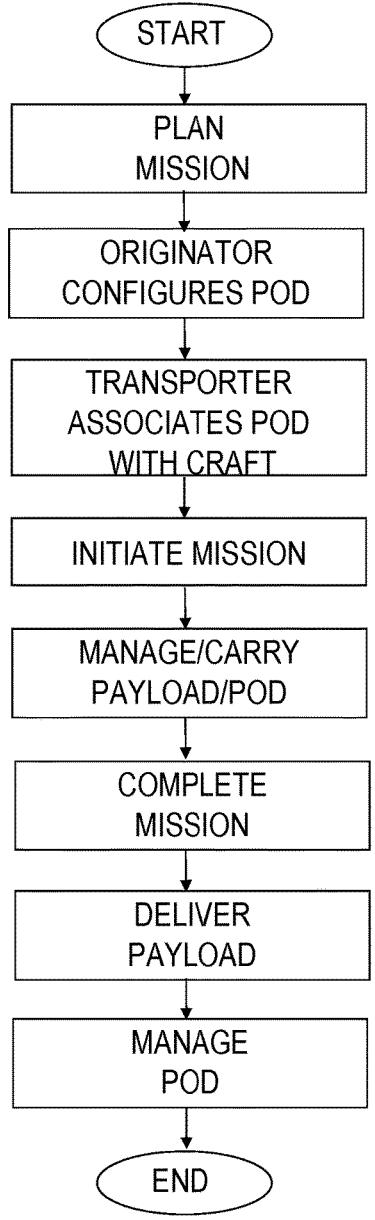
FIGS. 36A to 36B are schematic flow diagrams of method of payload management for a UAV/craft carrying payload according to an exemplary embodiment.
Figure 36B:
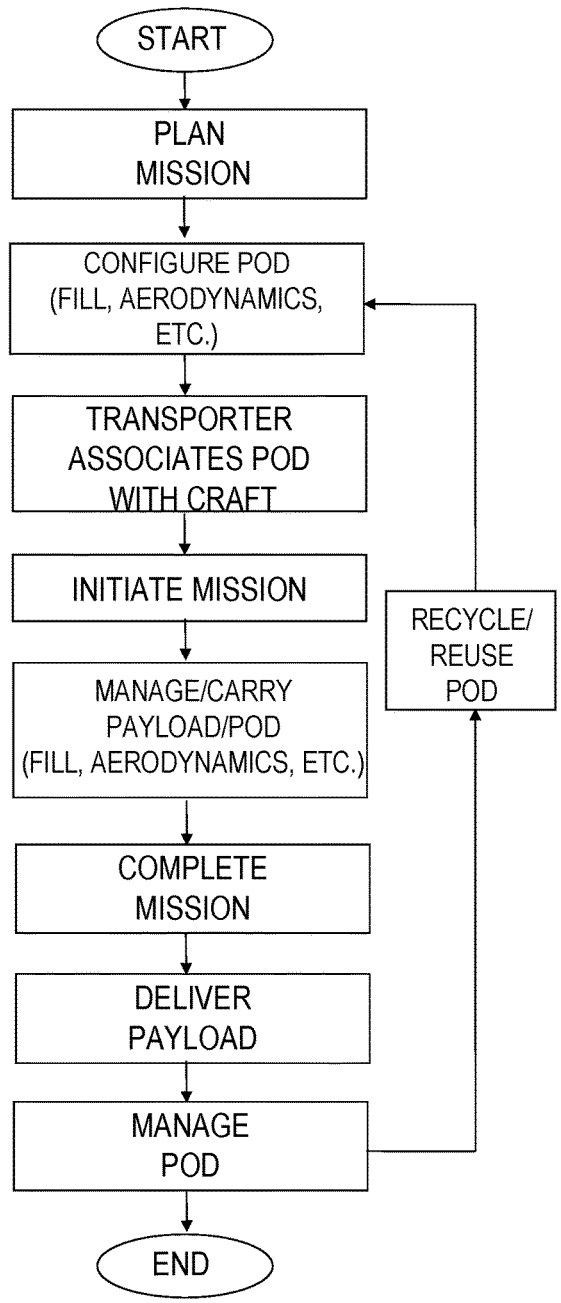

According to an exemplary embodiment the pod may be loaded with payload (see e.g. FIGS. 25E-25H) and prepared/packaged (see e.g. FIGS. 25I-25J) and configured (filled/inflated) (see e.g. FIGS. 25K-25N) by an originator or intermediary or transporter (see FIG. 25O). See also FIGS. 35A-35B and 36A-36B. According to an exemplary embodiment as shown in FIGS. 35A-35B and 36A-36B, the containment system with payload in/on the pod may be configured by or before presentation to the transporter that plans and initiates/operates the UAV/craft and carries/manages the pod in flight on a mission (e.g. to deliver payload to a destination). The pod may be configured by the originator as indicated in FIG. 36A. See also FIGS. 25C to 25J. The pod may be configured by the transporter. See FIGS. 25A-25B. See also FIGS. 36B and 37B. According to an exemplary embodiment the pod may be reconditioned (e.g. emptied and deflated/unfilled) and recycled/reused in the operation of the payload management system. See FIG. 36B.

According to an exemplary embodiment, the containment system for payload may comprise a fillable/inflatable container providing a pod (e.g. cargo pod) at least partially within providing payload in a carrier configured to be carried by the aircraft (e.g. exterior to the aircraft). See FIGS. 37A-37C. The method may comprise configuring the containment system by inflation before and/or during the mission; according to an exemplary embodiment, the method may also comprise the step of inflating at least one segment of the containment system with a fluid (e.g. a gas or liquid) to contain payload segments in the pod. See FIGS. 35A-35B and 36A-36B.

Example Systems and UAV/Craft

Example systems and technology that may be employed in the system and UAV/craft according to an exemplary embodiment are indicated and shown representationally and schematically. As indicated any of a wide variety of suitable/other systems may be adapted/used in exemplary embodiments of the system, including the systems specifically shown and indicated and other known/present systems and/or commercially-available systems.

According to any exemplary embodiment, the system indicated for example schematically in FIGS. 37A-37C could be used to implement the functions and features indicated in other FIGURES; as indicated, according to the various/other exemplary and alternative embodiments, any of a wide variety of other known and/or suitable systems (e.g. with associated payload systems, pods/containers, fill/inflation systems, attachment/carrier interfaces, instrumentation/control, communications, etc.) may be used to implement the functionality of the system.

Incorporation of Present Technology/Systems

The system and method according to exemplary and alternative embodiments may be configured to integrate or operate with present known (and/or future) systems and technology, for example, systems and technology (incorporated by reference) as disclosed in patent documents. Systems of a type/function known (and improvised upon by technology of the present application) are disclosed in U.S. Patent Application Publication No. 2010/0012769 A1 titled "Aerodynamic Integration of a Payload Container with a Vertical Take-Off and Landing Aircraft"; U.S. Patent Application Publication No. 2011/0084162 A1 titled "Autonomous Payload Parsing Management System and Structure for an Unmanned Aerial Vehicle"; U.S. Pat. No. 5,730,564 titled "Cargo Load Supporting Air Bag having Inflation Indicated Means and Method of Determining Proper Inflation for Spaced Loads"; U.S. Pat. No. 7,299,925 B1 titled "Flexible Payload Module with Inflatable Grippers" and U.S. Pat. No. 7,059,566 B2 titled "Unmanned Aerial Vehicle for Logistical Delivery".

Related Applications (Incorporation by Reference)

The following commonly-owned (at present) U.S. patent applications are listed and incorporated by reference in the present application: (a) U.S. patent application Ser. No. 14/501,302, titled SYSTEM AND METHOD FOR ADMINISTRATION AND MANAGEMENT OF AN AIRSPACE FOR UNMANNED AIRCRAFT, naming R. Hyde et al. as inventors, filed Sep. 30, 2014 is related to and incorporated by reference in the present application; (b) U.S. patent application Ser. No. 14/501,343, titled UNMANNED AIRCRAFT CONFIGURED FOR OPERATION IN A MANAGED AIRSPACE OF FLYWAY, naming R. Hyde et al. as inventors, filed Sep. 30, 2014 is related to and incorporated by reference in the present application; (c) U.S. patent application Ser. No. 14/501,365, titled SYSTEM AND METHOD FOR OPERATION OF UNMANNED AIRCRAFT WITHIN A MANAGED AIRSPACE OR FLYWAY, naming R. Hyde et al. as inventors, filed Sep. 30, 2014 is related to and incorporated by reference in the present application; (d) U.S. patent application Ser. No. 14/546,487, titled SYSTEM AND METHOD FOR ADMINISTRATION AND MANAGEMENT OF AN AIRSPACE FOR UNMANNED AIRCRAFT, naming R. Hyde et al. as inventors, filed Nov. 18, 2014 is related to and incorporated by reference in the present application.

It is important to note that the construction and arrangement of the elements of the inventions as described in system and method and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, variations in the arrangement or sequence of process/method steps, operating conditions and arrangement of the preferred and other exemplary embodiments without departing from the spirit of the present inventions.

It is important to note that the system and method of the present inventions can comprise conventional technology (e.g. aircraft design, construction, components, mechanisms, frames/systems, containers, materials, energy/power systems, monitoring/sensors, control systems, computing systems, telecommunication systems, networking technology, data storage, data transmission, data/file structures/formats, systems/software, application programs, mobile device technology, etc.) or any other applicable technology (present or future) that has the capability to perform the functions and processes/operations indicated in the FIGURES. All such technology is considered to be within the scope of the present inventions.

In the detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A payload management system for an unmanned aircraft system providing an unmanned aircraft to carry payload comprising at least one payload segment on a mission, the payload management system comprising: (a) a carrier for payload carried by the unmanned aircraft; (b) a containment system to contain the payload; wherein the containment system comprises an inflatable pod attachable to and removable from the carrier by insertion of a head portion of the inflatable pod into a receptacle in the carrier and inflation of the inflatable pod to expand the head portion to prevent removal of the inflatable pod from the receptacle until the inflatable pod is at least partially deflated; and wherein the inflatable pod of the containment system is attachable to the exterior to of the unmanned aircraft and aerodynamic characteristics of a body of the pod outside of the receptacle and exterior to the unmanned aircraft are adjustable by selective inflation and deflation of the pod.

2. The payload management system of claim 1 wherein the containment system for the payload is attachable to the unmanned aircraft by the carrier so that the payload contained in the inflatable pod of the containment system is transportable by the unmanned aircraft.

3. The payload management system of claim 1 wherein the payload comprises one payload segment.

4. The payload management system of claim 1 wherein the mission comprises at least one event comprising at least one of (a) takeoff of the unmanned aircraft for the mission; (b) flight of the unmanned aircraft on the mission; (c) landing of the unmanned aircraft during the mission; (d) landing of the unmanned aircraft at the end of the mission;

(d) an identified condition during flight; (f) a hazard during flight; (g) a potential malfunction of the unmanned aircraft during flight; (h) an impact by the payload; (i) an impact by the unmanned aircraft.

5. The payload management system of claim 1 wherein the payload comprises at least one payload segment and the containment system is configured to provide containment of the payload during at least one of (a) impact of the unmanned aircraft with an object; (b) effect of environmental conditions in flight; (c) effect of operating conditions in flight; (d) contact between a payload segment with another object; (e) heat; (f) fire; (g) exposure to environmental conditions.

6. A payload management system for an unmanned aircraft system providing an unmanned aircraft to carry payload comprising at least one payload segment on a mission, the payload management system comprising:
(a) a carrier for payload carried by the unmanned aircraft;
(b) a containment system to contain the payload;
wherein the containment system comprises a fillable pod carried by the carrier at least partially exterior to the unmanned aircraft;
wherein the fillable pod includes a head portion that is insertable into a receptacle in the carrier and fillable to expand the head portion to prevent removal of the fillable pod from the receptacle while the fillable pod remains filled; and
wherein a body portion of the fillable pod comprises at least one compartment for the payload, and wherein the body portion of the fillable pod is fillable to an aerodynamic form exterior to the unmanned aircraft after the payload is received within the pod.

7. The payload management system of claim 6 wherein the fillable pod comprises a container.

8. The payload management system of claim 6 wherein the fillable pod is an inflatable pod.

9. The payload management system of claim 6 wherein the fillable pod is a fluid-filled pod.

10. The payload management system of claim 6 wherein the fillable pod is a foam-filled pod.

11. The payload management system of claim 6 further comprising a control system for controlling operation of the containment system.

12. The payload management system of claim 6 further comprising instrumentation for providing data for the control system.

13. A payload management system for an unmanned aircraft system providing an unmanned aircraft to carry payload comprising at least one payload segment on a mission, the payload management system comprising:
a carrier for payload carried by the unmanned aircraft;
a containment system providing a pod comprising at least one container for the payload;
wherein the pod is attachable to the carrier by insertion of a head portion of the pod into a receptacle in the carrier and inflation of the pod to expand the head portion to prevent removal of the pod from the receptacle until the pod is at least partially deflated; and
wherein a body portion of the pod is at least partially inflatable to an aerodynamic form exterior to the unmanned aircraft to provide containment for the payload carried at least partially external to the unmanned aircraft.

14. The payload management system of claim 13 the pod is selectively inflatable and selectively deflatable.

15. The payload management system of claim 13 wherein the body portion of the pod comprises an aerodynamic shape.

16. The payload management system of claim 13 wherein the pod comprises an inflatable pod.

17. The payload management system of claim 13 wherein the body of the pod when inflated comprises an aerodynamic shape.

18. The payload management system of claim 13 wherein the body of the pod comprises an inflatable compartment.

19. The payload management system of claim 13 wherein the body of the pod comprises at least one inflatable compartment.

20. The payload management system of claim 13 wherein the pod comprises a plurality of inflatable segments.

21. The payload management system of claim 13 wherein the pod comprises a plurality of selectively inflatable sections.

22. The payload management system of claim 13 wherein the pod comprises a plurality of selectively inflatable segments.

23. The payload management system of claim 13 wherein the pod is partially inflated to form an inflatable pod before attachment to the unmanned aircraft.

* * * * *